(12) United States Patent
Ikari et al.

(10) Patent No.: US 6,682,882 B2
(45) Date of Patent: Jan. 27, 2004

(54) PRODUCTION PROCESS OF SILVER HALIDE EMULSION

(75) Inventors: Shinji Ikari, Kanagawa (JP); Mikio Ihama, Kanagawa (JP); Haruyasu Nakatsugawa, Kanagawa (JP); Tetsuro Mitsui, Kanagawa (JP); Kazutaka Takahashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/252,371

(22) Filed: Sep. 24, 2002

(65) Prior Publication Data

US 2003/0190562 A1 Oct. 9, 2003

(30) Foreign Application Priority Data

Sep. 26, 2001 (JP) ........................ 2001-294137

(51) Int. Cl.$^7$ ............................................. G03C 1/035
(52) U.S. Cl. .................................................. 430/569
(58) Field of Search ........................................ 430/569

(56) References Cited

U.S. PATENT DOCUMENTS

| 5,250,403 A | 10/1993 | Antoniades et al. |
| 5,928,853 A | 7/1999 | Yamamoto |
| 6,030,763 A * | 2/2000 | Mifune ........................ 430/567 |

* cited by examiner

*Primary Examiner*—Hoa Van Le
(74) *Attorney, Agent, or Firm*—Sughrue Mion, PLLC

(57) ABSTRACT

A process for producing a photosensitive silver halide emulsion is disclosed, comprising silver halide grains and a dispersion medium, said process comprising steps of adding a water-soluble silver solution, an aqueous alkali halide solution and an aqueous solution of gelatin having a molecular weight of 5,000 to 30,000 or less to a mixing vessel different from a reactor for the production of emulsion to prepare silver halide fine grains, adding the silver halide fine grains to the reactor for the production of emulsion to grow silver halide grains, and ultrafiltering the silver halide grains during the addition of silver halide fine grains, wherein 50% or more of the entire projected area of said emulsion grains is occupied by silver halide tabular grains having an aspect ratio of 10 or more and a thickness of 0.15 μm or less.

10 Claims, 3 Drawing Sheets

PRODUCTION PROCESS OF SILVER HALIDE EMULSION

FIELD OF THE INVENTION

The present invention relates to a production process of a silver halide emulsion, more specifically, the present invention relates to a production process of a thinner tabular grain emulsion.

BACKGROUND OF THE INVENTION

Tabular silver halide grains having a large light-receiving area are widely used as a photosensitive element. For increasing the light-receiving efficiency of the tabular silver halide grain, the smaller grain thickness is more preferred. The preparation of silver halide grains comprises two main steps of nucleation for forming grains working out to nuclei for growth, and grain growth. For the nucleation, a method of directly adding a water-soluble silver solution and an aqueous alkali halide solution to a reactor having a stirring unit of various types is used. However, the grains as nuclei in the course of growth pass through a high supersaturation region in the vicinity of a port for adding silver ion or halide ion and this causes a harmful effect that the tabular grains are increased in thickness. To overcome this problem, JP-A-10-43570 (the term "JP-A" as used herein means an "unexamined published Japanese patent application") and JP-A-2000-338620 disclose a method of adding a water-soluble silver solution, an aqueous alkali halide solution and an aqueous dispersion medium solution to an outside mixing vessel different from the reactor of undertaking the growth, thereby continuously forming silver halide fine grains, adding the silver halide fine grains to the reactor, and growing the grains as nuclei while dissolving the silver halide fine grains. However, the methods disclosed cannot produce silver halide fine grains having a narrow distribution and are not satisfied for obtaining thinner tabular grains.

On the other hand, in the production of silver halide grains of a silver halide emulsion, the total of the amount of water containing a dispersion medium necessary for stirring, the amount of water-soluble silver solution, the amount of aqueous alkali halide solution and the amount of additives is designed to be lower than the maximum liquid amount of a reactor. In the case of increasing the production amount and elevating the productivity, the production amount per once operation can be increased by increasing the concentrations of water-soluble silver salt and aqueous alkali halide solution occupying the majority of the liquid amount. However, the concentrations of water-soluble silver solution and halide ion are appropriately determined to obtain intended silver halide grains and if these concentrations are increased, not only the grain size, grain shape and grain size distribution are changed but also the photographic properties such as fog, sensitivity and gradation are adversely affected. In order to eliminate these adverse effects, it is necessary to remove the added aqueous solutions together with unnecessary salts while not changing the concentrations of water-soluble silver solution and aqueous alkali halide solution added. For this purpose, a method of using dehydrating and desalting apparatuses during the growth is disclosed in U.S. Pat. Nos. 4,334,012 and 5,242,597, European Patents 795,455 and 843,206, JP-A-11-231449, JP-A-11-237703, JP-A-11-352618, JP-A-2000-56420, JP-A-2000-56421, JP-A-2000-66320, JP-A-2001-56518, JP-A-2001-59994 and JP-A-2001-100348. However, according to these methods, a water-soluble silver solution and an aqueous alkali halide solution are directly added to a reactor and thick tabular grains are disadvantageously produced.

SUMMARY OF THE INVENTION

The object of the present invention is to provide a process for producing a tabular silver halide grain emulsion having high sensitivity and low fog and more reduced in the thickness.

In the present invention, silver halide fine grains which are continuously prepared and supplied can be made to have a monodisperse grain size distribution immediately before the addition and by using the silver halide fine grains, a tabular grain emulsion more reduced in thickness than in conventional techniques can be prepared.

The object of the present invention has been attained by the following (1) to (16):

(1) A process for producing a photosensitive silver halide emulsion comprising silver halide grains and a dispersion medium, the process comprising adding a water-soluble silver solution, an aqueous alkali halide solution and an aqueous solution of gelatin having a molecular weight of 5,000 to 30,000 or less to a mixing vessel different from a reactor for the production of emulsion to prepare silver halide fine grains, adding the silver halide fine grains to the reactor for the production of emulsion to grow silver halide grains, and ultrafiltering the silver halide grains during the addition of silver halide fine grains, wherein 50% or more of the entire projected area of the emulsion grains is occupied by silver halide tabular grains having an aspect ratio of 10 or more and a thickness of 0.15 $\mu$m or less.

(2) The process for producing a silver halide emulsion as described in (1), wherein the silver halide grains present in the reactor for the production of emulsion are ultrafiltered under variable temperature conditions before the addition of the silver halide fine grains.

(3) The process for producing a silver halide emulsion as described in (1) or (2), wherein the residence time of the water-soluble silver salt, aqueous alkali halide solution and aqueous gelatin solution in a mixing space of the mixing vessel is from 0.001 to 10 seconds.

(4) The process for producing a silver halide emulsion as described in any one of (1) to (3), wherein the mixing vessel comprises a stirring tank and at least two stirring blades in the stirring tank, an aqueous solution of water-soluble silver salt and an aqueous solution of water-soluble halide are supplied through supply ports provided in the stirring tank of the mixing vessel, the stirring state in mixing the aqueous solutions supplied is controlled by the stirring blades having no rotary shaft protruding through a wall of the stirring tank and disposed with a space at the positions facing each other in the stirring tank, and the silver halide fine grains produced after the completion of stirring treatment are discharged from the discharge port provided in the stirring tank.

(5) The process for producing a silver halide emulsion as described in any one of (1) to (4), wherein the average equivalent-circle diameter of the silver halide fine grains is 40% or more of the number average thickness of the silver halide tabular grains under growing.

(6) The process for producing a silver halide emulsion as described in any one of (1) to (5), wherein the coefficient of variation in the equivalent-circle diameter of the silver halide fine grains is 30% or less.

(7) The process for producing a silver halide emulsion as described in any one of (1) to (6), wherein 50% or more of the entire projected area is occupied by grains having an equivalent-circle diameter of 3.0 $\mu$m or more.

(8) The process for producing a silver halide emulsion as described in any one of (1) to (7), wherein 70% or more of the entire projected area is occupied by hexagonal tabular grains having an epitaxial projection part at least at one apex.

(9) The process for producing a silver halide emulsion as described in any one of (1) to (8), wherein the emulsion is produced through nucleation, ripening and growth steps and the total silver concentration in the silver halide emulsion at the start of ripening step is from 0.0015 to 0.15 mass %.

(10) The process for producing a silver halide emulsion as described in any one of (1) to (9), wherein the reactor temperature in the nucleation step of adding an aqueous silver solution and an aqueous halide solution is 5° C. or less.

(11) A process for producing a silver halide emulsion through nucleation, ripening and growth steps, the silver halide emulsion being a photosensitive silver halide emulsion comprising silver halide grains and a dispersion medium, wherein 50% or more of the entire projected area of grains is occupied by silver halide tabular grains having an aspect ratio of 10 or more, the total silver concentration in the silver halide emulsion at the start of ripening step is from 0.0015 to 0.15 mass %, and ultrafiltration is used in a part of the emulsion preparation steps.

(12) The process for producing a silver halide emulsion through nucleation, ripening and growth steps as described in (11), wherein the reactor temperature in the nucleation step of adding an aqueous silver solution and an aqueous halide solution is from 5° C. or less.

(13) The process for producing a silver halide emulsion through nucleation, ripening and growth steps as described in (11), wherein the silver halide tabular grains have an equivalent-circle diameter of 3.0 μm or more and a thickness of 0.15 μm or less.

(14) The process for producing a silver halide emulsion as described in any one of (1) to (3), wherein in the mixing vessel, an aqueous solution of water-soluble silver salt and an aqueous solution of water-soluble halide are supplied through supply ports provided in a closed stirring tank of the mixing vessel, the stirring state in mixing the aqueous solutions supplied is controlled by at least two stirring blades having no rotary shaft protruding through a wall of the stirring tank and disposed with a space at the positions facing each other in the stirring tank, and the silver halide fine grains produced after the completion of stirring treatment are discharged from the discharge port provided in the closed stirring tank sealed in the periphery of the rotary shaft.

(15) The process for producing a silver halide emulsion as described in any one of (1) to (3), wherein in the mixing vessel, at least one of the water-soluble silver solution and the aqueous alkali halide solution is turned into a linear jet stream having a high flow rate and those two kinds of solutions are mixed within a short time to continuously form silver halide grains.

(16) The process for producing a silver halide emulsion as described in any one of (1) to (3), wherein the mixing vessel comprises a first channel for passing the water-soluble silver solution and a second channel for passing the aqueous alkali halide solution, those two channels are disposed to partially contact with each other, those two fluids each forms substantially a thin layer, an open interface is formed between those two fluids, those two thin layers each has a thickness of 1 to 500 micrometer in the normal direction of their contact interface, and silver ion and halide ion diffuse and move between those two thin layers to cause a reaction of silver ion and halide ion, thereby continuously producing silver halide grains.

(17) The process for producing a silver halide emulsion as described in any one of (1) to (5), wherein the percentage by number of twin crystal grains in the silver halide fine grains is 15% or less.

Figure 1:
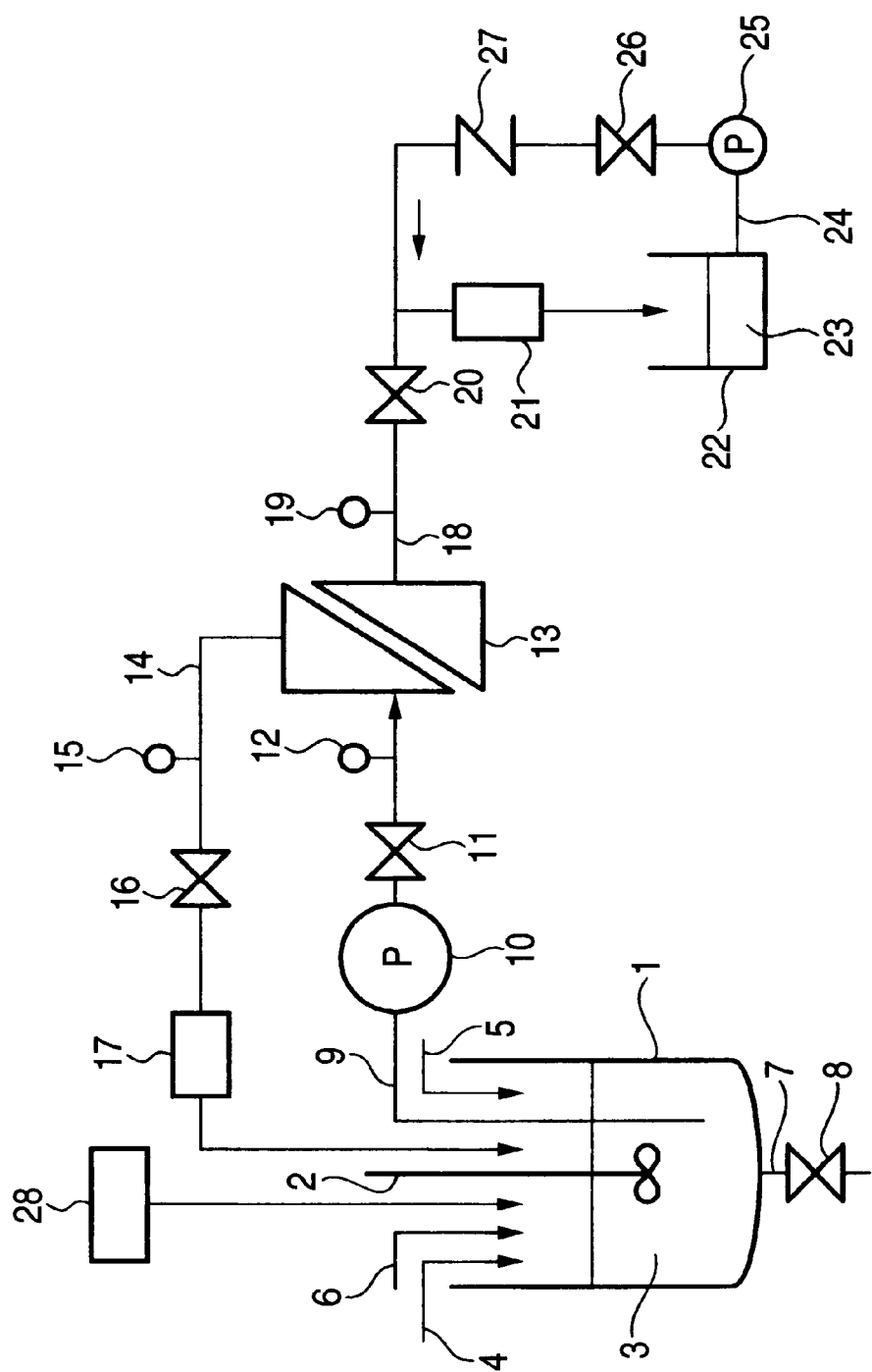
FIG. 1 is a cross-sectional view schematically showing the apparatus according to the practical embodiment of the present invention.

1 Reactor
2 Stirring Blade
3 Dispersion medium
4 Silver addition pipeline
5 Halide addition pipeline
6 Chemicals addition pipeline
7 Reaction solution sampling pipeline
8 Reaction solution sampling valve
9 Liquid supply pipeline
10 Pump
11 Supply valve
12 Supply pressure gauge
13 Ultrafiltration membrane module
14 Liquid reflux pipeline
15 Reflux pressure gauge
16 Reflux valve
17 Reflux flow meter
18 Liquid permeation pipeline
19 Permeation pressure gauge
20 Permeation valve
21 Permeation flow meter
22 Permeated solution storage vessel
23 Permeated solution
24 Backwash pipeline
25 Backwash pump
26 Backwash valve
27 Check valve
28 Mixing vessel
30 Mixing vessel
31, 32, 33 Liquid supply port
34 Liquid discharge port
35 Stirring tank
36 Tank body
37 Seal plate
38, 39 Stirring blades
40, 41 Outer magnets
42, 43 Motors
44 Central axis of rotation 45 Double side bipolar magnet
46 Bilateral bipolar magnet
L Line of magnetic force

DETAILED DESCRIPTION OF THE INVENTION

In the present invention, the silver halide tabular grain means a gain where one or more twin plane is crystallographically present. This twin plane is present in parrallel to the face (main plane) having a maximum area of the grain. In the present invention, the tabular grain is preferably a grain having one or two sheet of this twin plane.

The diameter and thickness of the grain of the present invention can be determined by an electron microphotograph of grains according to the method described in U.S. Pat. No. 4,434,226. More specifically, the thickness of the grain can be easily determined by depositing a metal from the oblique direction of a grain together with a latex for reference, measuring the length of the shadow thereof on an electron microphotograph, and calculating the thickness with reference to the length of the shadow of latex. The silver halide grain of the present invention satisfies the condition that in the entire projected area of grains observed through an electron microscope, from 50 to 100% have an average aspect (a ratio of the diameter of the main plane of a grain to the thickness of the grain) of 10 or more, preferably from 20 to 200. The thickness of the silver halide grain is preferably from 0.01 to 0.15 $\mu$m, more preferably 0.1 $\mu$m or less. The average aspect ratio can be determined by averaging the aspect ratios of all tabular grains but in a simple method, the average aspect ratio can also be determined as a ratio of the average diameter to the average thickness of all tabular grains. The diameter of the main plane is preferably from 1 to 10 $\mu$m, more preferably from 3.0 to 10 $\mu$m.

The emulsion of the present invention is preferably monodisperse. The coefficient of variation in the equivalent-circle diameter of the projected area of all silver halide grains is preferably 25% or less, more preferably 20% or less. The coefficient of variation in the equivalent-circle diameter as used herein means a value obtained by dividing the standard deviation of the distribution of equivalent circle diameters of individual silver halide grains by the average equivalent-circle diameter.

The tabular silver halide grain of the present invention preferably has a halogen composition of silver iodobromide, silver bromide, silver chlorobromide or silver chloroiodobromide. Also, the grain of the present invention preferably has a dislocation line inside the grain.

The dehydration and desalting techniques by ultrafiltration for use in the present invention are described in *Research Disclosure*, Vol. 102, Item 10298, and ibid., Vol. 131, Item 13122. These techniques are also disclosed in U.S. Pat. Nos. 4,334,012, 5,164,092 and 5,242,597, European Patents 795,455 and 843,206, JP-A-8-278580 and JP-A-11-231449.

The membrane module obtained by integrating the membrane used as the ultrafiltration membrane for use in the present invention into a container includes a tubular module, a hollow yarn module, a pleated module, a spiral module, a flat membrane module and a plate & frame module. Among these, a hollow yarn module and a flat membrane module are preferred.

For the ultrafiltration membrane for use in the present invention, various materials can be used. As for the main material for useful ultrafiltration membranes, for example, polyacrylonitrile, polysulfone, polyimide, polyethersulfone, cellulose acetate, polyvinyl chloride, polyvinyl acetate, polyvinyl alcohol and ceramics such as aluminum oxide are preferably used.

A fractional molecular weight is an index for the performance of the ultrafiltration membrane for use in the present invention. The fractional molecular weight is a molecular weight of giving a blocking percentage (a percentage obtained by dividing the difference between the concentration of supplied solution and the concentration of permeated solution by the concentration of supplied solution) of 90% or more. A fractional molecular weight of not passing silver halide grains but passing unnecessary salts or dispersions is preferred. If the fractional molecular weight is small, the flow rate of the solution permeated through the ultrafiltration membrane decreases. Therefore, an optimal fractional molecular weight must be selected. The useful fractional molecular weight is from 1,000 to 1,000,000, preferably from 3,000 to 100,000.

The pore size of the ultrafiltration membrane is preferably from 0.005 to 10 $\mu$m, more preferably from 0.01 to 1 $\mu$m.

FIG. 1 is a conceptual view showing one example of dehydration and desalting of a silver halide emulsion performed using ultrafiltration of the present invention. In FIG. 1, a reaction solution containing silver halide grains in a reactor 1 is stirred by a stirrer 2 and transferred to an ultrafiltration membrane 12 through a liquid supply pipeline 9, a pump 10 and a supply valve 12. The reaction solution containing silver halide grains passes through the ultrafiltration membrane while partially discharging water, salts and the like through a liquid permeation pipeline 18, a permeation valve 20 and a permeation flow meter 21. At this time, a check valve 27 is closed. The remaining reaction solution containing silver halide grains is returned to the original reactor 1 through a liquid reflux pipeline 14, a reflux valve 16 and a reflux flow meter 17. Before and after the passing of the reaction solution through the ultrafiltration membrane, pressure gauges 12, 15 and 19 are provided. In order to return the silver halide grains remaining on the ultrafiltration membrane, a part of the permeated solution may be passed to the ultrafiltration module through a backwash pipeline 24, a backwash pump 25, a backwash valve 26, a check valve 27, a permeation valve 20 and a liquid permeation pipeline 18 after the completion of ultrafiltration, so that the silver halide grains adsorbed to the ultrafiltration membrane can be returned to the original reactor through the liquid reflux pipeline 14, the reflux valve 16 and the reflux flow meter 17. The permeated solution as an aqueous solution for backwash may be replaced by water, an aqueous solution prepared by diluting the permeated solution with water, or an aqueous solution after the pBr is adjusted.

In the ultrafiltration of the present invention, the reflux and permeation flow rates can be controlled by controlling the reflux valve or permeation valve. The permeation flow rate can be increased by increasing the flow rate of pump or by throttling the reflux valve to increase the reflux flow rate and elevating the supply pressure. For increasing the permeation amount, a method of connecting two or more ultrafiltration modules in parallel or in series and thereby increasing the membrane area is preferred.

In the case of using the ultrafiltration of the present invention, the dispersion medium added to the reactor is preferably gelatin. The molecular weight of gelatin directly added to the reactor is not limited but as the gelatin concentration is higher, the viscosity becomes higher and the permeation flow rate in the ultrafiltration becomes lower, therefore, the gelatin concentration must be controlled.

When a low molecular weight gelatin which passes through the ultrafiltration membrane is used for the gelatin used in the mixing vessel, the gelatin can be passed through the ultrafiltration membrane and the concentration of gelatin in the reactor can be prevented from increasing. The molecular weight of gelatin used in the mixing vessel can be made lower by means of enzymolysis and thereby the viscosity can be decreased. The average molecular weight is from 5,000 to 30,000. Furthermore, the effect on the thickness of tabular grain can be variously changed by the chemical modification of gelatin. In order to obtain thin tabular silver halide grains, an oxidation treatment, a succination treatment and a trimellitation treatment can be preferably used.

It is also preferred to perform the ultrafiltration of the present invention at a stage before the growth by fine grains. The formation of tabular grains includes a step of elevating the reactor temperature to ripen the produced grains as nuclei. By performing this step, tabular grains undergoing growth by fine grains can be formed. In the present invention, for the purpose of scale-up, the ultrafiltration is preferably performed in this ripening step to effect dehydration and desalting. For scaling up the production of emulsion, if the concentrations of water-soluble silver solution and aqueous alkali halide solution are merely elevated at the formation of nuclei, the nuclei produced aggregate and the grain size distribution is changed for the worse. When dehydration and desalting are performed by ultrafiltration after the nuclei are produced at optimal concentrations of water-soluble silver solution and aqueous alkali halide solution, a large amount of nuclei can be formed without worsening the grain size distribution.

The ultrafiltration of the present invention can be used other than the above-described step.

The average grin size of silver halide fine grains prepared in the mixing vessel for use in the present invention is described below.

In order to allow tabular grains to grow while maintaining the small thickness, an appropriate low supersaturation degree condition is necessary, where the preference of growth in the side surface direction is sufficiently high during the growth and ripening does not occur inside the tabular grain or among tabular grains. As the fine particle size is larger, the equilibrium solubility becomes lower and therefore, a low super-saturation state can be more easily realized, however, if the fine grain size is too large, the time necessary for the growth is prolonged or the fine grain remains due to Ostwald ripening among fine grains and depending on the conditions, ripening is generated inside the tabular grain or among tabular grains. Accordingly, fine grains having no small size region must be appropriately added and the number average equivalent-circle diameter of fine grains must be changed as the tabular grains grow. For this purpose, the number average equivalent-circle diameter of silver halide fine grains for use in the present invention is preferably 40% or more of the number average thickness of tabular grains under growing. Under the above-described conditions in the present invention, the most appropriate equivalent-circle diameter of fine grain changes depending on the halogen composition of fine grain, the percentage in number of twin grains, the pH, the pAg, the temperature and the like. Particularly, in the case where the percentage in number of twin grains is small, fine grains having twin less remain and larger fine grains can be added. In the case where the percentage in number of twins is small, the number average equivalent-circle diameter of silver halide fine grains prepared immediately before the addition of the present invention is preferably at least 45% or more of the number average thickness of tabular grains under growing. In the present invention, the percentage in number of twins is preferably 15% or less, more preferably 10% or less, still more preferably 5% or less.

The equivalent-circle diameter of the silver halide fine grain can be determined by the direct observation using an electron microscope and is determined as a diameter of a circle having the same projected area. The fine grain is readily increased in the size due to ripening or the like and therefore, the fine grains to be added are observed after stopping the change of grain using a ripening inhibitor or a growth inhibitor. Or, the silver halide fine grains to be added are immediately placed on a mesh for the electron microscope observation and after immediately removing the water content, observed. By performing the electron microscope observation at a temperature of $-100°$ C. or less, the observation of silver halide fine grains is facilitated. The equivalent-circle diameter is determined on 1,000 grains or more and from the values obtained, the number average equivalent-circle diameter and the coefficient of variation in the equivalent-circle diameter can be determined. The percentage in number of twin grains in the silver halide fine grains can be determined by growing the fine grain emulsion at a temperature of $40°$ C. or less, preferably $35°$ C. or less, without causing no formation of new nuclei under high supersaturation condition until a clear grain shape is shown and observing the photograph of replica of the grains taken by a transmission electron microscope. This is described in detail in JP-A-2-146033.

The halogen composition of the silver halide fine grain for use in the present invention is selected from silver bromide, silver iodobromide, silver chloride, silver chlorobromide, silver iodide, silver chloroiodide and silver chloroiodobromide. Among these, silver iodobromide having a silver iodide content of 1 to 5 mol % is preferred.

The silver halide fine grain for use in the present invention is also preferably used for the preparation of halide fine grains as nuclei before the growth.

In the present invention, the residence time of the water-soluble silver solution, aqueous alkali halide solution and aqueous dispersion medium solution in the mixing tank of the mixing vessel means a value obtained by dividing the liquid amount of the mixing vessel by the rate (volume per second) in supplying halide fine grains under the conditions that the fine grains are being prepared in a stable state. In the present invention, the residence time in the mixing vessel is from 0.001 to 10 seconds, preferably from 0.001 to 3 seconds, more preferably from 0.001 to 0.5 seconds.

In the mixing vessel for use in the present invention, silver halide fine grains can be prepared by adding a water-soluble silver salt, an aqueous alkali halide solution and a dispersion medium solution. At this time, these three solutions may be added separately or the dispersion medium solution and the aqueous alkali halide solution may be mixed and then added.

In the present invention, the water-soluble silver solution is preferably an aqueous silver nitrate solution. The aqueous alkali halide solution for use in the present invention is usually an aqueous solution of potassium bromide, sodium bromide, potassium chloride, sodium chloride, potassium iodide, sodium iodide or a mixture thereof.

The concentrations of the water-soluble silver solution and the aqueous alkali halide solution added to the mixing vessel for use in the present invention are, in the case of using these solutions for grains as nuclei, preferably 4 mol/liter or less, more preferably 1 mol/liter or less, most preferably 0.2 mol/liter or less. In the case of using these aqueous solutions for the growth, a high-concentration aqueous solution is preferred in view of productivity and the concentrations are preferably from 0.5 to 4 mol/liter, more preferably 1.0 mol/liter or more. The temperature of the aqueous solutions is preferably from 5 to 75° C. In the case where the silver halide grains obtained by the process of the present invention are used as nuclei, the concentrations of the aqueous solutions are preferably 4 mol/liter or less, more preferably 1 mol/liter or less, most preferably 0.2 mol/liter or less. In the case of using the grains for the growth, a high-concentration aqueous solution is preferred in view of productivity and the concentrations are preferably from 0.5 to 4 mol/liter, more preferably from 1.0 to 4 mol/liter. The temperature of the water-soluble silver solution, aqueous alkali halide solution and aqueous dispersion medium solution added is preferably from 5 to 75° C.

The dispersion medium used in the mixing vessel of the present invention is gelatin having an average molecular weight of 5,000 to 30,000. This gelatin greatly affects the probability of generation of twins in the silver halide grains produced and therefore, the preferred concentration of the aqueous gelatin solution varies depending on the use end of the silver halide fine grains produced. In the case where the silver halide fine grains are used as nuclei in the preparation of tabular silver halide grains, a parallel double twin nucleus is necessary and the concentration of the aqueous gelatin solution must be adjusted so that a desired probability of generation of twins can be achieved. The gelatin concentration is preferably selected such that when an aqueous silver salt solution and an aqueous halide salt solution are mixed, the gelatin amount becomes from 0.03 to 0.4 g, more preferably from 0.03 to 0.3 g, per g of silver. In the case of using the silver halide fine grains for the growth, the silver halide grains added are preferably dissolved without delay. For this purpose, the proportion of twin nuclei is preferably smaller and the concentration of the aqueous gelatin solution is preferably higher. The concentration of the aqueous gelatin solution is preferably adjusted such that gelatin is added to a concentration of 0.2 to 1 g, more preferably 0.3 g or more, most preferably 0.4 g of more, per g of silver nitrate.

Figure 2:
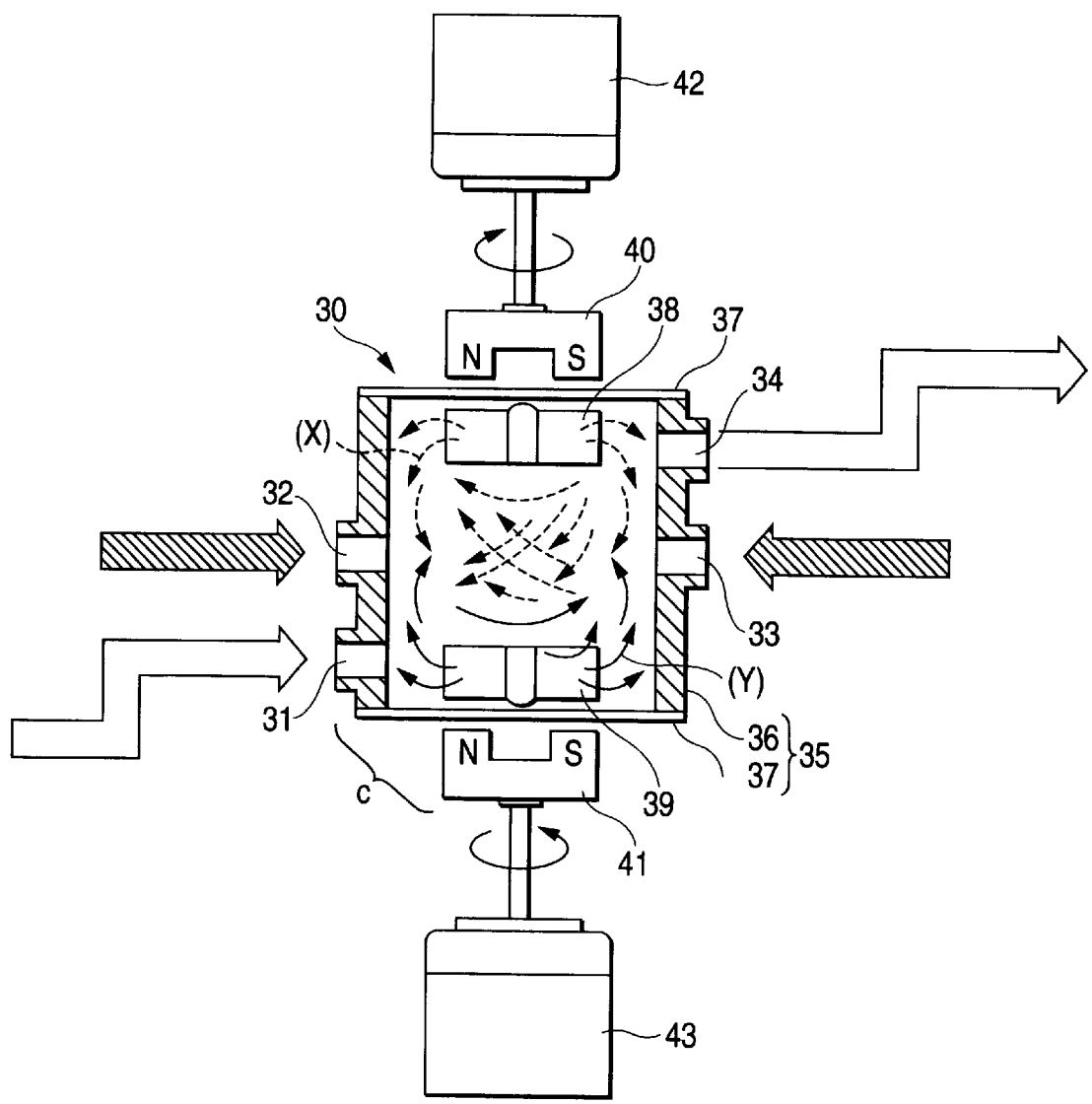
FIG. 2 is a cross-sectional view schematically showing the production process in the mixing vessel according to the practical embodiment of the present invention.

In the present invention, the following three mixing vessels are preferred and these are described one by one.
(1) Mixing Vessel of Stirring Solutions Using Two or More Rotary Shafts in Closed Stirring Tank As shown in FIG. 2, a water-soluble silver solution, an aqueous alkali halide solution and, if desired, an aqueous dispersion medium solution are introduced to a mixing vessel 30 installed outside the reactor through addition systems (supply ports) 31, 32 and 33, respectively (in this case, if desired, the aqueous dispersion medium solution may be added after mixing it with the water-soluble silver solution and/or the aqueous alkali halide solution). These solutions are rapidly and vigorously mixed in the mixing vessel and immediately introduced to the reactor through a system (discharge port) 34 to form silver halide fine grains in the reactor. At this time, the emulsion discharged from the mixing vessel may be once reserved in a separate vessel and added later to the reactor. After the completion of fine grain formation in the reactor, a water-soluble silver solution, an aqueous alkali halide solution and, if desired, an aqueous dispersion medium solution are further introduced to the mixing vessel 30 through addition systems 31, 32 and 33, respectively (in this case, if desired, the aqueous dispersion medium solution may be added after mixing it with the water-soluble silver solution and/or the aqueous alkali halide solution). These solutions are rapidly and vigorously mixed in the mixing vessel, and immediately and continuously introduced to the reactor 1 through the addition system 34 and homogenized in the reactor.

One practical embodiment of the mixing vessel of the present invention is described below. If a driving shaft is fixed to stirring blades and the stirring blades are rotated at a high speed by a driving apparatus outside the mixing vessel as in conventional techniques, sealing of the mixing tank and the driving shaft is very difficult. In the present invention, this problem is solved by using no driving shaft but as described below, rotating the stirring blades using the magnetic induction generated between the stirring blade and an outer magnet connected with magnetic coupling. In FIG. 2, the stirring tank 35 is constructed by a stirring tank body 36 with the central axis being vertically directed and seal plates 37 working as tank walls sealing top and bottom opening ends of the tank body 36. The tank body 36 and the seal plate 37 are formed of a nonmagnetic material having excellent magnetic permeability. The stirring blades 38 and 39 are disposed with a space to face each other at the top and bottom ends in the stirring tank 35 and driven to rotate in the converse direction from each other. The stirring blades 38 and 39 each constitutes a magnetic coupling C with an outer magnet 40 or 41 disposed outside the tank wall (seal plate 37) adjacent to the stirring blade 38 or 39. That is, stirring blades 38 and 39 are connected to outer magnets 40 and 41, respectively, by a magnetic force and operated to rotate in the converse direction from each other by rotation-driving outer magnets 40 and 41 using independent motors 42 and 43, respectively.

Furthermore, in FIG. 2, the mixing vessel comprises a stirring tank 35 having solution supply ports 31, 32 and 33 for supplying a water-soluble silver solution, an aqueous alkali halide solution and, if desired, an aqueous dispersion medium solution to be stirred and a discharge port 34 for discharging the silver halide fine grain emulsion after the completion of stirring treatment, and a pair of stirring blades 38 and 39 as stirring means which are rotation-driven in the stirring tank 35 and thereby control the stirring state of solutions in the stirring tank 35. As for the shape of the mixing vessel 28, a cylindrical form is often used but rectangular, hexagonal and various other forms may be used. The paired stirring blades are disposed with a space to face each other at the top and bottom ends in the stirring tank 35 and driven to rotate in the converse direction from each other. In FIG. 2, this paired stirring blades are vertically disposed to face each other but may be horizontally disposed to face each other or may be diagonally disposed. In FIG. 2, a pair of two stirring blades are disposed at the positions facing each other but two or more pairs of an even number of four or more conversely rotating stirring blades may be used or an odd number (including one) of stirring blades not forming a pair may also be used. Also, by the combined use of an even number of conversely rotating stirring blades making a pair and an odd number (including one) of stirring blades, more efficient stirring can be practiced.

In the mixing vessel of the present invention, when stirring blades facing each other in the mixing vessel are driven, the stirring blades must be rotated at a high speed for realizing a higher mixing efficiency. The rotation number is 1,000 rpm or more, preferably 3,000 or more, more preferably 5,000 rpm or more.

Figure 3:
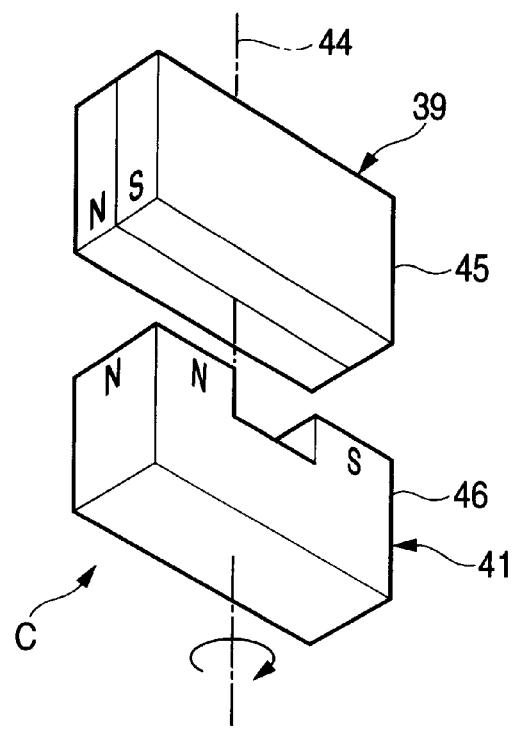
FIG. 3 is a perspective view schematically showing the structure of magnetic coupling used in the stirring unit of the mixing vessel according to the practical embodiment of the present invention.

FIG. 3 shows the structure of the magnetic coupling C at the bottom end of the stirring tank 35. In this magnetic coupling C according to one practical embodiment, as shown in the Figure, a double side bipolar magnet 45 disposed such that an N pole face and an S pole face run in parallel to the central axis 44 of rotation and are superposed to interpose the central axis 44 of rotation, is used for each of the stirring blades 38 and 39 constituting the magnetic coupling C. For the outer magnet 41, a bilateral bipolar magnet (U-shaped magnet) 46 is used, where an N pole face and an S pole face stand abreast at the symmetrical positions with respect to the central axis 44 of rotation on the plane orthogonal to the central axis 44 of rotation. In this magnetic coupling C, in contrast with the above case, even if a double side bipolar magnet 45 is used as the outer magnet 41 and a bilateral bipolar magnet 46 as stirring blades 38 and 39, the same operation effect can be obtained.

Figure 4:
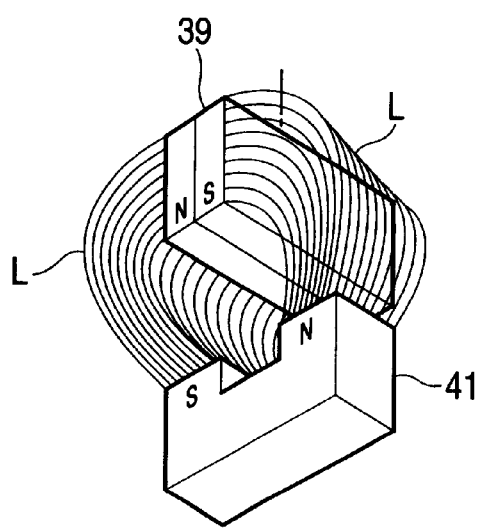
FIG. 4 is a perspective view showing the action of the magnetic coupling shown in FIG. 3.
Figure 4:
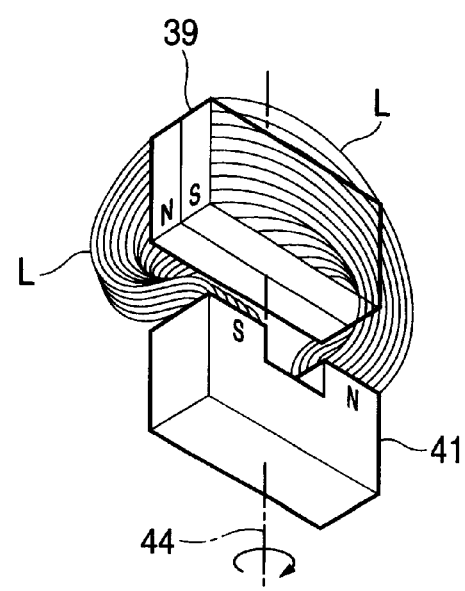

In the above-described magnetic coupling C, the line L of magnetic force connecting the outer magnet 41 with the stirring blades 38 and 39 is as shown in FIG. 4(a) and, for example, as compared with the magnetic flux formed in the case of constituting the magnetic coupling using bilateral bipolar magnets by themselves, the magnetic flux diameter connecting magnets each other can be doubled. At the same time, on rotating the outer magnet 41, the magnetic flux deflects as shown in FIG. 4(b) and the magnetic coupling can be invested with flux viscosity which prevents the cutting of magnetic flux. Therefore, the connection strength as coupling is greatly improved and high-speed rotation of stirring blades 38 and 39 becomes possible by the use of a high rotary motor for the motors 42 and 43.

The stirring in the mixing vessel of the present invention may be performed by rotating the paired stirring blades in the same direction or in the converse direction but is preferably performed by the rotation in the converse direction. As for the rotation number, the stirring blades may be driven by the same rotation number or by the different rotation numbers.

For the mixing vessel of the present invention, a mixing vessel having a rotation shaft protruding through the stirring tank of the mixing vessel and sealed in the periphery of this rotation shaft is also preferably used. Also in this case, a pair of stirring blades may be rotated in the same or converse direction but are preferably rotated in the converse direction. As for the rotation number, the stirring blades may be driven by the same rotation number or by the different rotation numbers.

In the present invention, an aqueous protective colloid solution is added to the mixing vessel and for this addition, the following methods are used.

a. An aqueous dispersion medium solution is added alone to a mixing vessel. The concentration of the aqueous dispersion medium solution is 0.5% or more, preferably from 1% to 20%. The flow rate thereof is at least from 20% to 300%, preferably from 50% to 200%, of the sum of flow rates of a water soluble silver solution and an aqueous alkali halide solution.

b. An aqueous dispersion medium solution is incorporated into an aqueous alkali halide solution. The concentration of dispersion medium is 0.4% or more, preferably from 1% to 20%.

c. A dispersion medium is incorporated into a water-soluble silver solution. The concentration of dispersion medium is 0.4% or more, preferably from 1% to 20%. In the case of using gelatin as the dispersion medium, gelatin silver is formed from silver ion and gelatin and silver colloid is produced by photolysis and pyrolysis. Therefore, a water-soluble silver solution and a gelatin solution are preferably added immediately before use.

These methods a, b and c may be used individually or in combination, or three methods may be used at the same time.

(2) Mixing Vessel of Stirring Solutions Turned into Linear Jet Stream

In the mixing vessel of the present invention, silver halide fine grains can be prepared by adding and mixing a water-soluble silver solution, an aqueous alkali halide solution and an aqueous dispersion medium solution which are turned into linear jet streams. The aqueous dispersion solution may be added to either one of the water-soluble silver solution and the aqueous alkali halide solution or those three solutions may be mixed separately.

The flow rate of the solution added as the jet stream to the mixing vessel of the present invention is preferably 100 m/sec or more, more preferably 250 m/sec or more, and most preferably 500 m/sec or more.

In the mixing vessel of the present invention, the diameter of the capillary for mixing the solutions is preferably 20 times or less, more preferably 10 times or less, and most preferably 7 times or less, the diameter of the port for adding the linear jet stream. The length of the capillary for mixing the solutions is preferably 10 times or more, more preferably 50 times or more, and most preferably 100 times or more, the diameter thereof. The capillary may have a recess on the inside. When the solution added flows through the capillary, the recess converts the flow into finer turbulence to cause more homogeneous mixing. In the case of performing the mixing by a jet stream having a high flow rate, the apparatus is preferably equipped with a cooler, because the temperature of the mixed solution elevates.

In the mixing vessel of the present invention, the mixing of the water-soluble silver solution and the aqueous alkali halide solution is preferably not accompanied by mechanical stirring. When accompanied by the mechanical stirring, the mixing can be hardly performed without causing circulation. Furthermore, in the case where the mixing time is as short as 0.1 second or less, thorough mixing can be hardly attained by the mechanical stirring.

In the mixing vessel of the present invention, the water-soluble silver solution and the aqueous alkali halide solution both may be turned into a linear jet stream and then mixed, or while turning one of these solutions into a linear jet stream, another may be mixed utilizing the negative pressure of the jet stream.

As the mixing method satisfying the requirements of the present invention, a high-pressure homogenizer (DeBEE 2000) manufactured by BEE INTERNATIONAL Co. may be applied. Using the dual field process of this homogenizer, one of the water-soluble silver solution and the aqueous alkali halide solution can be turned into a high speed jet stream and then mixed with another solution. When a high pressure is applied to the aqueous solution turned into a jet stream, a high kinetic energy is imparted to the solution and thereby, two solutions can be mixed within an extremely short time. According to this method, circulation of allowing the solution added to again return to the vicinity of the addition port does not occur and furthermore, the mechanical stirring is not necessary because the added solution has a sufficiently high kinetic energy.

(3) Mixing Vessel Utilizing Laminar Flow

In the mixing vessel of the present invention, a laminar flow is utilized. The water-soluble silver solution and the aqueous alkali halide solution each is finely divided into lamellas to allow these two solutions to contact at a wider area, whereby ion can be uniformly diffused within a short time and more rapid and more uniform mixing can be realized. The transfer of ion by diffusion is given as a product of a diffusion coefficient and a concentration gradient by the following formula according to the Fick's law of showing the relationship with the change of concentration in aging:

$$t \sim dl^2/D$$

wherein D is a diffusion constant, dl is the thickness of lamella and t is a mixing time.

According to the formula above, the mixing time t is proportional to the square of lamella thickness dl. Therefore, the mixing time can be very effectively shortened by reducing the thickness of lamella.

In the present invention, the expected effect can be realized by using Microreactor manufactured by IMM (Institute fur Mikrotechnik Mianz). The details on Microreactor are described in W. Ehrfeld, V. Hessel and H. Loewe, *Microreactor*, 1st ed., Wiley-VCH (2000). That is, the principle thereof is in the multilamination and subsequent diffusion mixing.

The fluids of water-soluble silver solution and aqueous alkali halide solution pass through slits running into each other and having a thickness on the order of tens of microns and thereby are divided into a large number of lamella fluids. At the outlets of slits, these solutions come into contact in a wide area in the direction normal to their flowing direction and immediately, silver ion and halide ion start diffusing. The mixing by diffusion completes within a short time and by the ionic reaction simultaneously occurred, silver halide fine grains are formed.

In the mixing vessel of the present invention, the thickness of the lamella is, in the direction normal to its flowing direction, from 1 to 500 μm, preferably from 1 to 100 μm, more preferably from 1 to 50 μm. In the present invention, the mixing time using the laminar flow is less than 0.5 seconds, preferably less than 100 milli-seconds, more preferably less than 50 milli-seconds.

A micromixer which is the mixing vessel of the present invention is an apparatus having a channel with an equivalent diameter of 1 mm or less. The term "equivalent diameter" as used in the present invention is also called an equivalent (diameter) size and is a term used in the field of mechanical engineering. Imagine a circular tube equivalent to a pipeline (in the present invention, the channel) having an arbitrary cross-sectional shape. Then, the diameter of the equivalent tube is called an equivalent diameter. The equivalent diameter is defined as $d_{eq}=4A/p$, wherein A is the cross-sectional area of pipeline and p is the length of wetted perimeter of the pipeline (perimeter length). When this is applied to the circular tube, this equivalent diameter agrees with the diameter of the circular tube. The equivalent diameter is used for presuming the fluidity or thermal conductance properties of the pipeline based on the data of equivalent circular tube and represents a spatial scale (representative length) of a phenomenon. The equivalent diameter is $d_{eq}=4a^2/4a=a$ for an equilateral square tube having a side a, $d_{eq}=a/3^{1/2}$ for an equilateral triangle tube having a side a, and $d_{eq}=2h$ for a flow between parallel plates having a path height h (see, Nippon Kikai Gakkai (compiler), *Kikai Kogaku Jiten* (*Dictionary of Mechanical Engineering*), Maruzen (1997)).

The channel in the mixing vessel of the present invention is formed on a solid substrate by a fine working technique. Examples of the material used include metal, silicon, Teflon, glass, ceramic and plastic. In the case where resistance against heat, pressure and solvent is required, the material is preferably metal, silicon, Teflon, glass or ceramic, more preferably metal. Examples of the metal include nickel, aluminum, silver, gold, platinum, tantalum, stainless steel, hastelloy (Ni—Fe alloy) and titanium. Among these, preferred are stainless steel, hastelloy and titanium because of their high corrosion resistance. In the case of conventional batch system reaction apparatuses, an apparatus where the metal (e.g., stainless steel) surface is lined with glass is used in treating an acidic substance. Also in the Microreactor, the metal surface may be coated with glass. On the metal, not only glass but also a different metal or other material may be coated according to the purpose. Also, a metal or glass may be coated on a material other than metal, for example, ceramic.

Representative examples of the fine working technique for forming a channel of the mixing vessel of the present invention include LIGA technique using X-ray lithography, high aspect ratio photolithography using EPON SU-8, micro-discharge working ($\mu$-EDM), high aspect ratio working of silicon by Deep RIE, hot emboss working, stereolithography, laser working, ion beam working and mechanical micro-cutting work using a micro-tool made of a hard material such as diamond. These techniques may be used individually or in combination. Among these fine working techniques, preferred are LIGA technique using X-ray lithography, high aspect ratio photolithography using EPON SU-8, micro-discharge working ($\mu$-EDM) and mechanical micro-cutting work.

In assembling the micromixer which is the mixing vessel of the present invention, a junction technique is often used. The junction technique in general is roughly classified into solid phase junction and liquid phase junction. Representative examples of the junction method commonly used include, as solid phase junction, pressure junction and diffusion junction, and as liquid phase junction, welding, eutectic junction, soldering and adhesion. The assembling is preferably performed by a high-precision junction method which is not accompanied by deterioration of the material due to high-temperature heating or destruction of fine structures such as channel due to large deformation and can maintain the dimensional precision. Examples of the technique therefor include silicon direct junction, anodic junction, surface activation junction, direct junction using hydrogen bond, junction using an aqueous HF solution, Au—Si eutectic junction and void-free adhesion.

The equivalent diameter of the channel used for the mixing vessel of the present invention is 1 mm or less, preferably from 10 to 500 μm, more preferably from 20 to 300 μm. The length of channel is not particularly limited but is preferably from 1 to 1,000 mm, more preferably from 10 to 500 mm.

The channel for use in the present invention is not limited to one channel but if desired, many channels may be provided in parallel (numbering-up) to increase the amount processed. In the present invention, the reaction is performed in the course of passing through the channel, namely, in the flow.

The channel of the micromixer which is the mixing vessel of the present invention may be subjected to a surface treatment, if desired. Particularly, in the case of operating an aqueous solution, there may arise a problem of adhesion of the sample to glass or silicon and therefore, the surface treatment is important. The fluid in the micro-size channel is preferably controlled without integrating movable parts requiring a complicated production process. For example, when hydrophilic and hydrophobic regions are provided in the channel by the surface treatment, the fluid can be operated utilizing the difference in the surface tension acting at the boundary between those regions.

For introducing and mixing a reagent or sample into the micro-size channel in the micromixer which is the mixing vessel of the present invention, a fluid control function is necessary. Particularly, the behavior of fluid in the micro region has different properties from those in the macro scale and therefore, a control system suitable for the micro scale must be considered. The fluid control system includes, in the classification by morphology, continuous flowing system and liquid droplet (liquid plug) system and in the classification by driving force, electrical driving system and pressure driving system. These systems are described in detail below.

In handling a fluid, a continuous flowing system is most widely used. In the control of fluid by the continuous flowing system, it is common to entirely fill the inside of channel of the microreactor with a fluid and drive the fluid as a whole by a pressure source prepared outside, such as syringe pump. In this case, one advantage is that a control system can be realized by a relatively simple set-up, however, there are problems that an operation involving a plurality of steps or exchange of sample is difficult, the latitude in the system construction is narrow, and the dead volume is large because the driving medium is the solution itself. The liquid droplet (liquid plug) system is a different system from the continuous flowing system. In this system, liquid droplets partitioned by air are moved inside the reactor or in the channel reaching the reactor and individual liquid droplets are driven by the air pressure. At this time, a vent structure of allowing an air between the liquid droplet and the channel wall or between liquid droplets to escape outside according to the necessity or a valve structure for keeping the pressure in the branched channel independent from other portions must be provided in the inside of the reactor system. Furthermore, since the liquid droplets are operated by controlling the pressure difference, a pressure control system comprising a pressure source and a changeover valve must be constructed in the outside. As such, the liquid droplet system is slightly complicated in the apparatus construction or reactor structure, however, a multi-stage operation of individually operating a plurality of liquid droplets and sequentially performing several reactions can be performed and therefore, the latitude in the system construction is broadened.

As for the driving system for performing the control of fluid, commonly and widely employed are an electrical driving method where a high voltage is applied to both ends of the channel to generate an electroosmosis flow and the fluid is moved by the flow, and a pressure driving method where a pressure source is prepared in the outside and the fluid is moved by applying a pressure. The difference between these two methods is as follows. For example, the fluid is known to behave to give a flat distribution for the flow rate profile in the cross section of channel in the case of electrical driving system and to give a hyperbolic distribution with the flow rate being high in channel center part and low in the wall surface part in the case of pressure driving system. For the purpose of moving the fluid while keeping the shape of sample plug or the like, the electrical driving system is suitable. In performing the electrical driving system, the inside of channel must be filled with a fluid and therefore, a continuous flowing system must be employed. However, the fluid can be operated by the electrical control and therefore, a relatively complicated treatment of, for example, continuously changing the mixing ratio of two kinds of solutions and forming a concentration gradient with the passage of time is realized. In the case of the pressure driving system, the control can be attained irrespective of electrical properties of the fluid and secondary effects of affecting the substrate, such as heat generation or electrolysis, do not occur. Therefore, the application range of this system is broad. However, a pressure source must be prepared in the outside and the response properties in the operation change according to the size of dead volume in the pressure system, therefore, automatization of complicated treatments is necessary.

The method for the control of fluid is appropriately selected according to the purpose but preferred is a pressure driving method using a continuous flowing system.

The temperature of the micromixer which is the mixing vessel of the present invention may be controlled by placing the apparatus as a whole in a container under temperature control. Or, by providing a heater structure such as metal resistance wire or polysilicon in the apparatus, a thermal cycle of using the heater structure for heating and performing the cooling by spontaneous cooling may be performed. The sensing of the temperature is performed as follows. In use of a metal resistance wire, the same resistance wire as the heater is additionally provided and the temperature is sensed based on the change in the resistance value. In use of polysilicon, the sensing is performed using a thermocouple. The heating and cooling may also be performed from the outside by contacting a Peltier device with the reactor. The method used is selected according to the use end or the material of the reactor body.

Among the above-described three kinds of mixing vessels, preferred are (1) a mixing vessel of stirring solutions using two or more rotary shafts in a closed stirring tank and (2) a mixing vessel of stirring solutions turned into a linear jet steam.

In the emulsion according to the production process of the present invention, 50% or more of the entire projected area is preferably occupied by tabular grains having an epitaxial junction at least at one apex part of six apex parts of a hexagon. More preferably, 70% or more of the entire projected area is preferably occupied by tabular grains having an epitaxial junction at least at one apex part of six apex parts of a hexagon. The apex part as used herein means, in a fan portion centered in one apex on viewing a tabular grain from the vertical direction with respect to the main plane and defined by two sides constituting that apex, the area within a radius corresponding to ⅓ of the length of the shorter side out of those two sides. In the case where the main plane of the tabular grain has a rounded triangular or hexagonal shape, the apex and side of the main plane are the apex and side of an imaginary triangle or hexagon formed by extending respective sides. Unlike the above-described epitaxial emulsion, an epitaxial junction is usually formed on sides other than in the main plane or apex part of a tabular grain.

The epitaxial emulsion preferred in the present invention can be judged as follows. On an electron microphotograph by a replica of tabular grains, 100 or more grains are selected and classified into three groups, a grain having an epitaxial junction at one or more apex part, a group having an epitaxial junction only on side or main plane, and a grain having no epitaxial junction. An emulsion where 50% or more of the entire projected area is occupied by grains having an epitaxial junction at one or more apex comes under the epitaxial emulsion preferred in the present invention. An emulsion where 90% or more of the entire projected area is occupied by the above-described epitaxial grains is more preferred.

The epitaxial part is silver chloride, silver chlorobromide or silver iodochlorobromide. The silver chloride content of the epitaxial part is preferably 1 mol % or more higher than that of the host tabular grain (a grain as a substrate before the junction of an epitaxial part). The silver chloride content is more preferably 10 mol % or more higher than that of the host tabular grain. However, the silver chloride content of the epitaxial part is 50 mol % or less. The silver bromide content of the epitaxial part is preferably 30 mol % or more, more preferably 50 mol % or more, and the silver iodide content of the epitaxial part is preferably from 1 to 20 mol %. The silver amount of the epitaxial part is preferably from 1 to 10 mol %, more preferably from 2 to 7 mol %, based on the silver amount of the host tabular grain.

In the emulsion produced by the present invention, 70% or more of the entire projected area is preferably occupied by tabular grains having at least one dislocation line in the epitaxial part. Preferably, 80% or more of the entire projected area is occupied by tabular grains having at least one dislocation line in the epitaxial part. In the emulsion of the present invention, 70% or more of the entire projected area is occupied by tabular grains having network dislocation lines in the epitaxial part. Most preferably, 80% or more of the entire projected area is occupied by tabular grains having network dislocation lines in the epitaxial part. The network dislocation lines as used herein means that a plurality of dislocation lines which cannot be counted are intercrossed. In a tabular grain having an epitaxial junction at two or more apex parts, it is not always necessary that a dislocation line is present in the epitaxial parts. Insofar as one dislocation line, preferably network dislocation lines, is contained in the epitaxial part joined at least at one apex part, the emulsion is the epitaxial emulsion preferred in the present invention. Preferably, 70% or more of the epitaxial part present at the apex part contains network dislocation lines.

In the present invention, 70% or more of the entire projected area preferably has no dislocation line other than in the epitaxial junction part. The dislocation line provides a preferential deposition site for the epitaxial deposition and inhibits the formation of an epitaxial tabular grain of the present invention. Preferably, 70% or more of the entire projected area has 0 dislocation line. Here, the epitaxial-deposited site is excluded. Most preferably, 90% or more of the entire projected area has 0 dislocation line. The dislocation line of a tabular grain can be observed by a direct method using a transmission electron microscope at a low temperature described, for example, in J. F. Hamilton, *Phot. Sci. Eng.*, Vol. 11, page 57 (1967) and T. Shiozawa, *J. Soc. Phot. Sci. Japan*, Vol. 35, page 213 (1972). More specifically, silver halide grains taken out from an emulsion while taking care not to impose a pressure high enough to cause generation of a dislocation line on grains are placed on a mesh for the observation by an electron microscope and the sample cooled to prevent the damage (e.g., print out) by an electron beam is observed according to a transmission process. At this time, as the thickness of the grain is larger, the electron beam is more difficult to transmit. Therefore, a high-pressure type (200 kV or more for a grain having a thickness of 0.25 μm) electron microscope is used for more clearly observing the grains. From a photograph of grains obtained by such a method, the site and number of dislocation lines when viewed from the vertical direction with respect to the main plane can be determined on each grain.

In the emulsion of the present invention, 70% or more, preferably 80% or more, of the entire projected area is occupied by tabular grains having an epitaxial junction protruded toward the side face direction of an epitaxial junction host tabular grain which has a terrace-like epitaxial junction on the main plane at the apex part of a host tabular grain. A tabular grain having an epitaxial junction protruded toward the side face direction of a host tabular grain from the apex on the main plane and a tabular grain having a terrace-like epitaxial junction on the main plane at the apex part of a host tabular grain are distinguished as follows. From a replica process electron microphotograph of tabular grains, 100 or more grains are selected and a grain where the area of the portions not overlapping the apex part and protruded toward the side face direction occupies 60% or more of the entire projected area of epitaxial parts per one grain is defined as a tabular grain having an epitaxial junction protruded toward the side face direction of a host tabular grain. Unless this shape is kept by control after the epitaxial deposition, the epitaxial depositions are re-oriented and thereby, the dislocation line disappears.

The epitaxial tabular emulsion satisfying the above-described conditions, which is preferred in the present invention, can be lowered in the pBr of the emulsion. The pBr can be lowered to 3.5 or less and thereby, the storability can be remarkably improved.

The preparation process of the epitaxial emulsion preferred in the present invention is specifically described below. The preparation of host tabular grain and the preparation of epitaxial part are described in detail.

The host tabular grain necessary for the preparation of the epitaxial emulsion of the present invention is described below. The host tabular grain of the present invention is preferably a multi-structure grain where the silver iodide distribution has a double or greater structure. The term "silver iodide distribution has a structure" as used herein means that the difference in the silver iodide content among respective structures is 0.5 mol % or more, preferably 1 mol % or more. In the present invention, the term "outermost layer" of a host tabular grain means a layer phase present in the most outside of a multiple structure regarding the silver iodide distribution. The structure regarding the silver iodide distribution can be fundamentally determined by the calculation using the formulation values in the preparation process of grain. At the interface between respective structures, the silver iodide content may abruptly change or gradually change. For confirming this, the above-described EPMA method is effective, though the measurement precision in the analysis must be taken account of. By this means, the silver iodide distribution in grain when a tabular grain is viewed from the direction vertical to the main plane can be analyzed. Also, by using a sample after hardening the sample and cutting it into an ultrathin specimen using a microtome, the silver iodide distribution in grain on the cross section of a tabular grain can be analyzed.

In the present invention, the outermost layer of a host tabular grain preferably has a silver iodide content of 10 mol % or more. The outermost layer preferably occupies 20% or less, more preferably from 5 to 20%, of the entire silver amount and the silver iodide content thereof occupies from 15 to 30 mol %. Here, the ratio of the outermost layer means a ratio of the silver amount used for the preparation of the outermost layer to the silver amount used for obtaining a final grain in the preparation of a host tabular grain. The ratio of the silver iodide content means a molar ratio in percentage of the silver iodide amount used for the preparation of the outermost layer to the silver amount used for the preparation of the outermost layer. The distribution thereof may be or may not be uniform. In the case where the silver iodide content distribution is not uniform, the silver iodide content is an average value in the outermost layer. More preferably, the outermost layer occupies from 10 to 15% of the entire silver amount and the silver iodide content occupies from 15 to 25 mol %.

Examples of silver halide solvent which can be used in the present invention include (a) organic thioethers described in U.S. Pat. Nos. 3,271,157, 3,531,286 and 3,574,628, JP-A-54-1019 and JP-A-54-158917, (b) thiourea derivatives described in JP-A-53-82408, JP-A-55-77737 and JP-A-55-2982, (c) silver halide solvents having a thiocarbonyl group interposed between an oxygen or a sulfur atom and a nitrogen atom described in JP-A-53-144319, (d) imidazoles described in JP-A-54-100717, (e) sulfites, (f) ammonia and (g) thiocyanates.

Preferred solvents are thiocyanates, ammonia and tetramethylthiourea. The amount of the solvent used varies depending on the kind of the solvent but, for example, in the case of thiocyanate, the amount is preferably from $1\times10^{-4}$ to $1\times10^{-2}$ mol per mol of silver halide.

The method for changing the plane index of a side face of the tabular grain emulsion is described in EP-A-515,894. A polyalkylene oxide compounds described, for example, in U.S. Pat. No. 5,252,453 may also be used. Use of plane index modifiers described, for example, in U.S. Pat. Nos. 4,680,254, 4,680,255, 4,680,256 and 4,684,607 is an effective method. The photographic spectral sensitizing dyes commonly used can also be used as the plane index modifier same as above.

In the present invention, the host tabular grain preferably has no dislocation line. By using in combination the nucleation, ripening and growth steps which are described in detail above, the dislocation line can be eliminated.

The epitaxial junction necessary for the preparation of the epitaxial emulsion preferred in the present invention is described in detail below. The epitaxial deposition may be immediately performed after the formation of host tabular grains or may be performed after normal desalting subsequent to the formation of host tabular grains.

The host tabular grain emulsion before the epitaxial deposition preferably contains gelatin having a molecular weight distribution measured according to PAGI method such that a high molecular weight component having a molecular weight of about 2,000,000 or more is in the range from 5 to 30% and a low molecular weight component having a molecular weight of about 100,000 or less is in the range of 55% or less, more preferably gelatin having a molecular weight distribution measured according to PAGI method such that a high molecular weight component having a molecular weight of about 2,000,000 or more is in the range from 5 to 15% and a low molecular weight component having a molecular weight of about 100,000 or less is in the range of 50% or less. At the time of performing the epitaxial junction, the high molecular weight gelatin is added in an amount of 10 mass % (weight%) or more, preferably 30 mass % or more, more preferably 50 mass % or more, based on the entire gelatin amount. The addition of this gelatin before the coating is also effective but the effect is small.

The gelatin for use in the present invention may be subjected to various modification treatments described below. Examples of the modified gelatin include phthalated gelatin with an amino group being modified, succinated gelatin, trimellited gelatin, pyromellited gelatin, esterified gelatin with a carboxyl group being modified, amidated gelatin, formylated gelatin with an imidazole group being modified, oxidation-treated gelatin reduced in the methionine group, and reduction-treated gelatin increased in the methionine group.

Other than these, hydrophilic colloid can also be used.

Examples of the hydrophilic colloid which can be used include proteins such as gelatin derivatives, graft polymers of gelatin to other polymer, albumin and casein; sugar derivatives such as cellulose derivatives (e.g., hydroxyethylcellulose, carboxymethylcellulose, cellulose sulfates), sodium alginate and starch derivatives; and various synthetic hydrophilic polymer substances including homo- or copolymers such as polyvinyl alcohol, polyvinyl alcohol partial acetal, poly-N-vinylpyrrolidone, polyacrylic acid, polymethacrylic acid, polyacrylamide, polyvinylimidazole and polyvinylpyrazole. As for the gelatin, not only lime-treated gelatin but also acid-treated gelatin and enzyme-treated gelatin described in *Bull. Soc. Sci. Photo. Japan*, No. 16, page 30 (1966) may be used. Also, hydrolysate and enzymolysate of gelatin may be used.

For the preparation of epitaxial emulsion, the pH, the pAg, and the species, concentration and viscosity of gelatin are selected. Particularly, the pH is important and the pH is preferably from 4 to 5.5, more preferably from 4.5 to 5. By setting the pH to this range, the epitaxial deposition can be uniformly performed among grains and the effect of the present invention can be remarkably brought out.

A sensitizing dye is preferably used as the epitaxial junction site indicator. The position for the epitaxial deposition can be controlled by selecting the amount and kind of dye used. The dye is preferably added in an amount of 50 to 90% of the saturation coverage. The dye used here includes a cyanine dye, a merocyanine dye, a complex cyanine dye, a complex merocyanine dye, a holopolar cyanine dye, a hemicyanine dye, a styryl dye and a hemioxonol dye. Among these dyes, particularly useful are the dyes belonging to cyanine dye. To these dyes, any nucleus usually used for cyanine dyes as a basic heterocyclic nucleus can be applied. Examples of the nucleus include a pyrroline nucleus, an oxazoline nucleus, a thiazoline nucleus, a pyrrole nucleus, an oxazole nucleus, a thiazole nucleus, a selenazole nucleus, an imidazole nucleus, a tetrazole nucleus, a pyridine nucleus, a nucleus resulting from fusion of an alicyclic hydrocarbon ring to the above-described nucleus, and a nucleus resulting from fusion of an aromatic hydrocarbon ring to the above-described nucleus, such as indolenine nucleus, benzindolenine nucleus, indole nucleus, benzoxazole nucleus, naphthoxazole nucleus, benzothiazole nucleus, naphthothiazole nucleus, benzoselenazole nucleus, benzimidazole nucleus and quinoline nucleus. On the carbon atom of these nuclei, a substituent may be present. The above-described sensitizing dyes may also be used for the purpose of spectral sensitization.

These sensitizing dyes may be used either individually or in combination of two or more thereof. The combination of sensitizing dyes is often used for the purpose of supersensitization. Representative examples thereof are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, British Patents 1,344,281 and 1,507,803, JP-B-43-4936 (the term "JP-B" as used herein means an "examined Japanese patent publication"), JP-B-53-12375, JP-A-52-110618 and JP-A-52-109925.

Together with the sensitizing dye, a dye which itself has no spectral sensitization effect or a substance which absorbs substantially no visible light, but which exhibits supersensitization may be added simultaneously or separately.

When the silver iodide content in the extreme surface layer of the outermost layer of a host tabular grain is set higher than that of the outermost layer at the adsorption of a sensitizing dye, this is preferred for the preparation of epitaxial emulsion. In advance of the addition of a sensitizing dye, iodide ion is added. The above-described AgI fine grain emulsion is preferably added to increase the silver iodide content on the surface of the host tabular grain. This enables uniform distribution of the silver iodide content among grains and uniform adsorption of a sensitizing dye, whereby the epitaxial emulsion of the present invention can be prepared. The amount of the iodide ion or silver iodide added is preferably from $1\times10^{-4}$ to $1\times10^{-2}$ mol, more preferably from $1\times10^{-3}$ to $5\times10^{-3}$ mol, per mol of the silver amount of the host tabular grain.

The epitaxial part may be formed by a method of simultaneously adding a solution containing halide ion and a solution containing $AgNO_3$, a method of separately adding these solutions, or a method of appropriately combining this addition with the addition of AgCl fine grain, AgBr fine grain or AgI fine grain having a grains size smaller than the host tabular grain or with the addition of mixed crystal grains thereof. The addition time in adding an $AgNO_3$ solution is preferably 30 seconds to 10 minutes, more preferably from 1 to 5 minutes. For the formation of an epitaxial emulsion, the concentration of the silver nitrate solution added is preferably 1.5 mol/liter or less, more preferably 0.5 mol/liter or less. At this time, the stirring in the system must be efficiently performed and the viscosity in the system is preferably lower.

The silver amount in the epitaxial part is preferably from 1 to 10 mol %, more preferably from 2 to 7 mol %, based on the silver amount of the host tabular grain. If the silver amount in the epitaxial part is too small, an epitaxial emulsion cannot be prepared, whereas if it is too large, the epitaxial emulsion becomes unstable.

At the formation of the epitaxial part, the pBr is preferably 3.5 or more, more preferably 4.0 or more. The temperature is preferably 35 to 45° C. At this formation of epitaxial part, a hexacyano metal complex is preferably doped.

Among hexacyano metal complexes, those containing iron, ruthenium, osmium, cobalt, rhodium, iridium or chromium are preferred. The amount of the metal complex added is preferably from $10^{-9}$ to $10^{-2}$, more preferably from $10^{-8}$ to $10^{-4}$, per mol of silver halide. The metal complex can be added after dissolving it in water or an organic solvent. The organic solvent preferably has miscibility with water. Examples of the organic solvent include alcohols, ethers, glycols, ketones, esters and amides.

The metal complex is particularly preferably a hexacyano metal complex represented by the following formula (I). By the use of an emulsion using a hexacyano metal complex, an effect of giving a light-sensitive material having high sensitivity and even when the light-sensitive material is stored for a long period time, preventing the generation of fog can be obtained.

$[M(CN)_6]^{n-}$           (I)

(wherein M is iron, ruthenium, osmium, cobalt, rhodium, iridium or chromium, and n is 3 or 4).

Specific examples of the hexacyano metal complex are set forth below.

$[Fe(CN)_6]^{4-}$           (I-1)

$[Fe(CN)_6]^{3-}$           (I-2)

$[Ru(CN)_6]^{4-}$           (I-3)

$[Os(CN)_6]^{4-}$           (I-4)

$[Co(CN)_6]^{3-}$           (I-5)

$[Rh(CN)_6]^{3-}$           (I-6)

$[Ir(CN)_6]^{3-}$           (I-7)

$[Cr(CN)_6]^{4-}$           (I-8)

The counter cation of the hexacyano metal complex is preferably miscible with water and has adaptability for the operation of precipitating the silver halide emulsion. Examples of the counter cation include an alkali metal ion (e.g., sodium ion, potassium ion, rubidium ion, cesium ion, lithium ion), ammonium ion and alkylammonium ion.

The preparation of the host silver halide tabular grain of the present invention comprises three steps of nucleation, ripening and growth. In the nucleation step, silver halide grains working out to nuclei are prepared by adding a water-soluble silver solution and an aqueous halide solution to an aqueous solution containing a protective colloid such as gelatin, a halide and the like, which is in a amount sufficiently large for stirring the reaction solution. At this time, the water-soluble silver solution and the aqueous halide solution are preferably added simultaneously.

The water-soluble silver solution for use in the present invention is preferably an aqueous silver nitrate solution. As the aqueous halide solution used in the present invention, an aqueous solution of potassium bromide, sodium bromide, potassium chloride, sodium chloride, potassium iodide, sodium iodide and a mixture thereof is used.

In the present invention, the silver concentration (concentration of all silvers contained in the emulsion) of the reaction solution after the addition of a water-soluble silver solution in the nucleation step before the initiation of ripening step is from 0.0015 to 0.015 mass %, more preferably from 0.005 to 0.013 mass %. The concentration of the water-soluble silver solution added at the nucleation is preferably from 0.001 to 10 mass %, more preferably from 0.01 to 1 mass %. At the addition of the water-soluble silver solution and the aqueous halide solution, the temperature of the reactor is preferably from –0 to 30° C., more preferably from 0 to 5° C. By diluting the water-soluble silver salt in the nucleation step or performing the nucleation at a low temperature, fine nuclei can be formed and this is effective for the reduction in the thickness of silver halide tabular grain. A combination use of these two methods is more effective. These methods are effective particularly for preparing tabular grains having a large size and a small grain thickness. The composition of the aqueous halide solution is preferably iodobromide having an iodide content of 0 to 10 mol %, more preferably from 0 to 5 mol %, still more preferably from 0 to 3 mol %.

The protective colloid for use in the nucleation step is preferably gelatin having a small methionine content described in U.S. Pat. Nos. 4,713,320 and 4,942,120, more preferably a low molecular weight gelatin. It is also preferred to perform the nucleation at a high pBr as described in U.S. Pat. No. 4,914,014. Specifically, the pBr is preferably from 2 to 7, more preferably from 2 to 5. The pBr as used herein means a logarithm of a reciprocal of the bromide ion concentration. The nucleation is preferably performed within a short period of time described in JP-A-2-222940, more preferably within 1 minute.

In the ripening step of the tabular grain emulsion of the present invention, the ripening may be performed in the presence of a low-concentration base described in U.S. Pat. No. 5,254,453 or at a pH described in U.S. Pat. No. 5,013,641. A polyalkylene oxide compound described in U.S. Pat. Nos. 5,147,771, 5,147,772, 5,147,773, 5,171,659, 5,210,013 and 5,252,453 may be added in the ripening step or in the later growth step. In the present invention, the ripening step is preferably performed at a temperature of 50 to 80° C. Immediately after the nucleation or until the completion of ripening, additional gelatin is preferably added. The gelatin is preferably a modified gelatin where 95% or more of the amino group is succinated or trimellited.

In the present invention, the silver halide tabular grain preferably contains in the inside thereof a coordination metal complex or metal ion containing a metal belonging to the elements of Groups III to XIV of the periodic table. The metal of the coordination metal complex or metal ion may be selected from the elements of Groups III to XIV in the periodic table having Group numbers of I to XVIII from the left. The metal is preferably selected from the metals belonging to the elements of Groups IV, V and VI of the periodic table, more preferably from vanadium, chromium, manganese, iron, cobalt, nickel, niobium, molybdenum, ruthenium, rhodium, palladium, tantalum, tungsten, rhenium, osmium, iridium, platinum and lead. The metal is particularly preferably an iridium complex. The metal may be used as a metal ion in the form of a metal salt such as ammonium salt, acetate, nitrate, sulfate, phosphate and hydroxide, however, by using the meal as a mononuclear coordination metal salt such as six-coordinated complex salt or four-coordinated complex salt, or as a polynuclear or multinuclear metal complex salt, the performance owing to the ligand or complex salt structure can also be brought out. Preferred examples of the ligand include anionic ligands such as fluoride ion, chloride ion, bromide ion, iodide ion, oxide ion, sulfide ion, selenide ion, telluride ion, cyanide ion, thiocyanide ion, selenocyanide ion, tellurocyanide ion, cyanate ion, nitride ion and azide ion, neutral ligands such as water, carbonyl, nitrosyl, thionitrosyl and ammonia, and organic ligands containing one or more carbon-carbon, carbon-hydrogen or carbon-nitrogen-hydrogen bond, such as 4,4'-bipyridine, pyrazine and thiazole disclosed in U.S. Pat. No. 5,360,712.

Specific examples of the metal ion include those described in *Comprehensive Coordination Chemistry*, Pergamon Press (1987).

Among these metal ions, preferred are hexacyano metal complexes such as hexacyanoiron complex and hexacyanoruthenium complex.

For doping the coordination metal complex or metal ion of the present invention into a silver halide grain, the coordination metal complex or metal ion is preferably added directly to the reaction solution during the formation of silver halide grains or added to the reaction solution during the grain formation after adding it to a solution containing halide ion for forming silver halide grains or other solution. Furthermore, various addition methods may be used in combination.

The coordination metal complex or metal ion capable of satisfying the requirements in the present invention may be incorporated into a silver halide grain in the same concentration per mol of silver as conventionally used for the doping of transition metals. Concentrations over a very wide range are known and the coordination metal complex or metal ion may be used in a concentration from a low concentration of $10^{-10}$ mol per mol of silver disclosed in JP-A-51-107129 to a high concentration of $10^{-3}$ mol per mol of silver disclosed in U.S. Pat. Nos. 3,687,676 and 3,690, 891. The effective concentration greatly varies depending on the content of halide in the grain, the coordination complex or metal ion selected, the oxidation state thereof, the kind of ligand, if present, and the desired photographic effects.

In the present invention, an iridium complex is also preferably used in combination as the metal complex which can be incorporated into a silver halide grain. The iridium complex includes trivalent iridium complex and tetravalent iridium complex. Examples thereof include hexachloroiridium(III) complex salt, hexachloroiridium(IV) complex salt, hexabromoiridium(III) complex salt, hexabromoiridium(IV) complex salt, hexaiodoiridium(III) complex salt, hexaiodoiridium(IV) complex salt, aquapentachloroiridium(III) complex salt, aquapentachloroiridium(IV) complex salt, aquapentabromoiridium(III) complex salt, aquapentabromoiridium(IV) complex salt, aquapentaiodoiridium(III) complex salt, aquapentaiodoiridium(IV) complex salt, diaquatetrachloroiridium(III) complex salt, diaquatetrachloroiridium(IV) complex salt, diaquatetrabromoiridium(III) complex salt, diaquatetrabromoiridium (IV) complex salt, diaquatetraiodoiridium(III) complex salt, diaquatetraiodoiridium(IV) complex salt, triaquatrichloroiridium(III) complex salt, triaquatrichloroiridium(IV) complex salt, triaquatribromoiridium(III) complex salt, triaquatribromoiridium(IV) complex salt, triaquatriiodoiridium(III) complex salt, triaquatriiodoiridium(IV) complex salt, hexamineiridium (III) complex salt and hexamineiridium(IV) complex salt, however, the present invention is by no means limited thereto.

The amount of the iridium complex added is preferably from $10^{-8}$ to $10^{-3}$ mol, more preferably from $10^{-5}$ to $10^{-4}$ mol, per mol of silver halide.

After the epitaxial deposition, the above-described sensitizing dye and/or an antifoggant and/or a stabilizer which are described later are preferably added to the silver halide emulsion.

In the present invention, after the epitaxial deposition, the pBr is preferably lowered. The pBr at 40° C. is preferably lowered to 3.5 or less. The pBr of the emulsion at 40° C. is more preferably 3.0 or less, still more preferably 2.5 or less. The pBr is lowered fundamentally by adding bromide ion such as KBr and NaBr.

After the epitaxial deposition, water washing is usually performed.

The temperature at the water washing can be selected according to the purpose but is preferably selected in the range from 5 to 50° C. The pH at the water washing can also be selected according to the purpose but is preferably selected from 2 to 10, more preferably from 3 to 8. The pAg at the water washing can also be selected according to the purpose but is preferably selected from 5 to 10. The water washing method may be selected from the noodle water washing, the dialysis using a semipermeable membrane, the centrifugal separation, the coagulation precipitation and the ion exchanging. In the case of coagulation precipitation, the method can be selected from a method of using a sulfate, a method of using an organic solvent, a method of using a water-soluble polymer and a method of using a gelatin derivative.

The emulsion of the present invention is preferably chemically sensitized (preferably after the epitaxial precipitation). One of the chemical sensitization methods which can be preferably used in the present invention is the sole use of chalcogenide sensitization or noble metal sensitization, or a combination of these sensitization methods. The chemical sensitization may be performed using active gelatin as described in T. H. James, *The Theory of the Photographic Process*, 4th ed., pp. 67–76, Macmillan (1977), or may be performed using sulfur, selenium, tellurium, gold, platinum, palladium, iridium or a combination of two or more of these sensitizing dyes at a pAg of 5 to 10, a pH of 5 to 8 and a temperature of 30 to 80° C. as described in *Research Disclosure*, Vol. 120, 12008 (April 1974), *Research Disclosure*, Vol. 34, 13452 (June 1975), U.S. Pat. Nos. 2,642,361, 3,297,446, 3,772,031, 3,857,711, 3,901,714, 4,266,018 and 3,904,415, and British Patent 1,315,755.

In the noble metal sensitization, a salt of noble metal such as gold, platinum, palladium and iridium may be used. Among these, gold sensitization, palladium sensitization and a combination use thereof are preferred. In the gold sensitization, known compounds such as chloroauric acid, potassium chloroaurate, potassium aurithiocyanate, gold sulfide and gold selenide may be used. The palladium compound means a divalent or tetravalent palladium salt. Preferred palladium compounds are represented by the formula: $R_2PdX_6$ or $R_2PdX_4$, wherein R represents a hydrogen atom, an alkali metal atom or an ammonium group and X represents a halogen atom selected from chlorine, bromine and iodine atoms. Specifically, $K_2PdCl_4$, $(NH_4)_2PdCl_6$, $Na_2PdCl_4$, $(NH_4)_2PdCl_4$, $Li_2PdCl_4$, $Na_2PdCl_6$ and $K_2PdBr_4$ are preferred. The gold compound and palladium compound are preferably used in combination with a thiocyanate salt or a selenocyanate salt.

Examples of the sulfur sensitizer which can be used include hypo, thiourea-base compounds, rhodanine-base compounds and sulfur-containing compounds described in U.S. Pat. Nos. 3,857,711, 4,266,018 and 4,054,457. The chemical sensitization can also be performed in the presence of a so-called chemical sensitization aid. Useful examples of the chemical sensitization aid include compounds known to inhibit fog in the course of chemical sensitization and increase sensitivity, such as azaindene, azapyridazine and azapyrimidine. Examples of the chemical sensitization aid modifier are described in U.S. Pat. Nos. 2,131,038, 3,411,914 and 3,554,757, JP-A-58-126526 and Duffin, *Chemistry of Photographic Emulsion*, supra, pp. 138–143.

For the emulsion of the present invention, gold sensitization is preferably used in combination. The amount of the gold sensitizer is preferably from $1 \times 10^{-4}$ to $1 \times 10^{-7}$ mol, more preferably from $1 \times 10^{-5}$ to $5 \times 10^{-7}$ mol, per mol of silver halide. The amount of the palladium compound is preferably from $1 \times 10^{-3}$ to $5 \times 10^{-7}$ mol per mol of silver halide. The amount of thiocyanate compound or selenocyanate compound is preferably from $5 \times 10^{-2}$ to $1 \times 10^{-6}$ mol per mol of silver halide.

The amount of the sulfur sensitizer which is preferably used for the silver halide grain of the present invention is preferably from $1 \times 10^{-4}$ to $1 \times 10^{-7}$ mol, more preferably from $1 \times 10^{-5}$ to $5 \times 10^{-7}$ mol, per mol of silver halide.

The sensitization preferred for the emulsion of the present invention includes selenium sensitization. In the selenium sensitization, known labile selenium compounds may be used and specifically, selenium compounds such as colloidal metal selenium, selenoureas (e.g., N,N-dimethylselenourea, N,N-diethylselenourea), selenoketones and selenoamides may be used. In some cases, the selenium sensitization is preferably used in combination with sulfur sensitization, noble metal sensitization, or both thereof.

In the tellurium sensitization, a labile tellurium compound is used and the labile tellurium compounds described in JP-A-4-224595, JP-A-4-271341, JP-A-4-333043, JP-A-5-303157, JP-A-6-27573, JP-A-6-175258, JP-A-6-180478, JP-A-6-208184, JP-A-6-208186, JP-A-6-317867, JP-A-7-140579, JP-A-7-301879 and JP-A-7-301880 may be used.

Specific examples thereof include phosphine tellurides (e.g., normal-butyl-diisopropylphosphine telluride, triisobutylphosphine telluride, tri-normal-butoxyphosphine telluride, triisopropylphosphine telluride), diacyl (di) tellurides (e.g., bis(diphenylcarbamoyl) ditelluride, bis(N-phenyl-N-methylcarbamoyl) ditelluride, bis(N-phenyl-N-methylcarbamoyl) telluride, bis(N-phenyl-N-benzylcarbamoyl) telluride, bis(ethoxycarbonyl) telluride), telluroureas (e.g., N,N'-dimethylethylenetellurourea), telluroamides and telluroesters. Among these, preferred are phosphine tellurides and diacyl (di)tellurides.

The photographic emulsion of the present invention may contain various compounds for the purpose of preventing fog during the production process, storage or photographic processing of a light-sensitive material or stabilizing the photographic performance. That is, a large number of compounds known as an antifoggant or a stabilizer may be added, such as thiazoles (e.g., benzothiazolium salt), nitroimidazoles, nitrobenzimidazoles, chlorobenzimidazoles, bromobenzimidazoles, mercaptothiazoles, mercaptobenzo-thiazoles, mercaptobenzimidazoles, mercaptothiadiazoles, aminotriazoles, benzotriazoles, nirobenzotriazoles, mercaptotetrazoles (particularly 1-phenyl-5-mercaptotetrazole), mercaptopyrimidines, mercaptotriazines (for example, thioketo compounds such as oxazolinethione) and azaindenes (for example, triazaindenes, tetraazaindenes (particularly 4-hydroxy substituted (1,3,3a,7) tetraazaindenes) and pentaazaindenes). For example, those described in U.S. Pat. Nos. 3,954,474 and 3,982,947 and JP-B-52-28660 may be used. One preferred compound is the compound described in JP-A-63-212932. The antifoggant or stabilizer can be added at various stages, for example, before, during or after the grain formation, during the washing with water, during the dispersion after the water washing, during the epitaxial formation, before, during or after the chemical sensitization, or before the coating, in accordance with the purpose. The antifoggant or stabilizer may be used not only for exerting the effect of preventing fog or stabilizing the emulsion by adding it during the preparation of emulsion but also for various purposes of controlling the crystal wall of grain, decreasing the grain size, lowering the grain solubility, controlling the chemical sensitization or controlling the dye arrangement.

In the present invention, a salt of metal ion is preferably allowed to be present during the preparation of emulsion according to the purpose, for example, during the grain formation, epitaxial formation, desalting or chemical sensitization or before the coating. In the case of doping into a grain, the metal ion salt is preferably added during the grain formation, and in the case of use for the modification of grain surface or as a chemical sensitizer, the metal ion salt is preferably added after the grain formation but before the completion of chemical sensitization. The metal ion salt may be doped throughout the grain or may be doped only to the core or shell part of the grain. Examples of the metal which can be used include Mg, Ca, Sr, Ba, Al, Sc, Y, La, Cr, Mn, Fe, Co, Ni, Cu, Zn, Ga, Ru, Rh, Pd, Re, Os, Ir, Pt, Au, Cd, Hg, Tl, In, Sn, Pb and Bi. These metals can be added as long as they are in the form of a salt soluble at the grain formation, such as ammonium salt, acetate, nitrate, sulfate, phosphate, hydroxide, six-coordinated complex salt or four-coordinated complex salt. Examples thereof include $CdBr_2$, $CdCl_2$, $Cd(NO_3)_2$, $Pb(NO_3)_2$, $Pb(CH_3COO)_2$, $K_3[Fe(CN)_6]$, $(NH_4)_4[Fe(CN)_6]$, $K_3IrCl_6$, $(NH_4)_3RhCl_6$ and $K_4Ru(CN)_6$. The ligand of the coordination compound can be selected from halo, aquo, cyano, cyanate, thiocyanate, nitrosyl, thionitrosyl, oxo and carbonyl. Only one of these metal compounds may be used but two or more thereof may be used in combination.

The metal compound is preferably added after dissolving it in water or an appropriate solvent such as methanol and acetone. For stabilizing the solution, a method of adding an aqueous solution of hydrogen halide (e.g., HCl, HBr) or an alkali halide (e.g., KCl, NaCl, KBr, NaBr) may be employed. If desired, an acid, an alkali or the like may be added. The metal compound may be added to the reactor before the grain formation or may be added during the grain formation. Furthermore, the metal compound may be added to a water-soluble silver salt (e.g., $AgNO_3$) or an aqueous solution of alkali halide (e.g., NaCl, KBr, KI) and then continuously added during the formation of silver halide grains. In addition, a solution may be prepared separately from the water-soluble silver salt or alkali halide and continuously added at an appropriate time during the grain formation. A combination use of various addition methods is also preferred.

The silver halide photographic emulsion of the present invention is preferably subjected to reduction sensitization during grain formation, after grain formation but before chemical sensitization, or during or after chemical sensitization.

For performing the reduction sensitization, a method of adding a reduction sensitizer to the silver halide emulsion, a method called silver ripening where the emulsion is grown or ripened in a low pAg atmosphere at a pAg of 1 to 7, or a method called high pH ripening where the emulsion is grown or ripened in a high pH atmosphere at a pH of 8 to 11 may be selected. Also, two or more of these methods may be used in combination.

The method of adding a reduction sensitizer is preferred because the reduction sensitization level can be delicately controlled.

Known examples of the reduction sensitizer include stannous chloride, ascorbic acid and its derivatives, amine and polyamines, hydrazine derivatives, formamidinesulfinic acid, silane compounds and borane compounds. In the present invention, the reduction sensitization may be performed using a reduction sensitizer selected from these known reduction sensitizers, and two or more compounds may also be used in combination. Preferred compounds as the reduction sensitizer are stannous chloride, thiourea dioxide, dimethylamineboran, and ascorbic acid and its derivatives. The amount of the reduction sensitizer added depends on the conditions in the production of emulsion and therefore, must be selected but is suitably from $10^{-7}$ to $10^{-3}$ mol per mol of silver halide.

The reduction sensitizer is dissolved, for example, in water or an organic solvent such as alcohols, glycols, ketones, esters and amides, and then added during the grain growth. The reduction sensitizer may be previously added to the reactor but is preferably added at an appropriate time during the grain growth. Also, the reduction sensitizer may be previously added to an aqueous solution of water-soluble silver slat or water-soluble alkali halide and the silver halide grains may be precipitated using this aqueous solution. It is also preferred to add a solution of reduction sensitizer in parts as the grain grows or continuously add the solution over a long period of time.

During the preparation of the emulsion of the present invention, an oxidizing agent for silver is preferably used. The term "oxidizing agent for silver" as used herein means a compound having a function of acting on metal silver to convert it into silver ion. In particular, a compound capable of converting very small silver grains by-produced during the formation and chemical sensitization of silver halide grains into silver ion is useful. The silver ion produced here may form a silver salt difficultly soluble in water, such as silver halide, silver sulfide and silver selenide, or may form a silver salt easily soluble in water, such as silver nitrate. The oxidizing agent for silver may be an inorganic material or an organic material. Examples of the inorganic oxidizing agent include ozone, hydrogen peroxide and adducts thereof (e.g., $NaBO_2.H_2O_2.3H_2O$, $2NaCO_3.3H_2O_2$, $Na_4P_2O_7.2H_2O_2$, $2Na_2SO_4.H_2O_2.2H_2O$), preoxy acid salts (e.g., $K_2S_2O_8$, $K_2C_2O_6$, $K_2P_2O_8$), peroxy complex compounds (e.g., $K_2[Ti(O_2)C_2O_4].3H_2O$, $4K_2SO_4.Ti(O_2)OH.SO_4 \cdot 2H_2O$, $Na_3[VO(O_2)(C_2H_4)_2].6H_2O$) oxygen acid salts such as permanganate (e.g., $KMnO4$) and chromate (e.g., $K_2Cr_2O_7$), halogen elements such as iodine and bromine, perhalogenates (e.g., potassium periodate), salts of metal having a high valency (e.g., potassium hexacyanoferrate), and thio-sulfonates.

Examples of the organic oxidizing agent include quinones such as p-quinone, organic peroxides such as peracetic acid and perbenzoic acid, and compounds which release active halogen (for example, N-bromosuccinimide, Chloramine T, Chloramine B).

Among these oxidizing agents, preferred in the present invention are inorganic oxidizing agents such as ozone, hydrogen peroxide and an adduct thereof, halogen element and thiosulfonate, and organic oxidizing agents such as quinones. In a preferred embodiment, the above-described reduction sensitization is used in combination with the oxidizing agent for silver. A method of using the oxidizing agent and then performing the reduction sensitization, a method reversed thereto, and a method of allowing both to be present at the same time may be selected. The method may be applied in the grain formation step or in the chemical sensitization step.

The light-sensitive material produced by using the silver halide emulsion obtained in the present invention may be sufficient if at least one blue-sensitive silver halide emulsion layer, at least one green-sensitive silver halide emulsion layer and at least one red-sensitive silver halide emulsion layer are provided on a support and at least one of the blue-sensitive layer, the green-sensitive layer and the red-sensitive layer is constructed by two or more layers different in the sensitivity from each other. The number and order of the silver halide emulsion layers and the light-insensitive layer are not particularly limited. A typical example is a silver halide photographic light-sensitive material having on a support at least one color sensitive layer comprising a plurality of silver halide emulsion layers substantially the same in the color sensitivity but different in the light sensitivity, where the light-sensitive layer is a unit light-sensitive layer having color sensitivity to any one of blue light, green light and red light. In a multilayer silver halide color photographic light-sensitive material, unit light-sensitive layers are generally arranged in the order of a red-sensitive layer, a green-sensitive layer and a blue-sensitive layer from the support side. However, depending upon the purpose, this arrangement order may be reversed or a layer having different light sensitivity may be interposed between the layers having the same color sensitivity.

Also, a light-insensitive layer such as an interlayer may be provided between the above-described silver halide light-sensitive layers or as an uppermost or lowermost layer. This light-insensitive layer may contain a coupler and a DIR compound described in JP-A-61-43748, JP-A-59-113438, JP-A-59-113440, JP-A-61-20037 and JP-A-61-20038, and may contain a color mixing inhibitor commonly used.

The plurality of silver halide emulsion layers constituting each unit light-sensitive layer preferably employ a two-layer structure consisting of high-speed emulsion layer and low-speed emulsion layer as described in German Patent 1,121, 470 and British Patent 923,045. Usually, these emulsion layers are preferably arranged such that the light sensitivity sequentially becomes lower toward the support. A light-insensitive layer may also be provided between respective halide emulsion layers. It is also possible to provide a low-speed emulsion layer farther from the support and provide a high-speed emulsion layer closer to the support as described in JP-A-57-112751, JP-A-62-200350, JP-A-62-206541 and JP-A-62-206543.

Specific examples of the layer arrangement include, from the remotest side from the support, an order of low-speed blue-sensitive layer (BL)/high-speed blue-sensitive layer (BH)/high-speed green-sensitive layer (GH)/low-speed green-sensitive layer (GL)/high-speed red-sensitive layer (RH)/low-speed red-sensitive layer (RL), an order of BH/BL/GL/GH/RH/RL and an order of BH/BL/GH/GL/RL/RH.

Furthermore, as described in JP-B-55-34932, a layer arrangement of blue-sensitive layer/GH/RH/GL/RL in this order from the remotest side from the support may also be employed. In addition, as described in JP-A-56-25738 and JP-A-62-63936, a layer arrangement of blue-sensitive layer/GL/RL/GH/RH in this order from the remotest side from the support may also be employed.

Other examples include an arrangement consisting of three layers different in the light sensitivity described in JP-B-49-15495, where a silver halide emulsion layer having highest light sensitivity is provided as an upper layer, a silver halide emulsion layer having light sensitivity lower than that of the upper layer is provided as an intermediate layer and a silver halide emulsion layer having light sensitivity lower than that of the intermediate layer is provided as a lower layer so as to sequentially decrease the light sensitivity toward the support. Even in this layer structure consisting of three layers different in the light sensitivity, the layers having the same color sensitivity may be provided in the order of medium-speed emulsion layer/high-speed emulsion layer/low-speed emulsion layer from the remote side from the support as described in JP-A-59-202464.

In addition, the layers may also be provided in the order of high-speed emulsion layer/low-speed emulsion layer/medium-speed emulsion layer or low-speed emulsion layer/medium-speed emulsion layer/high-speed emulsion layer.

The layer arrangement may be changed as described above also in the case of structures consisting of four or more layers.

As described above, various layer structures and arrangements may be selected according to the purpose of respective light-sensitive materials.

In the light-sensitive material of the present invention, various additives described above are used but various additives other than those may also be used according to the purpose.

These additives are more specifically described in *Research Disclosure*, Item 17643 (December, 1978), ibid., Item 18716 (November, 1979) and ibid., Item 308119 (December, 1989). The pertinent portions are shown together in the table below.

| Kind of Additives | RD17643 | RD18716 | RD308119 |
|---|---|---|---|
| 1. Chemical sensitizer | p. 23 | p. 648, right col. | p. 996 |
| 2. Sensitivity increasing agent | | p. 648, right col. | |

-continued

| Kind of Additives | RD17643 | RD18716 | RD308119 |
|---|---|---|---|
| 3. Spectral sensitizer, super-sensitizer | pp. 23–24 | p. 648, right col. to p. 649, right col. | p. 996, right to p. 998, right |
| 4. Brightening agent | p. 24 | p. 647, right col. | p. 998, right |
| 5. Antifoggant, stabilizer | pp. 24–25 | p. 649, right col. | p. 998, right to p. 1000, right |
| 6. Light absorbent, filter dye, Uv absorbent | pp. 25–26 | p. 649, right col. to p. 650, left col. | p. 1003, left to right |
| 7. Stain inhibitor | p. 25, right col. | p. 650, left to right cols. | p. 1002, right |
| 8. Dye Image Stabilizer | p. 25 | | p. 1002, right |
| 9. Hardening agent | p. 26 | p. 651, left col. | p. 1004, right to p. 1005, left |
| 10. Binder | p. 26 | p. 651, left col. | p. 1003, right to p. 1004, right |
| 11. Plasticizer, lubricant | p. 27 | p. 650, right col. | p. 1006, left to right |
| 12. Coating aid, surfactant | pp. 26–27 | p. 650, right col. | p. 1005, left to p. 1006, left |
| 13. Antistatic agent | p. 27 | p. 650, right col. | p. 1006, right to p. 1007, left |
| 14. Matting agent | | | p. 1008, left to p. 1009, left |

Furthermore, in order to prevent the deterioration of the photographic performance due to formaldehyde gas, a compound capable of reacting with and thereby fixing the formaldehyde described in U.S. Pat. Nos. 4,411,987 and 4,435,503 is preferably added to the light-sensitive material.

In the present invention, various color couplers can be used. Specific examples thereof are described in the patents cited in supra *Research Disclosure*, No. 17643, VII-C to G, and ibid., No. 307105, VII-C to G.

Preferred examples of the yellow coupler include those described in U.S. Pat. Nos. 3,933,501, 4,022,620, 4,326,024, 4,401,752 and 4,248,961, JP-B-58-10739, British Patents 1,425,020 and 1,476,760, and U.S. Pat. Nos. 3,973,968, 4,314,023 and 4,511,649, and EP-A-249473.

As the magenta coupler, 5-pyrazolone-base compounds and pyrazoloazole-base compounds are preferred. In particular, preferred are those described in U.S. Pat. Nos. 4,310,619 and 4,351,897, European Patent 73,636, U.S. Pat. Nos. 3,061,432 and 3,725,067, *Research Disclosure*, No. 24220 (June, 1984), JP-A-60-33552, *Research Disclosure*, No. 24230 (June 1984), JP-A-60-43659, JP-A-61-72238, JP-A-60-35730, JP-A-55-118034, JP-A-60-185951, U.S. Pat. Nos. 4,500,630, 4,540,654 and 4,556,630, and WO88/04795.

The cyan coupler includes naphthol-base couplers and phenol-base couplers. Preferred are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, German Patent (OLS) No. 3,329,729, EP-A-121365, EP-A-249453, U.S. Pat. Nos. 3,446,622, 4,333,999, 4,775,616, 4,451,559, 4,427,767, 4,690,889, 4,254,212 and 4,296,199, and JP-A-61-42658.

Typical examples of the polymerized dye-forming coupler are described in U.S. Pat. Nos. 3,451,820, 4,080,211, 4,367,282, 4,409,320 and 4,576,910, British Patent 2,102, 137, and EP-A-341188.

As the coupler which provides a colored dye having an appropriate diffusibility, those described in U.S. Pat. No. 4,366,237, British Patent 2,125,570, European Patent 96,570 and German Patent Application (OLS) No. 3,234,533 are preferred.

As the colored coupler for correcting unnecessary absorption of the colored dye, those described in *Research Disclosure*, No. 17643, Item VII-G, ibid., No. 307105, Item VII-G, U.S. Pat. No. 4,163,670, JP-B-57-39413, U.S. Pat. Nos. 4,004,929 and 4,138,258, and British Patent 1,146,368 are preferred. Also, couplers of correcting unnecessary absorption of the colored dye by a fluorescent dye released upon coupling described in U.S. Pat. No. 4,774,181 and couplers containing as a splitting-off group a dye precursor group capable of reacting with a developing agent to form a dye described in U.S. Pat. No. 4,777,120 may be preferably used.

Compounds which release a photographically useful residue upon coupling can also be preferably used in the present invention. With respect to the DIR coupler which releases a development inhibitor, preferred examples thereof include those described in the patents cited in supra RD17643, Item VII-F and ibid., No. 307105, Item VII-F, JP-A-57-151944, JP-A-57-154234, JP-A-60-184248, JP-A-63-37346, JP-A-63-37350, and U.S. Pat. Nos. 4,248,962 and 4,782,012.

With respect to the coupler which imagewise releases a nucleating agent or a developing accelerator at the time of development, those described in British Patents 2,097,140 and 2,131,188, JP-A-59-157638 and JP-A-59-170840 are preferred. Also, compounds which release a fogging agent, a development accelerator, a silver halide solvent or the like by the oxidation-reduction reaction with an oxidation product of a developing agent described in JP-A-60-107029, JP-A-60-252340, JP-A-1-44940 and JP-A-1-45687 are preferred.

Other examples of the compounds which can be used in the light-sensitive material of the present invention include competing couplers described in U.S. Pat. No. 4,130,427, polyequivalent couplers described in U.S. Pat. Nos. 4,283, 472, 4,338,393 and 4,310,618, DIR redox compound-releasing couplers, DIR coupler-releasing couplers, DIR coupler-releasing redox compounds and DIR redox-releasing redox compounds described in JP-A-60-185950 and JP-A-62-24252, couplers which release a dye capable of retrieving the color after the release described in EP-A-173302 and EP-A-313308, bleach accelerator-releasing couplers described in RD. Nos. 11449 and 24241, and JP-A-61-201247, ligand-releasing couplers described in U.S. Pat. No. 4,555,477, leuco dye-releasing couplers described in JP-A-63-75747, and fluorescent dye-releasing couplers described in U.S. Pat. No. 4,774,181.

The couplers for use in the present invention can be incorporated into the light-sensitive material by various known dispersion methods.

Examples of the high boiling point solvent which is used in the oil-in-water dispersion method are described, for example, in U.S. Pat. No. 2,322,027.

Specific examples of the high boiling point organic solvent having a boiling point of 175° C. or more at atmospheric pressure, which is used in the oil-in-water dispersion method, include phthalic acid esters (e.g., dibutyl phthalate, dicyclohexyl phthalate, di-2-ethylhexyl phthalate, decyl phthalate, bis (2,4-di-tert-amylphenyl) phthalate, bis(2,4-di-tert-amylphenyl) isophthalate, bis(1, 1-diethylpropyl) phthalate); phosphoric acid or phosphonic acid esters (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphonate); benzoic acid esters (e.g., 2-ethylhexyl benzoate, dodecyl benzoate, 2-ethylhexyl-p-hydroxy benzoate); amides (e.g., N,N-diethyldodecanamide, N,N-diethyllaurylamide, N-tetradecylpyrrolidone); alcohols or phenols (e.g., isostearyl alcohol, 2,4-di-tert-amylphenol); aliphatic carboxylic acid esters (e.g., bis(2-ethylhexyl) sebacate, dioctyl azelate, glycerol tributyrate, isostearyl lactate, trioctyl citrate); aniline derivatives (e.g., N,N-dibutyl-2-butoxy-5-tert-octylaniline); and hydrocarbons (e.g., paraffin, dodecylbenzene, diisopropylnaphthalene). As an auxiliary solvent, for example, an organic solvent having a boiling point of about 30° C. or more, preferably from 50 to about 160° C., may be used. Typical examples thereof include ethyl acetate, butyl acetate, ethyl propionate, methyl ethyl ketone, cyclohexanone, 2-ethoxyethyl acetate and dimethylformamide.

The process and effects of the latex dispersion method and specific examples of the latex for impregnation are described, for example, in U.S. Pat. No. 4,199,363, and German Patent Application (OLS) Nos. 2,541,274 and 2,541,230.

The color light-sensitive material preferably contains an antiseptic or fungicide of various types and examples thereof include phenethyl alcohol and those described in JP-A-63-257747, JP-A-62-272248 and JP-A-1-80941, such as 1,2-benzoisothiazolin-3-one, n-butyl-p-hydroxybenzoate, phenol, 4-chloro-3,5-dimethylphenol, 2-phenoxyethanol and 2-(4-thiazolyl)benzimidazole.

The present invention can be applied to various light-sensitive materials but is preferably applied to various color light-sensitive materials. Representative examples thereof include color negative film for common use or motion picture, color reversal film for slide or television, color paper, color positive film, and color reversal paper. Particularly, the present invention can also be preferably used for color dupe film.

Suitable examples of the support which can be used in the present invention include those described in supra RD, No. 17643, page 28, ibid., No. 18716, from page 647, right column to page 648, left column, and ibid., No. 307105, page 879.

In the light-sensitive material, the total thickness of all hydrophilic colloidal layers on the side having emulsion layers is preferably 28 μm or less, more preferably 23 μm or less, still more preferably 18 μm or less, particularly preferably 16 μm or less. The film swelling rate $T_{1/2}$ is preferably 30 seconds or less, more preferably 20 seconds or less. The "film thickness" as used herein means a film thickness determined under the control of humidity (2 days) at a temperature of 25° C. and a relative humidity of 55%. The film swelling rate $T_{1/2}$ can be determined by a method known in this technical field, for example, by means of a swellometer described in A. Green et al., Photogr. Sci. and Eng., Vol. 19, No. 2, pp. 124–129. The film swelling rate $T_{1/2}$ is defined as a time spent until half the saturated film thickness is reached, where the saturated film thickness is 90% of the maximum swelled film thickness reached on the processing with a color developer at 30° C. for 3 minutes and 15 seconds.

The film swelling rate $T_{1/2}$ can be adjusted by adding a film hardening agent to gelatin used as a binder or changing the aging conditions after the coating.

In the light-sensitive material, a hydrophilic colloidal layer (hereinafter referred to as a "back layer") having a total dry thickness of 2 to 20 μm is preferably provided on the side opposite the side having emulsion layers. This back layer preferably contains, for example, the above-described light absorbent, filter dye, ultraviolet absorbent, antistatic agent, hardening agent, binder, plasticizer, lubricant, coating aid and surface active agent. The back layer preferably has a percentage swelling of 150 to 500%.

The color photographic light-sensitive material can be developed by an ordinary method described in supra RD, No. 17643, pp. 28–29, ibid., No. 18716, page 651, from left to right columns, and ibid., No. 307105, pp. 880–881.

The color developer for use in the development processing of the light-sensitive material of the present invention is preferably an alkaline aqueous solution mainly comprising an aromatic primary amine color developing agent. As the color developing agent, an aminophenol-base compound is useful but a p-phenylenediamine-base compound is preferred and representative examples thereof include 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-β-methoxyethylaniline, and sulfates, hydrochlorides and p-toluenesulfonates thereof. Among these, particularly preferred is a sulfate of 3-methyl-4-amino-N-ethyl-N-β-hydroxyethylaniline. If desired, these compounds can be used in combination of two or more thereof.

The color developer in general contains, for example, a pH buffering agent such as carbonate, borate or phosphate of an alkali metal, and a development inhibitor or antifoggant such as chloride salt, bromide salt, iodide salt, benzimidazoles, benzothiazoles and mercapto compounds. The color developer may also contain, if desired, a preservative of various types, such as hydroxylamine, diethylhydroxylamine, sulfite, hydrazines (e.g., N,N-biscarboxymethylhydrazine), phenylsemicarbazides, triethanolamine and catecholsulfonic acids; an organic solvent such as ethylene glycol and diethylene glycol; a development accelerator such as benzyl alcohol, polyethylene glycol, quaternary ammonium salts and amines; a dye-forming coupler; a competing coupler; an auxiliary developing agent such as 1-phenyl-3-pyrazolidone; a tackifying agent; and a chelating agent of various types, including aminopolycarboxylic acid, aminopolyphosphonic acid, alkylphosphonic acid and phosphonocarboxylic acid. Representative examples of the chelating agent include ethylenediaminetetraacetic acid, nitrilotriacetic acid, diethylenetriaminepentaacetic acid, cyclohexanediamine-tetraacetic acid, hydroxyethyliminodiacetic acid, 1-hydroxyethylidene-1,1-diphosphonic acid, nitrilo-N,N,N-trimethylenephosphonic acid, ethylenediamine-N,N,N,N-tetra-methylenephosphonic acid, ethylenediamine-di(o-hydroxy-phenylacetic acid) and salts thereof.

In the case of performing reversal processing, the color development is usually performed after black-and-white development is performed. The black-and-white developer can use, for example, known black-and-white developing agents individually or in combination, such as dihydoxy-benzenes (e.g., hydroquinone), 3-pyrazolidones (e.g., 1-phenyl-3-pyrazolidone) and aminophenols (e.g., N-methyl-p-aminophenols). The color developer and the black-and-white developer each usually has a pH of 9 to 12. Although the replenishing amount of these developers varies depending on the color photographic light-sensitive material processed, it is generally 3 liter (hereinafter, "liter" is sometimes denoted as "L") or less per m² of the light-sensitive material and when the bromide ion concentration in the replenisher is lowered, the replenishing amount can be reduced even to 500 ml (hereinafter, "milli-liter" is sometimes denoted as "mL") or less. In the case of reducing the replenishing amount, the contact area of the processing solution with air is preferably reduced to prevent evaporation or air oxidation of the solution.

The contact area of the photographic processing solution with air in a processing tank can be shown by an opening ratio defined below.

Opening ratio=[contact area (cm²) of processing solution with air)]÷[volume of processing solution (cm³)]

The opening ratio defined above is preferably 0.1 or less, more preferably from 0.001 to 0.05. The opening ratio can be reduced, for example, by a method of providing a shielding material such as floating lid on the surface of the photographic processing solution in the processing tank, a method of using a movable lid described in JP-A-1-82033 or a slit development processing method described in JP-A-63-216050. The opening ratio is preferably reduced not only in two steps of color development and black-and-white development but also in all subsequent steps such as bleaching, bleach-fixing, fixing, water washing and stabilization. The replenishing amount can also be reduced by using means for suppressing the accumulation of bromide ion in the developer.

The color development time is usually set to from 2 to 5 minutes, however, the processing time can be further shortened by setting high temperature and high pH conditions and using a color developing agent in a high concentration.

After color development, the photographic emulsion layer is usually subjected to bleaching. The bleaching may be performed simultaneously with fixing (bleach-fixing) or these may be performed separately. For the purpose of attaining rapid processing, a processing method of performing bleaching and then bleach-fixing may also be used. Furthermore, a method of performing the processing in a bleach-fixing bath consisting of two continued tanks, a method of performing fixing before the bleach-fixing or a method of performing bleaching after the bleach-fixing may be freely selected and used according to the purpose. Examples of the bleaching agent include compounds of a polyvalent metal such as iron(III), peracids (particularly, sodium persulfate is suitable for cinematic color negative film), quinones and nitro compounds. Representative examples of the bleaching agent include organic complex salts of iron(III), for example, complex salts with an aminopolycarboxylic acid such as ethylenediaminetetraacetic acid, diethylenetriaminepentaacetic acid, cyclohexanediaminetetraacetic acid, methyliminodiacetic acid, 1,3-diaminopropanetetraacetic acid or glycol ether diaminetetraacetic acid, and complex salts with citric acid, tartaric acid or malic acid. Among these, aminopolycarboxylic acid ferrate complex salts including ethylenediaminetetraacetato ferrate complex salt and 1,3-diaminopropanetetraacetato ferrate complex salt are preferred in view of rapid processing and prevention of environmental pollution. The aminopolycarboxylic acid ferrate complex salts are particularly useful for both the bleaching solution and the bleach-fixing solution. The bleaching solution or bleach-fixing solution using the aminopolycarboxylic acid ferrate complex salt usually has a pH of from 4.0 to 8 but the processing may be performed at a lower pH for attaining rapid processing.

A bleaching accelerator may be used, if desired, in the bleaching solution, the bleach-fixing solution or a prebath thereof. Specific examples of useful bleaching accelerators include compounds described in the following specifications: for example, compounds having a mercapto group or a disulfide group described in U.S. Pat. No. 3,893,858, German Patent Nos. 1,290,812 and 2,059,988, JP-A-53-32736, JP-A-53-57831, JP-A-53-37418, JP-A-53-72623, JP-A-53-95630, JP-A-53-95631, JP-A-53-104232, JP-A-53-124424, JP-A-53-141623, JP-A-53-18426 and *Research Disclosure*, No. 17129 (July, 1978); thiazolidine derivatives described in JP-A-51-140129; thiourea derivatives described in JP-B-45-8506, JP-A-52-20832, JP-A-53-32735 and U.S. Pat. No. 3,706,561; iodide salts described in German Patent 1,127,715 and JP-A-58-16235; polyoxyethylene compounds described in German Patent Nos. 966,410 and 2,748,430; polyamine compounds described in JP-B-45-8836; compounds described in JP-A-49-40943, JP-A-49-59644, JP-A-53-94927, JP-A-54-35727, JP-A-55-26506 and JP-A-58-163940; and bromide ion. Among these, compounds having a mercapto group or a disulfide group are preferred in view of their large acceleration effect and in particular, the compounds described in U.S. Pat. No. 3,893,858, German Patent No. 1,290,812 and JP-A-53-95630 are preferred. Also, the compounds described in U.S. Pat. No. 4,552,884 are preferred. The bleaching accelerator may also be incorporated into the light-sensitive material. The bleaching accelerator is particularly effective in bleach-fixing a color light-sensitive material for photographing.

In addition to the above-described compounds, the bleaching solution or bleach-fixing solution preferably contains an organic acid so as to prevent bleaching stains. Particularly, the organic acid is preferably a compound having an acid dissociation constant (pKa) of 2 to 5 and specific examples thereof include acetic acid, propionic acid and hydroxyacetic acid.

Examples of the fixing agent for use in the fixing solution or bleach-fixing solution include thiosulfates, thiocyanates, thioether-base compounds, thioureas and a large quantity of iodide salt. Among these, thiosulfates are commonly used and in particular, ammonium thiosulfate can be most widely used. A combination use of a thiosulfate with, for example, a thiocyanate, a thioether-base compound or a thiourea is also preferred. The preservative for the fixing solution or bleach-fixing solution is preferably a sulfite, a bisulfite, a carbonyl bisulfite or a sulfinic acid compound described in EP-A-294769. Furthermore, the fixing solution or bleach-fixing solution preferably contains an aminopolycarboxylic acid or organic phosphonic acid of various types for the purpose of stabilizing the solution.

In order to adjust the pH, the fixing solution or bleach-fixing solution preferably contains a compound having a pKa of 6.0 to 9.0, more preferably an imidazole such as imidazole, 1-methylimidazole, 1-ethylimidazole and 2-methylimidazole, in an amount of 0.1 to 10 mol/liter.

The total desilvering time is preferably shorter within the range of not causing desilvering failure. The desilvering time is preferably from 1 to 3 minutes, more preferably from 1 to 2 minutes. The processing temperature is from 25 to 50° C., preferably from 35 to 45° C. In this preferred temperature range, the desilvering rate is improved and generation of stains after the processing can be effectively prevented.

In the desilvering step, the stirring is preferably intensified as much as possible. Specific examples of the method for intensifying the stirring include a method of colliding a jet stream of a processing solution against the emulsion surface of the light-sensitive material described in JP-A-62-183460, a method of increasing the stirring effect using rotary means described in JP-A-62-183461, a method of increasing the stirring effect by moving the light-sensitive material while contacting the emulsion surface with a wiper blade disposed in the solution to cause turbulence on the emulsion surface, and a method of increasing the circulation flow rate of the processing solution as a whole. Such means for intensifying the stirring is effective in all of bleaching solution, bleach-fixing solution and fixing solution. The intensification of stirring is considered to increase the supply rate of the bleaching agent or fixing agent into the emulsion layer and, as a result, elevate the desilvering rate. The above-described means for intensifying the stirring is more effective when a bleaching accelerator is used and in this case, the acceleration effect can be remarkably increased or the fixing inhibitory action by the bleaching accelerator can be eliminated.

The automatic developing machine used for developing the light-sensitive material preferably has light-sensitive material conveying means described in JP-A-60-191257, JP-A-60-191258 and JP-A-60-191259. As described in JP-A-60-191257 above, such conveying means can extremely reduce the amount of a processing solution carried over from a previous bath to a post bath and provides a high effect of preventing a processing solution from deteriorating in the capability. This effect is particularly effective for reducing the processing time or decreasing the replenishing amount of a processing solution in each step.

After the desilvering, the silver halide color photographic light-sensitive material is generally subjected to water washing and/or stabilization. The amount of washing water in the water washing step can be set over a wide range according to the properties (attributable to, for example, a material used such as coupler) or use of the light-sensitive material and additionally according to the temperature of washing water, the number of water washing tanks (number of stages), the replenishing system such as countercurrent or co-current system, or other various conditions. Among these, the relationship between the number of water washing tanks and the amount of water in a multi-stage countercurrent system can be determined according to the method described in *Journal of the Society of Motion Picture and Television Engineers*, Vol. 64, pp. 248-253 (May, 1955).

According to the multi-stage countercurrent system described in the above-described publication, the amount of washing water may be greatly reduced but the increase in the residence time of water in the tank causes a problem, for example, bacteria proliferate and the floats generated adhere to the light-sensitive material. For solving such a problem, a method of reducing calcium ion and magnesium ion described in JP-A-62-288838 can be very effectively used in the processing of the color light-sensitive material of the present invention. It is also effective to use, for example, an isothiazolone compound or a thiabendazole described in JP-A-57-8542, a chlorine-base bactericide such as chlorinated sodium isocyanurate, or a bactericide such as benzotriazole described in Hiroshi Horiguchi, *Bokin, Bobai-Zai no Kagaku* (*Chemistry of Bactericides and Fungicides*), Sankyo Shuppan (1986), *Biseibutsu no Mekkin, Sakkin, Bobai-Gijutsu* (*Sterilizing, Disinfecting and Fungicidal Technology for Microorganisms*), compiled by Eisei Gijutsu Kai, issued by Kogyo Gijutsu Kai (1982), and *Bokin-Bobai Zai Jiten* (*Handbook of Bactericides and Fungicides*), compiled by Nippon Bokin Bobai Gakkai (1986).

The washing water for use in the processing of the light-sensitive material has a pH of 4 to 9, preferably from 5 to 8. The washing water temperature and the water washing time may be variously set according to, for example, the properties and use of the light-sensitive material but the temperature and the processing time are generally from 15 to 45° C. and from 20 seconds to 10 minutes, preferably from 25 to 40° C. and from 30 seconds to 5 minutes, respectively. The light-sensitive material of the present invention can also be processed directly with a stabilizing solution in place of the above-described water washing. In such a stabilization processing, any known method described in JP-A-57-8543, JP-A-58-14834 and JP-A-60-220345 can be used.

In some cases, the stabilization processing may be further performed following the above-described water washing. An example thereof is a stabilization bath containing a dye stabilizer and a surfactant, which is used as a final bath in the processing of a color light-sensitive material for photographing. Examples of the dye stabilizer include aldehydes such as formalin and glutaraldehyde, N-methylol compounds, and hexamethylene-tetramine or aldehyde sulfite adducts. This stabilization bath may also contain various chelating agents and fungicides.

The overflow solution accompanying the replenishing of washing water and/or stabilizing solution can be re-used in other processing steps such as desilvering step.

In the processing using, for example, an automatic developing machine, if each processing solution is concentrated due to evaporation, water is preferably added to correct the concentration.

In the silver halide color photographic light-sensitive material, a color developing agent may be incorporated so as to simplify the processing and increase the processing rate. In order to incorporate the color developing agent, various precursors of the color developing agent are preferably used. Examples thereof include indoaniline-base compounds described in U.S. Pat. No. 3,342,597, Schiff base-type compounds described in U.S. Pat. No. 3,342,599, *Research Disclosure*, No. 14850 and ibid., No. 15159, aldol compounds described in ibid., No. 13924, metal salt complexes described in U.S. Pat. No. 3,719,492 and urethane-base compounds described in JP-A-53-135628.

In the silver halide color light-sensitive material, a 1-phenyl-3-pyrazolidone of various types may be incorporated, if desired, for the purpose of accelerating the color development. Typical examples of the compound are described in JP-A-56-64339, JP-A-57-144547 and JP-A-58-115438.

Each processing solution is used at a temperature of 10 to 50° C. The standard temperature is usually from 33 to 38° C. but a higher temperature may be used to accelerate the processing and thereby shorten the processing time, or on the contrary, a lower temperature may be used to improve the image quality or the stability of processing solution.

The silver halide light-sensitive material of the present invention can be applied also to heat-developable light-sensitive materials described in U.S. Pat. No. 4,500,626, JP-A-60-133449, JP-A-59-218443, JP-A-61-238056 and EP-A-210660.

Furthermore, the silver halide color photographic light-sensitive material can be effectively applied to a film unit with a lens described in JP-B-2-32615 and JP-B-U-3-39784 (the term "JP-B-U" as used herein means an "examined Japanese utility model publication") and in this case, the effect is more readily brought out.

EXAMPLE

The present invention is described in greater detail below by referring to Examples, however, the present invention should not be construed as being limited thereto.

Example I (Comparison I-1)

In a reactor, 3 liter of an aqueous solution (pH: 5) containing 1.08 g of potassium bromide and 2.1 g of low molecular weight gelatin (molecular weight: 15,000) was charged and kept 40° C. While stirring the aqueous solution, 20 ml of (a) an aqueous 0.87 mol/liter silver nitrate solution and 20 ml of (b) an aqueous 0.87 mol/liter potassium bromide solution were added thereto by a double jet method over 40 seconds. After the addition, 2.2 g of potassium bromide was added to the reaction solution and the temperature was elevated to 60° C. over 35 minutes. During the elevation of temperature, the reaction solution was dehydrated and desalted to a volume of 1 liter using an ultrafiltration apparatus shown in FIG. 1. After the elevation of temperature, an aqueous dispersion medium solution containing 35 g of oxidation-treated gelatin and 300 ml of water was added and thereto, 2,916 ml of (c) an aqueous 0.53 mol/liter silver nitrate solution and (d) a mixed solution of 0.56 mol/liter potassium bromide and potassium iodide (Br:I=95:5) were added by a controlled double jet method over 237 minutes while keeping the silver potential at −60 mV. During the addition of solutions (c) and (d), the reaction solution was dehydrated and desalted to a final volume of 3 liter using an ultrafiltration apparatus shown in FIG. 1. At this time, when 70% of silver nitrate was added, $8 \times 10^{-8}$ mol/mol-Ag of $K_3IrCl_6$ was added and doped into the grain under growth and before the completion of grain growth, yellow prussiate of potash was doped into the portion o f 90 to 97% in terms of silver amount of the grain to have a concentration of $3 \times 10^{-4}$ mol/mol-Ag as a local concentration. After the completion of addi tion of solutions (c) and (d), th e emulsion was cooled to 35° C. and washed by a normal flocculation method and thereto, 70 g of lime-treated ossein gelatin was added and dissolved to adjust the pAg and the pH to 8.7 and 6.5, respectively, thereby obtaining Emulsion I-A.

The ultrafiltration module used in the ultrafiltration apparatus was flat membrane Centramate Nova Series (fractional molecular weight: 30,000) produced by Pall. At this time, the reflux flow rate was 1 liter/min, the permea tion flow rate was from 24 to 57 ml/min, the supply pressure was 0.09 MPa, the reflux pressure was 0.05 MPa and the permeation pressure was 0 MPa.

(Invention I-1)

Emulsion I-B was prepared in the same manner as Emulsion I-A except that the solution (c) and (e) a mixed solution of 0.56 mol/liter potassium bromide and potassium iodide (Br:I=95:5) in which low molecular weight gelatin (molecular eight: 15,000) was added to a concentration of 5% were added to a mixing vessel (residence time: 6.6 seconds) shown in FIG. 2 where stirring blades having no rotary shaft protruding through the wall of a closed stirring tank and connected with a magnetic coupling were rotated in the converse direction, to prepare silver halide fine grains (average grain size: 0.020 μm), the obtained silver halide fine grains were added to a reactor and during the addition, a mixed solution of 1 mol/liter potassium bromide and potassium iodide (Br:I=95:5) was added to keep the silver potential in the reactor at −60 mV.

(Invention I-2)

Emulsion I-C was prepared in the same manner as Emulsion I-A except that the solutions (c) and (e) were added to a mixing vessel (residence time: 1.1 seconds) shown in FIG. 2 where stirring blades having a rotary shaft directly connected with a motor and sealed were rotated in the converse direction in the stirring tank, to prepare silver halide fine grains (average grain size: 0.016 μm), the prepared silver halide fine grains were added to a reactor and during the addition, a mixed solution of 1 mol/liter potassium bromide and potassium iodide (Br:I=95:5) was added to keep the silver potential in the reactor at −60 mV.
(Invention I-3)

Emulsion I-D was prepared in the same manner as Emulsion I-A except that the solutions (c) and (e) were mixed to produce silver bromide fine grains by applying high-pressure homogenizer DeBEE 2000 manufactured by BEE INTERNATIONAL as a mixing vessel, the solution (c) was turned into a linear jet stream using the dual field process of the apparatus, the jet stream was produced by passing the solution through pores having a diameter of 0.1 mm under pressure of an ejection pressure of $9.8 \times 10^7$ Pa, the solution (c) was added at an addition rate of 280 ml/min and a flow rate of 600 m/sec, the solution (e) was added through another addition port while controlling the flow rate by a piston at an addition rate of 280 ml/min, thereby attaining mixing in a residence time of 0.012 seconds without causing circulation or being accompanied by mechanical stirring, the thus-prepared silver halide fine grains (average grain size: 0.013 μm) were added to a reactor and during the addition, a mixed solution of 1 mol/liter potassium bromide and potassium iodide (Br:I=95:5) was added to keep the silver potential in the reactor at −60 mV.
(Invention I-4)

Emulsion I-E was prepared in the same manner as Emulsion I-D except that in the preparation of Emulsion I-D, the solutions (c) and (e) after mixing were mixed by fixing a capillary having a diameter of 1 mm in the inside. At this time, the residence time was 0.01 second and the average grain size of silver halide fine grains was 0.012 μm.
(Invention I-5)

Emulsion I-F was prepared in the same manner as Emulsion I-A except that Microreactor (interdigital single mixing device) manufactured by IMM (Institute fur Mikrotechnik Mianz) was used as a mixing vessel, the solutions (c) and (e) were added to the Microreactor by a syringe pump and mixed, the residence time here was 10 seconds, the prepared silver halide fine grains (average grain size: 0.015 μm) were added to a reactor and during the addition, a mixed solution of 1 mol/liter potassium bromide and potassium iodide (Br:I=95:5) was added to keep the silver potential in the reactor at −60 mV.
(Invention I-6)

Emulsion I-G was prepared in the same manner as Emulsion I-B except that in the preparation of Emulsion I-B, hollow yarn membrane SLP-1053 (fractional molecular weight: 10,000) produced by Asahi Chemical Industry Co., Ltd. was used for the ultrafiltration module. At this time, the reflux flow rate was 12 liter/min, the permeation flow rate was from 21 to 43 ml/min, the supply pressure was 0.06 MPa, the reflux pressure was 0.03 MPa and the permeation pressure was 0 MPa.

The percentage of tabular grains, the equivalent-circle diameter, the coefficient of variation in the equivalent-circle diameter, the average thickness and the aspect ratio of each of Emulsions I-A to I-G prepared above are shown together in Table 1.

Here, the coefficient of variation in the equivalent-circle diameter is obtained by dividing the standard deviation of the equivalent-circle diameter of grains by the equivalent-circle diameter and shown by a percentage.

TABLE 1

| Emulsion | Percentage of Tabular Grains (%) | Equivalent-Circle Diameter (μm) | Coefficient of Variation in Equivalent-Circle Diameter (%) | Average Thickness (μm) | Aspect Ratio | |
|---|---|---|---|---|---|---|
| I-A | 97 | 1.28 | 36 | 0.075 | 17.1 | Comparison |
| I-B | 98.2 | 1.35 | 29 | 0.062 | 21.8 | Invention |
| I-C | 99 | 1.4 | 28 | 0.063 | 22.2 | " |
| I-D | 99.2 | 1.28 | 29 | 0.06 | 21.3 | " |
| I-E | 99.3 | 1.27 | 24 | 0.059 | 21.5 | " |
| I-F | 98.2 | 1.37 | 30 | 0.066 | 20.8 | " |
| I-G | 98.3 | 1.34 | 29 | 0.062 | 21.6 | " |

As seen from Table 1, according to the present invention, tabular grains being monodisperse with a small coefficient of variation in the equivalent-circle diameter and having a high aspect ratio can be prepared. As the size of silver halide fine grains prepared in the mixing vessel is smaller, tabular grains having a smaller coefficient of variation in the equivalent-circle diameter can be prepared.

Example II

Emulsions I-A to I-G each was heated to a temperature of 56° C. and subjected to optimal chemical sensitization by adding Sensitizing Dyes I, II and III shown below, Compound I shown below, potassium thiocyanate, chloroauric acid, sodium thiosulfate and N,N-dimethyl selenourea. However, the sensitizing dyes were used each as a solid fine dispersion prepared by the method described in JP-A-11-52507. More specifically, 0.8 mass parts (i.e., weight parts) of sodium nitrate and 3.2 mass parts of sodium sulfate were dissolved in 43 parts of ion exchanged water and 13 mass parts of the sensitizing dye was added and dispersed at 60° C. for 20 minutes using a dissolver blade at 2,000 rpm, thereby obtaining a solid dispersion of sensitizing dye.

Sensitizing Dye I

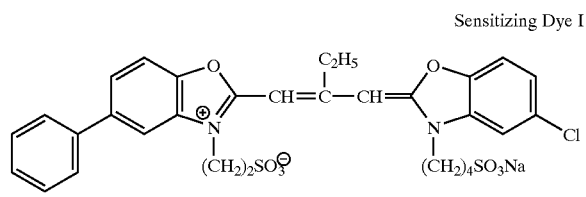

-continued

Sensitizing Dye II

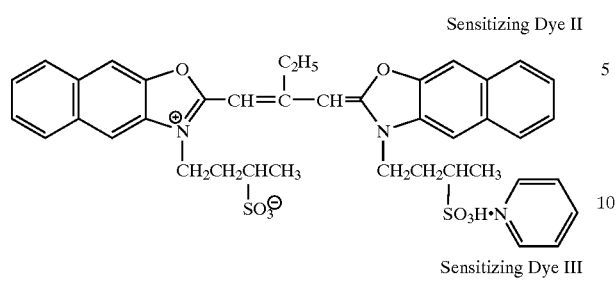

Sensitizing Dye III

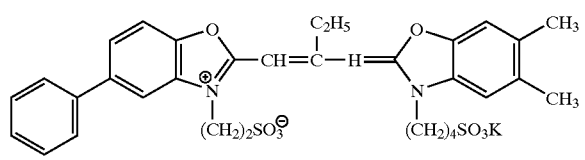

-continued

Compound I

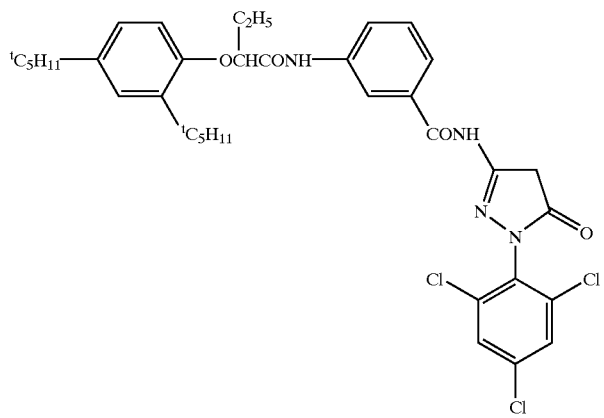

On a cellulose triacetate film support having provided thereon a subbing layer, chemically sensitized Emulsion I-A, I-B, I-C, I-D, I-E, I-F or I-G prepared above was coated under the coating conditions shown in Table 2 below and a protective layer was provided, thereby obtaining coated samples.

TABLE 2

Emulsion Coating Conditions (1) Emulsion layer

Emulsion: Each emulsion ($2.1 \times 10^{-2}$ mol/m² as silver)
Coupler:

($1.5 \times 10^{-3}$ mol/m²)

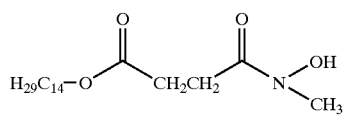

($1.1 \times 10^{-4}$ mol/m²)

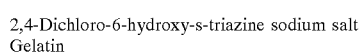

| | |
|---|---|
| Tricresyl phosphate | (1.10 g/m²) |
| Gelatin | (2.30 g/m²) |
| (2) Protective layer | |
| 2,4-Dichloro-6-hydroxy-s-triazine sodium salt | (0.08 g/m²) |
| Gelatin | (1.80 g/m²) |

These samples were left standing for 14 hours under the conditions of 40° C. and a relative humidity of 70% and thereafter, exposed for 1/100 second through gelatin filter SC-50 manufactured by Fuji Photo Film Co., Ltd. and a continuous wedge.

The samples were processed using Negative Processor FP-350 manufactured by Fuji Photo Film Co., Ltd. by the following method (until the cumulative replenishing amount of solution became thrice the tank volume of mother solution).

(Processing Method)

| Step | Processing Time | Processing Temperature (° C.) | Replenishing Amount* (mL) |
|---|---|---|---|
| Color development | 3 min 15 sec | 38 | 45 |
| Bleaching | 1 min 00 sec | 38 | 20 overflow of bleaching solution was wholly passed to bleach-fixing tank |
| Bleach-fixing | 3 min 15 sec | 38 | 30 |
| Water washing (1) | 40 sec | 35 | countercurrent piping system from (2) to (1) |
| Water washing (2) | 1 min 00 sec | 35 | 30 |
| Stabilization | 40 sec | 38 | 20 |
| Drying | 1 min 15 sec | 55 | |

*The replenishment amount was per 1.1-m length in 35-mm width (corresponding to one roll of 24 Ex.).

The composition of each processing solution was as follows.

| (Color Developer) | Tank Solution (g) | Replenisher (g) |
|---|---|---|
| Diethylenetriaminepentaacetic acid | 1.0 | 1.1 |
| 1-Hydroxyethylidene-1,1-diphosphonic acid | 2.0 | 2.0 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-Ethyl-N-(β-hydroxyethyl)-amino]-2-methylaniline sulfate | 4.5 | 5.5 |
| Water to make | 1.0 L | 1.0 L |
| pH (adjusted by potassium hydroxide and sulfuric acid) | 10.05 | 10.10 |

(Bleaching Solution)
Tank solution and replenisher were common (unit: g).

| Ammonium ethylenediaminetetraacetato ferrate dihydrate | 120.0 |
|---|---|
| Disodium ethylenediaminetetraacetate | 10.0 |
| Ammonium bromide | 100.0 |
| Ammonium nitrate | 10.0 |
| Bleaching accelerator: $(CH_3)_2N-CH_2-CH_2-S-S-CH_2-CH_2N(CH_3)_2 \cdot 2HCl$ | 0.005 mol |
| Aqueous ammonia (27%) | 15.0 mL |
| Water to make | 1.0 L |
| pH (adjusted by aqueous ammonia and nitric acid) | 6.3 |

-continued

| (Bleach-Fixing Solution) | Tank Solution (g) | Replenisher (g) |
|---|---|---|
| Ammonium ethylenediaminetetra-acetato ferrate dihydrate | 50.0 | — |
| Disodium ethylenediaminetetra-acetate | 5.0 | 2.0 |
| Sodium sulfite | 12.0 | 20.0 |
| Aqueous ammonium thiosulfate solution (700 g/L) | 240.0 mL | 400.0 mL |
| Aqueous ammonia (27%) | 6.0 mL | — |
| Water to make | 1.0 L | 1.0 L |
| pH (adjusted by aqueous ammonia and acetic acid) | 7.2 | 7.3 |

(Washing Water)

Tank solution and replenisher were common.

Tap water was passed through a mixed bed column filled with an H-type strongly acidic cation exchange resin (Amberlite IR-120B, produced by Rhom and Haas) and an OH-type anion exchange resin (Amberlite IR-400, produced by the same company) to reduce the calcium and magnesium ion concentrations each to 3 mg/L or less and thereto 20 mg/L of sodium isocyanurate dichloride and 0.15 g/L of sodium sulfate were added. The resulting solution had a pH of 6.5 to 7.5.

(Stabilizing Solution)
Tank solution and replenisher were common (unit: g).

| Sodium p-toluenesulfinate | 0.03 |
|---|---|
| Polyoxyethylene-p-monononylphenyl ether average polymerization degree: 10) | 0.2 |
| Disodium ethylenediaminetetraacetate | 0.05 |
| 1,2,4-Triazole | 1.3 |
| 1,4-Bis(1,2,4-triazol-1-ylmethyl)piperazine | 0.75 |
| Water to make | 1.0 L |
| pH | 8.5 |

The development processing dependency was evaluated by changing the processing time of color development. The processed samples were measured on the density using a green filter.

The results obtained are shown together in Table 3. The sensitivity is expressed by a reciprocal of the exposure amount necessary for obtaining an optical density of fog+0.2 and shown as a relative value to the value of Emulsion I-A which is taken as 100.

TABLE 3

| Emulsion | Sensitivity | Fog | |
|---|---|---|---|
| I-A | 100 | 0.023 | Comparison |
| I-B | 120 | 0.022 | Invention |
| I-C | 122 | 0.021 | " |
| I-D | 123 | 0.020 | " |
| I-E | 125 | 0.020 | " |
| I-F | 120 | 0.022 | " |
| I-G | 121 | 0.022 | " |

As apparently seen from Table 3, by using the emulsion produced by the production process of the present invention, a light-sensitive material low in the fog and high in the sensitivity can be obtained.

Example III (Comparison III-1)

In a reactor, 1 liter of an aqueous solution (pH: 5) containing 0.36 g of potassium bromide and 0.7 g of low molecular weight gelatin (molecular weight: 15,000) was charged and kept 40° C. While stirring the aqueous solution, 20 ml of an aqueous 0.29 mol/liter silver nitrate solution and 20 ml of an aqueous 0.29 mol/liter potassium bromide solution were added thereto by a double jet method over 40 seconds. After the addition, an aqueous solution containing 2.2 g of potassium bromide was added to the reaction solution and the temperature was elevated to 60° C. over 35 minutes. After the elevation of temperature, an aqueous dispersion medium solution containing 35 g of oxidation-treated gelatin and 300 ml of water was added and then, 972 ml of an aqueous 0.53 mol/liter silver nitrate solution and a mixed solution of 0.56 mol/liter potassium bromide and potassium iodide (Br:I=97:3) were added directly to the reactor by a controlled double jet method over 79 minutes while keeping the silver potential at −60 mV, thereby performing the grain growth. At this time, when 70% of silver nitrate was added, $8\times10^{-8}$ mol/mol-Ag of $K_3IrCl_6$ was added and doped into the grain under growth and before the completion of grain growth, yellow prussiate of potash was doped into the portion of 90 to 97% in terms of silver amount of the grain to have a concentration of $3\times10^{-4}$ mol/mol-Ag as a local concentration. After the completion of addition of silver nitrate solution, the emulsion was cooled to 35° C. and washed by a normal flocculation method and thereto, 70 g of lime-treated ossein gelatin was added and dissolved to adjust the pAg and the pH to 8.7 and 6.5, respectively, thereby obtaining Emulsion III-a.

(Comparison III-2)

In a reactor, 3 liter of an aqueous solution (pH: 5) containing 1.08 g of potassium bromide and 2.1 g of low molecular weight gelatin (molecular weight: 15,000) was charged and kept 40° C. While stirring the aqueous solution, 20 ml of an aqueous 0.87 mol/liter silver nitrate solution and 20 ml of an aqueous 0.87 mol/liter potassium bromide solution were added thereto by a double jet method over 40 seconds. After the addition, an aqueous solution containing 2.2 g of potassium bromide was added to the reaction solution and the temperature was elevated to 60° C. over 35 minutes. During the elevation of temperature, the reaction solution was dehydrated to a volume of 1 liter using an ultrafiltration apparatus shown in FIG. 1 (the ultrafiltration module was hollow yarn membrane SLP-1053 (fractional molecular weight: 10,000) produced by Asahi Chemical Industry Co., Ltd.). After the elevation of temperature, an aqueous dispersion medium solution containing 35 g of oxidation-treated gelatin and 300 ml of water was added and then, 2,916 ml of an aqueous 0.53 mol/liter silver nitrate solution and a mixed solution of 0.56 mol/liter potassium bromide and potassium iodide (Br:I=97:3) were added directly to the reactor by a controlled double jet method over 237 minutes while keeping the silver potential at −60 mV, thereby performing the grain growth. During this addition, the reaction solution was dehydrated to a final volume of 3.3 liter using an ultrafiltration apparatus shown in FIG. 1 (the ultra-filtration module was hollow yarn membrane SLP-1053 (fractional molecular weight: 10,000) produced by Asahi Chemical Industry Co., Ltd.). At this time, when 70% of silver nitrate was added, $8\times10^{-8}$ mol/mol-Ag of $K_3IrCl_6$ was added and doped into the grain under growth and before the completion of grain growth, yellow prussiate of potash was doped into the portion of 90 to 97% in terms of silver amount of the grain to have a concentration of $3\times10^{-4}$ mol/mol-Ag as a local concentration. After the completion of addition of silver nitrate solution, the emulsion was cooled to 35° C. and washed by a normal flocculation method and thereto, 70 g of lime-treated ossein gelatin was added and dissolved to adjust the pAg and the pH to 8.7 and 6.5, respectively, thereby obtaining Emulsion III-b.

(Comparison III-3)

Emulsion III-c was prepared in the same manner as Emulsion III-a except that in the grain growth of Emulsion II-a, 1,945 ml of Fine Grain Emulsion M dissolved at 40° C. was added over 79 minutes while keeping the silver potential at −60 mV using a mixed solution of 1.2 mol/l potassium bromide and potassium iodide (Br:I=97:3).

(Comparison III-4)

Emulsion III-d was prepared in the same manner as Emulsion III-a except that in the grain growth of Emulsion II-b, 5,835 ml of Fine Grain Emulsion M dissolved at 40° C. was added over 237 minutes while keeping the silver potential at −60 mV using a mixed solution of 1.2 mol/l potassium bromide and potassium iodide (Br:I=97:3).

Preparation of Fine Grain Emulsion M

In a reactor, 0.16 g of potassium bromide, 160 g of low molecular weight gelatin (molecular weight: 15,000), 18 ml of 0.5 mol/liter sulfuric acid and 3,920 ml of distilled water were charged and kept at 35° C. While stirring the mixture, 477 ml of an aqueous 1.37 mol/liter silver nitrate solution and 487 ml of an aqueous 1.37 mol/liter potassium bromide solution were added by a double jet method at a constant flow rate over 45 seconds. Thereafter, 1,588 ml of an aqueous 0.96 mol/liter silver nitrate solution was added over 20 minutes and at the same time, a mixed solution of 0.96 mol/liter potassium bromide and potassium iodide (Br:I=97:3) was added by a controlled double jet method while keeping the pAg at 8.1. The average grain size was 0.040 $\mu$m and the coefficient of variation in the grain size was 35%.

(Comparison III-5)

Emulsion III-e was prepared in the same manner as Emulsion III-a except that in the grain growth of Emulsion III-a, 972 ml of an aqueous 0.53 mol/liter silver nitrate solution and 972 ml of a mixed solution of 0.50 mol/liter potassium bromide and potassium iodide (Br:I=97:3) in which gelatin (molecular weight: 100,000) was added to a concentration of 5% were added to a mixing vessel (residence time: 6.6 seconds) shown in FIG. 2 where stirring blades having no rotary shaft protruding through the wall of closed stirring tank and connected with magnetic coupling were rotated in the converse direction, to prepare silver halide fine grains (average grain size: 0.023 $\mu$m) and while keeping the silver potential at −60 mV by adding a mixed solution of 1.2 mol/liter potassium bromide and potassium iodide (Br:I=97:3) to the reactor, the prepared silver halide fine grains were added to the reactor over 79 minutes, thereby performing the grain growth.

(Comparison III-6)

Emulsion III-f was prepared in the same manner as Emulsion III-a except that in the grain growth of Emulsion III-b, 2,916 ml of an aqueous 0.53 mol/liter silver nitrate solution and 2,916 ml of a mixed solution of 0.50 mol/liter potassium bromide and potassium iodide (Br:I=97:3) in which gelatin (molecular weight: 100,000) was added to a concentration of 5% were added to a mixing vessel (residence time: 6.6 seconds) shown in FIG. 2 where stirring blades having no rotary shaft protruding through the wall of closed stirring tank and connected with magnetic coupling were rotated in the converse direction, to prepare silver halide fine grains (average grain size: 0.023 $\mu$m) and while keeping the silver potential at −60 mV by adding a mixed solution of 1.2 mol/liter potassium bromide and potassium iodide (Br:I=97:3) to the reactor, the prepared silver halide fine grains were added to the reactor over 237 minutes, thereby performing the grain growth.

(Comparison III-7)

Emulsion III-g was prepared in the same manner as Emulsion III-a except that in the grain growth of Emulsion III-a, 972 ml of an aqueous 0.53 mol/liter silver nitrate solution and 972 ml of a mixed solution of 0.50 mol/liter potassium bromide and potassium iodide (Br:I=97:3) in which gelatin (molecular weight: 20,000) was added to a concentration of 5% were added to a mixing vessel (residence time: 6.6 seconds) shown in FIG. 2 where stirring blades having no rotary shaft protruding through the wall of closed stirring tank and connected with magnetic coupling were rotated in the converse direction, to prepare silver halide fine grains (average grain size: 0.023 $\mu$m) and while keeping the silver potential at −60 mV by adding a mixed solution of 1.2 mol/liter potassium bromide and potassium iodide (Br:I=97:3) to the reactor, the prepared silver halide fine grains were added to the reactor over 79 minutes, thereby performing the grain growth.

(Invention III-1)

Emulsion III-h was prepared in the same manner as Emulsion III-b except that in the grain growth of Emulsion III-a, 2,916 ml of an aqueous 0.53 mol/liter silver nitrate solution and 2,916 ml of a mixed solution of 0.50 mol/liter potassium bromide and potassium iodide (Br:I=97:3) in which gelatin (molecular weight: 20,000) was added to a concentration of 5% were added to a mixing vessel (residence time: 6.6 seconds) shown in FIG. 2 where stirring blades having no rotary shaft protruding through the wall of closed stirring tank and connected with magnetic coupling were rotated in the converse direction, to prepare silver halide fine grains (average grain size: 0.023 $\mu$m) and while keeping the silver potential at −60 mV by adding a mixed solution of 1.2 mol/liter potassium bromide and potassium iodide (Br:I=97:3) to the reactor, the prepared silver halide fine grains were added to the reactor over 237 minutes, thereby performing the grain growth.

The percentage of tabular grains, the equivalent-circle diameter, the coefficient of variation in the equivalent-circle diameter, the average thickness and the aspect ratio of each of Emulsions III-a to III-h prepared are shown together in Table 4.

As seen from Table 4, tabular grains being monodisperse with a small coefficient of variation in the equivalent-circle diameter and having a high aspect ratio can be prepared by the present invention.

Example IV

In the same manner as in Example 2, chemical sensitization and spectral sensitization were optimally performed and each emulsion was coated. The photographic performance was compared.

The results obtained are shown together in Table 5. The exposure was expressed by a reciprocal of the exposure amount necessary for obtaining an optical density of fog+1.0 and shown by a relative value to the value of Emulsion III-a which was taken as 100.

TABLE 5

| Emulsion | Sensitivity | Fog | |
|---|---|---|---|
| III-a | 100 | 0.022 | Comparison |
| III-b | 101 | 0.024 | " |
| III-c | 104 | 0.023 | " |
| III-d | 108 | 0.025 | " |
| III-e | 83 | 0.024 | " |
| III-f | 82 | 0.025 | " |
| III-g | 110 | 0.022 | " |
| III-h | 125 | 0.020 | Invention |

As seen from Table 5, tabular grains having high-sensitivity and low fog can be prepared by the present invention.

Example V

The production process of emulsion of the present invention is described in detail below.

(Preparation of Emulsion V-a)

1,192 mL of an aqueous solution containing 0.9 g of KBr and 4.2 g of oxidation-treated low molecular weight gelatin having an average molecular weight of 20,000 was stirred while keeping at 35° C. Thereto, 33.4 ml of an aqueous AgNO$_3$ (1.0 g) solution and 53.1 ml of an aqueous solution containing KBr (0.9 g) and oxidation-treated low molecular weight gelatin (0.37 g) having an average molecular weight of 20,000 were added over 52 seconds. The temperature was elevated to 75° C. and then, 18 ml of an aqueous solution containing 1.83 g of KBr was added. Thereafter, 130 ml of an aqueous solution containing 16 g of succinated gelatin

TABLE 4

| Emulsion | Percentage of Tabular Grains (%) | Equivalent-Circle Diameter ($\mu$m) | Coefficient of Variation in Equivalent-Circle Diameter (%) | Average Thickness ($\mu$m) | Aspect Ratio | |
|---|---|---|---|---|---|---|
| III-a | 98.0 | 1.27 | 39 | 0.077 | 16.5 | Comparison |
| III-b | 97.1 | 1.29 | 37 | 0.076 | 17.0 | " |
| III-c | 98.2 | 1.30 | 35 | 0.075 | 17.3 | " |
| III-d | 98.3 | 1.31 | 34 | 0.078 | 16.8 | " |
| III-e | 96.8 | 0.98 | 40 | 0.094 | 10.4 | " |
| III-f | 96.5 | 0.97 | 38 | 0.096 | 10.1 | " |
| III-g | 98.5 | 1.39 | 30 | 0.066 | 20.9 | " |
| III-h | 99.0 | 1.48 | 24 | 0.063 | 23.5 | Invention | having an average molecular weight of 100,000 was added and then, 200 ml of an aqueous solution containing 12 g of sodium catechol disulfonate was added. Subsequently, as the first growth, silver halide fine grains prepared by adding 854 ml of an aqueous AgNO$_3$ (136.0 g) solution, KBr in an equimolar concentration and an aqueous solution (containing 3 mol % of KI) of low molecular weight oxidation-treated gelatin (81.6 g) having a molecular weight of 15,000 to a mixing vessel shown in FIG. 2 where stirring blades having no rotary shaft protruding the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.019 μm, the coefficient of variation in the equivalent-circle diameter was 35% and the percentage by number of twin grains was 14%. By the growth here, the average thickness of tabular grains became 0.047 μm. During the growth, 10 ml of an aqueous solution containing potassium hexachloroiridate (0.2 mg) was added. At the completion of addition of AgNO$_3$, 10 ml of an aqueous solution containing sodium benzenethiosulfonate (2 mg) was added. Thereafter, the solution was bailed out to a volume of 608 ml. Then, as the second growth, silver halide fine gains were prepared by adding 689 ml of an aqueous AgNO$_3$ (82.7 g) solution, KBr in an equimolar concentration and an aqueous solution (containing 3 mol % of KI) of low molecular weight oxidation-treated gelatin (49.6 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.025 μm, the coefficient of variation in the equivalent-circle diameter was 31% and the percentage by number of twin grains was 12%. By the growth here, the average thickness of tabular grains became 0.061 μm. Then, as the third growth, silver halide fine gains were prepared by adding 519 ml of an aqueous AgNO$_3$ (83.0 g) solution, KBr in an equimolar concentration and an aqueous solution (containing 3 mol % of KI) of low molecular weight oxidation-treated gelatin (49.8 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.028 μm, the coefficient of variation in the equivalent-circle diameter was 32% and the percentage by number of twin grains was 15%.

Thereafter, 100 ml of an aqueous solution containing 11 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. After lowering the temperature to 40° C., 5.97 ml of phenoxyethanol was added and further, 20 ml of an aqueous KI (0.16 g) solution was added. Thereto, Sensitizing Dyes IV, V and VI were added at a molar ratio of 69:30:1 to a proportion of 70% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 15 ml of an aqueous solution containing potassium hexacyanoruthenate (II)(2.0 mg), 100 ml of an aqueous AgNO$_3$ (7.77 g) solution and 100 ml of an aqueous solution containing KBr (2.85 g), KI (0.54 g) and NaCl (2.35 g) were added by a double jet method over 2 minutes. Thereafter, 12 ml of Epitaxial Part Shape Stabilizer I (62 mg) was added and then normal water washing was performed. At this time, the temperature was kept at 35° C. After adding 59 g of the above-described gelatin, the pH at 40° C. was adjusted to 6.5 and the silver potential was adjusted to 80 mV to the saturated calomel electrode using an aqueous NaCl solution. After adding Epitaxial Part Shape Stabilizer/Storability Improver II (5 mg), the temperature was elevated to 68° C. and then, chemical sensitization was optimally performed by adding $0.5 \times 10^{-4}$ mol of potassium thiocyanate, $1.1 \times 10^{-6}$ mol of chloroauric acid, $0.38 \times 10^{-5}$ mol of sodium thiosulfate and $1 \times 10^{-6}$ mol of N,N-dimethylselenourea per mol of silver halide. Antifoggant I ($6.4 \times 10^{-4}$ mol) was added and the chemical sensitization was completed.

Emulsion V-a thus prepared was tabular grains such that the coefficient of variation in the equivalent-circle diameter was 27%, the number average equivalent-circle diameter was 4.20 μm and the number average thickness was 0.067 μm. In this emulsion, 90% or more of the entire projected area was occupied by hexagonal tabular grains where the ratio of the length of a side having a maximum length to the length of a side having a minimum length was 1.5 or less and an epitaxial junction was present at all of six apex parts. The emulsion was observed by a transmission electron microscope at a low temperature, as a result, 90% or more of the entire projected area was occupied by grains having no dislocation line in the main plane part except for the epitaxial part and having network dislocation lines in the epitaxial part. In this grain, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

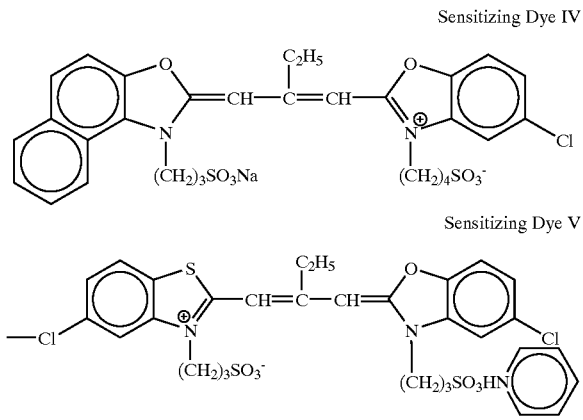

Sensitizing Dye IV

Sensitizing Dye V

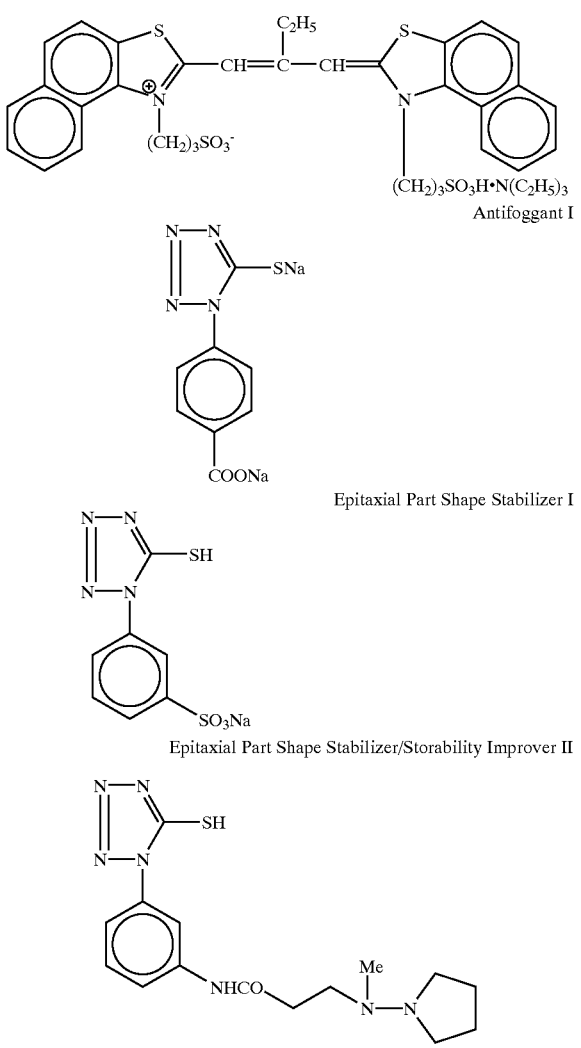

(Preparation of Emulsion V-b)

Emulsion V-b was prepared almost in the same manner as in the preparation of Emulsion V-a except that the procedure from the nucleation until the third growth was changed as follows.

An aqueous solution (1,192 mL) containing 0.161 g of KBr and 2.41 g of low molecular weight oxidation-treated gelatin having an average molecular weight 20,000 was kept at 35° C. and stirred. Thereto, 33.4 ml of an aqueous AgNO$_3$ (0.179 g) solution and 53.1 ml of an aqueous solution containing KBr (0.161 g) and low molecular weight oxidation-treated gelatin (0.066 g) having an average molecular weight of 20,000 were added over 52 seconds. After elevating the temperature to 75° C., 18 ml of an aqueous solution containing 0.33 g of KBr was added, 130 ml of an aqueous solution containing 8 g of succinated gelatin having an average molecular weight of 100,000 was added, and then 200 ml of an aqueous solution containing 2.15 g of sodium catechol disulfonate was added. Thereafter, as the first growth, silver halide fine grains prepared by adding 854 ml of an aqueous AgNO$_3$ (24.34 g) solution, KBr in an equimolar concentration and an aqueous solution (containing 3 mol % of KI) of low molecular weight oxidation-treated gelatin (24.34 g) having a molecular weight of 15,000 to a mixing vessel shown in FIG. 2 where stirring blades having no rotary shaft protruding the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.021 μm, the coefficient of variation in the equivalent-circle diameter was 28% and the percentage by number of twin grains was 9%. By the growth here, the average thickness of tabular grains became 0.044 μm. During the growth, 10 ml of an aqueous solution containing potassium hexachloroiridate (0.04 mg) was added. At the completion of addition of AgNO$_3$, 10 ml of an aqueous solution containing sodium benzenethiosulfonate (0.36 mg) was added. Together with this first growth, ultrafiltration was performed. The ultrafiltration module used for the ultrafiltration apparatus was flat membrane Centramate Nova Series (fractional molecular weight: 30,000) produced by Pall. The reflux flow rate was 1 liter/min, the supply pressure was 0.09 MPa, the reflux pressure was 0.05 MPa and the permeation pressure was 0 MPa. At this time, the liquid volume was 608 ml. Then, as the second growth, silver halide fine gains were prepared by adding 689 ml of an aqueous AgNO$_3$ (82.7 g) solution, KBr in an equimolar concentration and an aqueous solution (containing 3 mol % of KI) of low molecular weight oxidation-treated gelatin (82.7 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.026 μm, the coefficient of variation in the equivalent-circle diameter was 27% and the percentage by number of twin grains was 7%. By the growth here, the average thickness of tabular grains became 0.052 μm. Then, as the third growth, silver halide fine gains were prepared by adding 519 ml of an aqueous AgNO$_3$ (83.0 g) solution, KBr in an equimolar concentration and an aqueous solution (containing 3 mol % of KI) of low molecular weight oxidation-treated gelatin (83.0 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.028 μm, the coefficient of variation in the equivalent-circle diameter was 29% and the percentage by number of twin grains was 7%. The thus-prepared Emulsion V-b was tabular grains where the coefficient of variation in the equivalent-circle diameter was 29%, the number average equivalent-circle diameter was 4.60 μm and the number average thickness was 0.056 μm.

(Preparation of Emulsion V-c)

Emulsion V-c was prepared almost in the same manner as in the preparation of Emulsion V-a except that the procedure from the first growth until the third growth was changed as follows.

As the first growth, silver halide fine grains prepared by adding 854 ml of an aqueous AgNO$_3$ (136.0 g) solution, KBr in an equimolar concentration and an aqueous solution (containing 3 mol % of KI) of low molecular weight oxidation-treated gelatin (136 g) having a molecular weight of 15,000 to a mixing vessel shown in FIG. 2 where stirring blades having no rotary shaft protruding the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.013 μm, the coefficient of variation in the equivalent-circle diameter was 35% and the percentage by number of twin grains was 15%. By the growth here, the average thickness of tabular grains became 0.053 μm. During the growth, 10 ml of an aqueous solution containing potassium hexachloroiridate (0.2 mg) was added. At the completion of addition of $AgNO_3$, 10 ml of an aqueous solution containing sodium benzenethiosulfonate (2 mg) was added. Thereafter, the solution was bailed out to a volume of 608 ml. Then, as the second growth, silver halide fine gains were prepared by adding 689 ml of an aqueous $AgNO_3$ (82.7 g) solution, KBr in an equimolar concentration and an aqueous solution (containing 3 mol % of KI) of low molecular weight oxidation-treated gelatin (49.6 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.013 μm, the coefficient of variation in the equivalent-circle diameter was 32% and the percentage by number of twin grains was 13%. By the growth here, the average thickness of tabular grains became 0.070 μm. Then, as the third growth, silver halide fine gains were prepared by adding 519 ml of an aqueous $AgNO_3$ (83.0 g) solution, KBr in an equimolar concentration and an aqueous solution (containing 3 mol % of KI) of low molecular weight oxidation-treated gelatin (83.0 g) having a molecular weight of 15,000 to the same mixing vessel as in the first growth and added to the reactor. The silver potential was kept at 0 mV to the saturated calomel electrode by separately adding a KBr solution. In the fine grains added, the number average equivalent-circle diameter was 0.014 μm, the coefficient of variation in the equivalent-circle diameter was 36% and the percentage by number of twin grains was 15%. The thus-prepared Emulsion V-c was tabular grains where the coefficient of variation in the equivalent-circle diameter was 25%, the number average equivalent-circle diameter was 4.0 μm and the number average thickness was 0.1 μm.

The characteristic values of Emulsions V-a, V-b and V-c are shown in Table 6. As apparent from the results in Table 6, the large size tabular grain can be more reduced in the thickness by the production process of the present invention.

TABLE 6

| Name of Emulsion | Presence of Absence of Ultra-filtration | Number Average Equivalent-Circle Diameter (μm) | Number Average Thickness (μm) | Coefficient of Variation in Equivalent-Circle Diameter of All Grains (%) | |
|---|---|---|---|---|---|
| V-a | none | 4.20 | 0.067 | 27 | Comparison |
| V-b | done | 4.60 | 0.056 | 29 | Invention |
| V-c | none | 4.0 | 0.1 | 25 | Comparison |

On a cellulose triacetate film support having provided thereon a subbing layer, chemically sensitized emulsions prepared above each was coated under the coating conditions shown in Table 2 and a protective layer was provided, thereby obtaining Samples V-801, V-802 and V-803.

Each sample was exposed for 1/100 second through Gelatin Filter SC-50 produced by Fuji Photo Film Co., Ltd. and a continuous wedge and then processed by the method described in Example II.

The processed samples were measured on the density by a green filter. The sensitivity value at a density of fog+0.2 and the fog value obtained are shown in Table 7.

TABLE 7

| Sample No. | Name of Emulsion | Fog | Sensitivity | |
|---|---|---|---|---|
| VI-801 | a | 0.22 | 120 | Comparison |
| VI-802 | b | 0.22 | 139 | Invention |
| VI-803 | c | 0.24 | 100 | Comparison |

*The sensitivity is shown relatively to Sample No. 803 of which sensitivity is taken as 100.

As apparent from the results in Table 7, a high-sensitive emulsion can be obtained by the production process of the present invention.

Example VI

This Examples is performed to verify the effect of the emulsion produced by the production process of the present invention in a multilayer color photographic light-sensitive material.

Silver Halide Emulsions Em-A to Em-M were prepared as follows.

(Production Process of Em-A)

42.2 L of an aqueous solution containing 31.7 g of low molecular weight gelatin having a molecular weight of 15,000, which was phthalated to a phthalation ratio of 97%, and 31.7 g of KBr was kept at 35° C. and vigorously stirred. Thereto, 1,583 mL of an aqueous solution containing 316.7 g of $AgNO_3$ and 1,583 mL of an aqueous solution containing 221.5 g of KBr and 52.7 g of low molecular weight gelatin having a molecular weight of 15,000 were added by a double jet method over 1 minute. After the completion of addition, 52.8 g of KBr was immediately added and then, 2,485 mL of an aqueous solution containing 398.2 g of $AgNO_3$ and 2,581 mL of an aqueous solution containing 291.1 g of KBr were added by a double jet method over 2 minutes. After the completion of addition, 44.8 g of KBr was immediately added. Thereafter, the temperature was elevated to 40° C. and the ripening was performed. After the completion of ripening, 923 g of gelatin having a molecular weight of 100,000 phthalated to a phthalation ratio of 97% and 79.2 g of KBr were added and then, 15,947 mL of an aqueous solution containing 5,103 g of $AgNO_3$ and an aqueous KBr solution were added by a double jet method over 10 minutes while accelerating the flow rate such that the final flow rate became 1.4 times the initial flow rate. At this time, the silver potential was kept at −60 mV to the saturated calomel electrode. After water washing, the emulsion was adjusted by adding gelatin such that the pH was 5.7, the pAg was 8.8, the mass in terms of silver per kg of emulsion was 131.8 g and the mass of gelatin was 64.1 g. This emulsion was used as a seed emulsion.

1,211 mL of an aqueous solution containing 46 g of phthalated gelatin having a phthalation ratio of 97% and 1.7 g of KBr was kept at 75° C. and vigorously stirred. Thereto, 9.9 g of the seed emulsion prepared above was added and then 0.3 g of modified silicone oil (L7602, a product of Nippon Unicar) was added. After adjusting the pH to 5.5 by adding $H_2SO4$, 67.6 mL of an aqueous solution containing 7.0 g of $AgNO_3$ and an aqueous KBr solution were added by a double jet method over 6 minutes while accelerating the flow rate such that the final flow rate became 5.1 times the initial flow rate. At this time, the silver potential was kept at −20 mV to the saturated calomel electrode. After adding 2 mg of sodium benzene-thiosulfonate and 2 mg of thiourea dioxide, 328 mL of an aqueous solution containing 105.6 g of $AgNO_3$ and an aqueous KBr solution were added by a double jet method over 56 minutes while accelerating the flow rate such that the final flow rate became 3.7 times the initial flow rate. At this time, an AgI fine grain emulsion having a grain size of 0.037 μm was simultaneously added to have a silver iodide content of 27 mol % while accelerating the flow rate and at the same time, keeping the silver potential at −50 mV to the saturated calomel electrode. Then, 121.3 mL of an aqueous solution containing 45.6 g of $AgNO_3$ and an aqueous KBr solution were added by a double jet method over 22 minutes. At this time, the silver potential was kept at +20 mV to the saturated calomel electrode.

The temperature was elevated to 82° C. and the silver potential was adjusted to −80 mV by adding KBr. Thereafter, the above-described AgI fine grain emulsion was added in an amount of 6.33 g in terms of the mass of KI. After the completion of addition, 206.2 mL of an aqueous solution containing 66.4 g of $AgNO_3$ was immediately added over 16 minutes. For 5 minutes at the initial stage of addition, the silver potential was kept at −80 mV by an aqueous KBr solution. The obtained emulsion was washed with water washing and then gelatin was added to adjust the pH to 5.8 and the pAg to 8.7 at 40° C. After adding Compounds 11 and 12, the temperature was elevated to 60° C. Thereafter, Sensitizing Dyes 11 and 12 were added and then, potassium thiocyanate, chloroauric acid, sodium thiosulfate and N,N-dimethylselenourea were added, thereby optimally performing the chemical sensitization. At the completion of chemical sensitization, Compounds 13 and 14 were added. The "optimally performing chemical sensitization" as used herein means that sensitizing dyes and compounds each was added in an amount ranging from $10^{-1}$ to $10^{-8}$ mol per mol of silver halide.

Compound 11

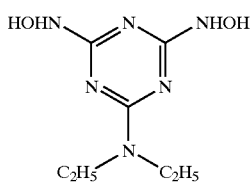

Compound 12

Sensitizing Dye 11

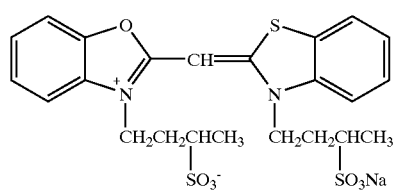

Sensitizing Dye 12

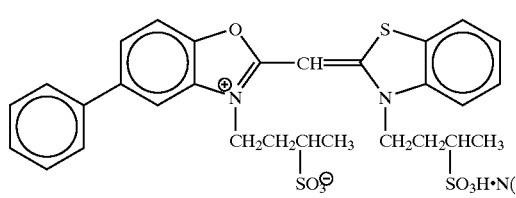

-continued

Compound 13

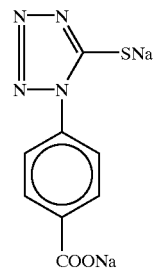

Compound 14

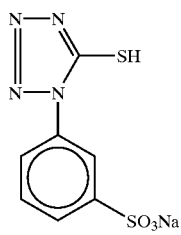

(Production Proceww of Em-B)

1,192 mL of an aqueous solution containing 0.96 g of low molecular weight gelatin and 0.9 g of KBr was kept at 40° C. and vigorously stirred. Thereto, 37.5 mL of an aqueous solution containing 1.49 g of $AgNO_3$ and 37.5 mL of an aqueous solution containing 1.05 g of KBr were added by a double jet method over 30 seconds. After adding 1.2 g of KBr, the temperature was elevated to 75° C. and the ripening was performed. After the completion of ripening, 35 g of trimellited gelatin having a molecular weight of 100,000 where the amino group was chemically modified by a trimellitic acid was added and the pH was adjusted to 7. Thereto, 6 mg of thiourea dioxide was added and then, 116 mL of an aqueous solution containing 29 g of $AgNO_3$ and an aqueous KBr solution were added by a double jet method while accelerating the flow rate such that the final flow rate became 3 times the initial flow rate. At this time, the silver potential was kept at −20 mV to the saturated calomel electrode. Thereafter, 440.6 mL of an aqueous solution containing 110.2 g of $AgNO_3$ and an aqueous KBr solution were added by a double jet method over 30 minutes while accelerating the flow rate such that the final flow rate became 5.1 times the initial flow rate. At this time, the AgI fine grain emulsion used in the preparation of Em-A was simultaneously added to have a silver iodide content of 15.8 mol % while accelerating the flow rate and at the same time, keeping the silver potential at 0 mV to the saturated calomel electrode.

Thereto, 96.5 mL of an aqueous solution containing 24.1 g of $AgNO_3$ and an aqueous KBr solution were added by a double jet method over 3 minutes. At this time, the silver potential was kept at 0 mV. After adding 26 mg of sodium thiosulfate, the temperature was elevated to 55° C. and the silver potential was adjusted to −90 mV by adding an aqueous KBr solution. Thereafter, the above-described AgI fine grain emulsion was added in an amount of 8.5 g in terms of the mass of KI. After the completion of addition, 228 mL of an aqueous solution containing 57 g of $AgNO_3$ was immediately added over 5 minutes. At this time, the potential was adjusted by the aqueous KBr solution to become +20 mV at the completion of addition. The obtained emulsion was washed with water washing and chemically sensitized almost in the same manner as Em-A.

(Production Process of Em-C)

1,192 mL of an aqueous solution containing 0.9 g of KBr and 1.02 g of phthalated gelatin having a molecular weight of 100,000 and a phthalation ratio of 97% and containing 35 μmol/g of methionine was kept at 35° C. and vigorously stirred. Thereto, 42 mL of an aqueous solution containing 4.47 g of AgNO$_3$ and 42 mL of an aqueous solution containing 3.16 g of KBr were added by a double jet method over 9 seconds. After adding 2.6 g of KBr, the temperature was elevated to 63° C. and the ripening was performed. After the completion of ripening, 41.2 g of trimellited gelatin having a molecular weight of 100,000 used in the preparation of Em-B and 18.5 g of NaCl were added. The pH was adjusted to 7.2 and then, 8 mg of dimethylaminoborane was added. Thereafter, 203 mL of an aqueous solution containing 26 g of AgNO$_3$ and an aqueous KBr solution were added by a double jet method while accelerating the flow rate such that the final flow rate became 3.8 times the initial flow rate. At this time, the silver potential was kept at −30 mV to the saturated calomel electrode.

Thereafter, 440.6 mL of an aqueous solution containing 110.2 g of AgNO$_3$ and an aqueous KBr solution were added by a double jet method over 24 minutes while accelerating the flow rate such that the final flow rate became 5.1 times the initial flow rate. At this time, the AgI fine grain emulsion used in the preparation of Em-A was simultaneously added to have a silver iodide content of 2.3 mol % while accelerating the flow rate and at the same time, keeping the silver potential at −20 mV to the saturated calomel electrode. Thereto, 10.7 mL of an aqueous 1N potassium thiocyanate solution was added and then, 153.5 ml of an aqueous solution containing 24.1 g of AgNO$_3$ and an aqueous KBr solution were added by a double jet method over 2 minutes and 30 seconds. At this time, the silver potential was kept at 10 mV. Thereafter, the silver potential was adjusted to −70 mV by adding an aqueous KBr solution. Subsequently, the above-described AgI fine grain emulsion was added in an amount of 6.4 g in terms of the mass of KI. After the completion of addition, 404 mL of an aqueous solution containing 57 g of AgNO$_3$ was immediately added over 45 minutes. At this time, the potential was adjusted by the aqueous KBr solution to become −30 mV at the completion of addition. The obtained emulsion was washed with water washing and chemically sensitized almost in the same manner as Em-A.

(Production Process of Em-D)

Em-D was prepared almost in the same manner as Em-C except that in the preparation of Em-C, the amount of AgNO$_3$ added at the nucleation was changed to 2.3 times and the potential was adjusted by an aqueous KBr solution such that the potential became +90 mV at the completion of the final addition of 404 mL of an aqueous solution containing 57 g of AgNO$_3$.

(Production Process of Em-E)

1,200 mL of an aqueous solution containing 0.75 g of low molecular weight gelatin having a molecular weight of 15,000, 0.9 g of KBr and 0.2 g of modified silicone oil used in the preparation of Em-A was kept at 39° C., adjusted to a pH of 1.8 and vigorously stirred. Thereto, an aqueous solution containing 0.45 g of AgNO$_3$ and an aqueous KBr solution containing 1.5 mol % of KI were added by a double jet method over 16 seconds. At this time, the excess concentration of KBr was kept constant. The temperature was elevated to 54° C. and the ripening was performed. After the completion of ripening, 20 g of phthalated gelatin having a molecular weight of 100,000 and a phthalation ratio of 97% and containing 35 μmol/g of methionine was added. The pH was adjusted to 5.9 and then, 2.9 g of KBr was added. Thereto, 288 mL of an aqueous solution containing 28.8 g of AgNO$_3$ and an aqueous KBr solution were added by a double jet method over 53 minutes. At this time, the AgI fine grain emulsion used in the preparation of Em-A was simultaneously added to have a silver iodide content of 4.1 mol % and the silver potential was kept at −60 mV to the saturated calomel electrode. After adding 2.5 g of KBr, an aqueous solution containing 87.7 g of AgNO$_3$ and an aqueous KBr solution were added by a double jet method over 63 minutes while accelerating the flow rate such that the final flow rate became 1.2 times the initial flow rate. At this time, the above-described AgI fine grain emulsion was simultaneously added to have a silver iodide content of 10.5 mol % while accelerating the flow rate and keeping the silver potential at −70 mV.

Thereafter, 1 mg of thiourea dioxide was added and then, 132 mL of an aqueous solution containing 41.8 g of AgNO$_3$ and an aqueous KBr solution were added by a double jet method over 25 minutes. The addition of the aqueous KBr solution was controlled such that the potential became +20 mV at the completion of addition. Subsequently, 2 mg of sodium benzenethiosulfonate was added, the pH was adjusted to 7.3, the silver potential was adjusted to −70 mV by adding KBr and then the above-described AgI fine grain emulsion was added in an amount of 5.73 g in terms of the mass of KI. After the completion of addition, 609 mL of an aqueous solution containing 66.4 g of AgNO$_3$ was immediately added over 10 minutes. For 6 minutes at the initial stage of addition, the silver potential was kept at −70 mV by an aqueous KBr solution. The obtained emulsion was washed with water and adjusted to a pH of 6.5 and a pAg of 8.2 at 40° C. by adding gelatin. Then, Compounds 11 and 12 were added, the temperature was elevated to 56° C., and the above-described AgI fine grain emulsion was added in an amount of 0.0004 mol per mol of silver. Thereafter, Sensitizing Dyes 13 and 14 were added and then potassium thiocyanate, chloroauric acid, sodium thiosulfate and N,N-dimethylselenourea were added, thereby optimally performing the chemical sensitization. At the completion of chemical sensitization, Compounds 13 and 14 were added.

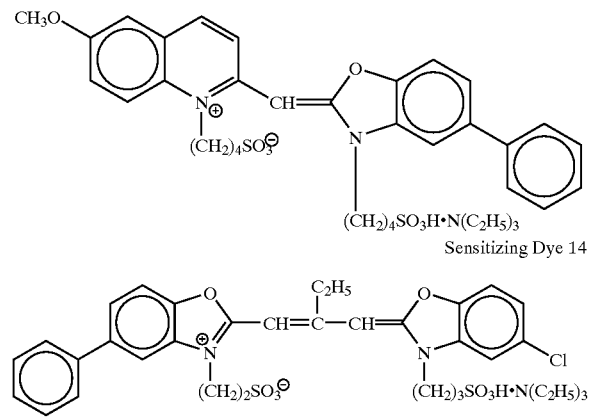

Sensitizing Dye 13

Sensitizing Dye 14

(Production Process of Em-F)

Em-F was prepared almost in the same manner as Em-E except that in the preparation of Em-E, the amount of AgNO$_3$ added at the nucleation was changed to 4.12 times and the sensitizing dyes were changed to Sensitizing Dyes 12, 15, 16 and 17.

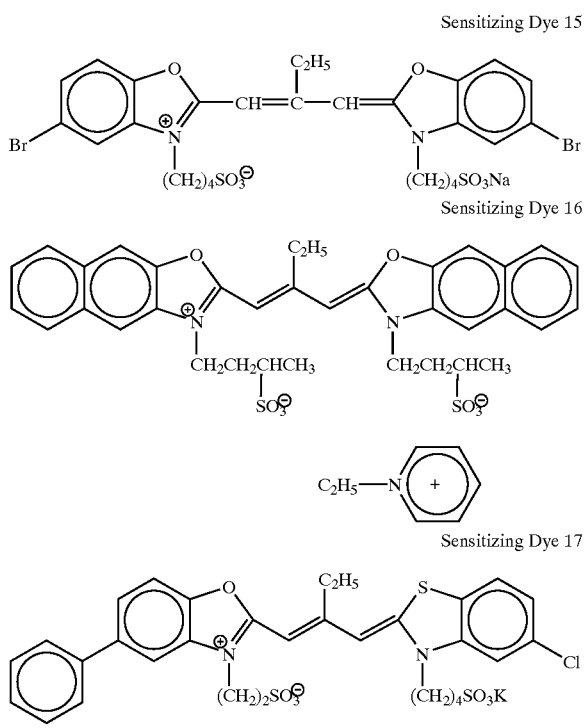

Sensitizing Dye 15

Sensitizing Dye 16

Sensitizing Dye 17

(Production Process of Em-G)

1,200 mL of an aqueous solution containing 0.70 g of low molecular weight gelatin having a molecular weight of 15,000, 0.9 g of KBr, 0.175 g of KI and 0.2 g of modified silicone oil used in the preparation of Em-A was kept at 33° C., adjusted to a pH of 1.8 and vigorously stirred. Thereto, an aqueous solution containing 1.8 g of $AgNO_3$ and an aqueous KBr solution containing 3.2 mol % of KI were added by a double jet method over 9 seconds. At this time, the excess concentration of KBr was kept constant. The temperature was elevated to 62° C. and the ripening was performed. After the completion of ripening, 27.8 g of trimellited gelatin having a molecular weight of 100,000 and containing 35 μmol/g of methionine, where the amino group was chemically modified by a trimellitic acid, was added. The pH was adjusted to 6.3 and then, 2.9 g of KBr was added. Thereto, 270 mL of an aqueous solution containing 27.58 g of $AgNO_3$ and an aqueous KBr solution were added by a double jet method over 37 minutes. At this time, an AgI fine grain emulsion having a grain size of 0.008 μm, which was prepared by mixing an aqueous solution of low molecular weight gelatin having a molecular weight of 15,000, an aqueous $AgNO_3$ solution and an aqueous KI solution in a separate chamber having a magnetic coupling induction-type stirring machine described in JP-A-10-43570 immediately before the addition, was simultaneously added to have a silver iodide content of 4.1 mol % and the silver potential was kept at −60 mV to the saturated calomel electrode.

After adding 2.6 g of KBr, an aqueous solution containing 87.7 g of $AgNO_3$ and an aqueous KBr solution were added by a double jet method over 49 minutes while accelerating the flow rate such that the final flow rate became 3.1 times the initial flow rate. At this time, the above-described AgI fine grain emulsion prepared by mixing those aqueous solutions immediately before the addition was simultaneously added to have a silver iodide content of 7.9 mol % while accelerating the flow rate and keeping the silver potential at −70 mV. Thereafter, 1 mg of thiourea dioxide was added and then, 132 mL of an aqueous solution containing 41.8 g of $AgNO_3$ and an aqueous KBr solution were added by a double jet method over 20 minutes. The addition of the aqueous KBr solution was controlled such that the potential became +20 mV at the completion of addition. The temperature was elevated to 78° C., the pH was adjusted to 9.1, and then the potential was adjusted to −60 mV by adding KBr. Subsequently, the AgI fine grain emulsion used in the preparation of Em-A was added in an amount of 5.73 g in terms of the mass of KI. After the completion of addition, 321 mL of an aqueous solution containing 66.4 g of $AgNO_3$ was immediately added over 4 minutes. For 2 minutes at the initial stage of addition, the silver potential was kept at −60 mV by an aqueous KBr solution. The obtained emulsion was washed with water and chemically sensitized almost in the same manner as Em-F.

(Production Process of Em-H)

An aqueous solution containing 17.8 g of ion exchanged gelatin having a molecular weight of 100,000, 6.2 g of KBr and 0.46 g of KI was kept at 45° C. and vigorously stirred. Thereto, an aqueous solution containing 11.85 g of $AgNO_3$ and an aqueous solution containing 3.8 g of KBr were added by a double jet method over 45 seconds. The temperature was elevated to 63° C., then 24.1 g of ion exchanged gelatin having a molecular weight of 100,000 was added, and ripening was performed. After the completion of ripening, an aqueous solution containing 133.4 g of $AgNO_3$ and an aqueous KBr solution were added by a double jet method over 20 minutes while accelerating the flow rate such that the final flow rate became 2.6 times the initial flow rate. At this time, the silver potential was kept at +40 mV to the saturated calomel electrode.

Also, 10 minutes after the initiation of addition, 0.1 mg of $K_2IrCl_6$ was added. Thereafter, 7 g of NaCl was added and then, an aqueous solution containing 45.6 g of $AgNO_3$ and an aqueous KBr solution were added by a double jet method over 12 minutes. At this time, the silver potential was kept at +90 mV. Over 6 minutes from the initiation of addition, 100 ml of an aqueous solution containing 29 mg of yellow prussiate of potash was added. Then, 14.4 g of KBr was added and 6.3 g of the AgI fine grain emulsion used in the preparation of Em-A was added in an amount of 6.3 g in terms of the mass of KI. After the completion of addition, an aqueous solution containing 42.7 g of $AgNO_3$ and an aqueous KBr solution were immediately added by a double jet method over 11 minutes. At this time, the silver potential was kept at +90 mV. The obtained emulsion was washed with water and chemically sensitized almost in the same manner as Em-F.

(Production Process of Em-I)

Em-I was prepared almost in the same manner as in the preparation of Em-H except that the temperature at the nucleation was changed to 35° C.

(Production Process of Em-J)

1,200 mL of an aqueous solution containing 0.9 g of KBr and 0.38 g of phthalated gelatin having a molecular weight of 100,000 and a phthalation ratio of 97% was kept at 60° C., adjusted to a pH of 2 and vigorously stirred. Thereto, an aqueous solution containing 1.96 g of $AgNO_3$ and an aqueous solution containing 1.67 g of KBr and 0.172 g of KI were added by a double jet method over 30 seconds. After the completion of ripening, 12.8 g of trimellited gelatin having a molecular weight of 100,000 and containing 35 μm/g of methionine, where the amino group was chemically modified by a trimellitic acid, was added. The pH was adjusted to 5.9 and then, 2.99 g of KBr and 6.2 g of NaCl were added. Thereafter, 60.7 mL of an aqueous solution containing 27.3 g of AgNO$_3$ and an aqueous KBr solution were added by a double jet method over 31 minutes. At this time, the silver potential was kept at −50 mV to the saturated calomel electrode. Thereafter, an aqueous solution containing 65.6 g of AgNO$_3$ and an aqueous KBr solution were added by a double jet method over 37 minutes while accelerating the flow rate such that the final flow rate became 2.1 times the initial flow rate. At this time, the AgI fine grain emulsion used in the preparation of Em-A was simultaneously added to have a silver iodide content of 6.5 mol % while accelerating the flow rate and at the same time, keeping the silver potential at −50 mV to the saturated calomel electrode.

Thereto, 1.5 mg of thiourea dioxide was added and then, 132 mL of an aqueous solution containing 41.8 g of AgNO$_3$ and an aqueous KBr solution were added by a double jet method over 13 minutes. At this time, the addition of the aqueous KBr solution was controlled such that the silver potential became +40 mV at the completion of addition. Then, 2 mg of sodium benzenethiosulfonate was added and the silver potential adjusted to −100 mV by adding KBr. Subsequently, the above-described AgI fine grain emulsion was added in an amount of 6.2 g in terms of the mass of KI. After the completion of addition, 300 mL of an aqueous solution containing 88.5 g of AgNO$_3$ was immediately added over 8 minutes. At this time, the potential was adjusted by the addition of the aqueous KBr solution to become +60 mV at the completion of addition. The obtained emulsion was washed with water and then gelatin was added to adjust the pH to 6.5 and the pAg to 8.2 at 40° C. After adding Compounds 11 and 12, the temperature was elevated to 61° C. Thereafter, Sensitizing Dyes 18, 19, 20 and 21 were added and then, K$_2$IrCl$_6$, potassium thiocyanate, chloroauric acid, sodium thiosulfate and N,N-dimethylselenourea were added, thereby optimally performing the chemical sensitization. At the completion of chemical sensitization, Compounds 13 and 14 were added.

Sensitizing Dye 18

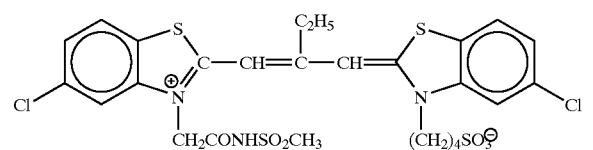

Sensitizing Dye 19

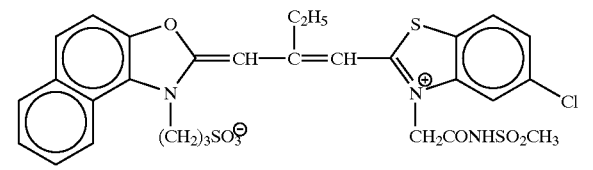

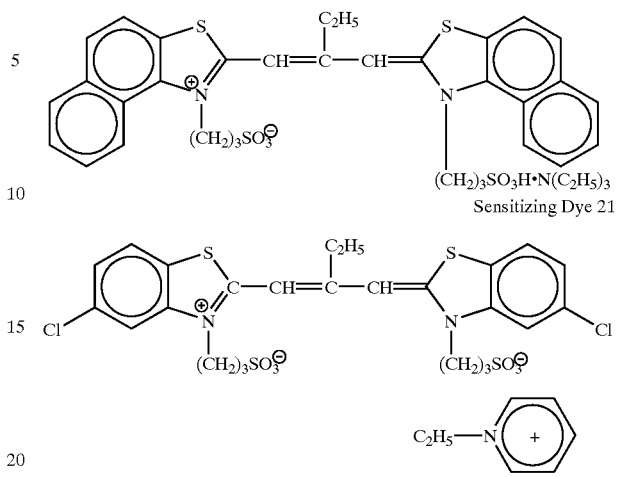

Sensitizing Dye 20

Sensitizing Dye 21

(Production Process of Em-K)

1,200 mL of an aqueous solution containing 4.9 g of low molecular weight gelatin having a molecular weight of 15,000 and 5.3 g of KBr was kept at 60° C. and vigorously stirred. Thereto, 27 mL of an aqueous solution containing 8.75 g of AgNO$_3$ and 36 mL of an aqueous solution containing 6.45 g of KBr were added by a double jet method over 1 minute. The temperature was elevated to 75° C. and then, 21 mL of an aqueous solution containing 6.9 g of AgNO$_3$ was added over 2 minutes. Thereafter, 26 g of NH$_4$NO$_3$ and 56 mL of 1N NaOH were sequentially added and then ripening was performed. After the completion of ripening, the pH was adjusted to 4.8. Thereto, 438 mL of an aqueous solution containing 141 g of AgNO$_3$ and 458 mL of an aqueous solution containing 102.6 g of KBr were added by a double jet method while accelerating the flow rate such that the final flow rate became 4 times the initial flow rate. Subsequently, the temperature was lowered to 55° C. and then, 240 mL of an aqueous solution containing 7.1 g of AgNO$_3$ and an aqueous solution containing 6.46 g of KI were added by a double jet method over 6 minutes. After adding 7.1 g of KBr, 4 mg of sodium benzenethiosulfonate and 0.05 mg of K$_2$IrCl$_6$ were added. Thereto, 177 mL of an aqueous solution containing 57.2 g of AgNO$_3$ and 223 mL of an aqueous solution containing 40.2 g of KBr were added by a double jet method over 8 minutes. The obtained emulsion was washed with water and chemically sensitized almost in the same manner as Em-J.

(Production Process of Em-L)

Em-L was prepared almost in the same manner as in the preparation of Em-K except that the temperature at the nucleation was changed to 40° C.

(Production Process of Em-M)

Em-M was prepared almost in the same manner as Em-J except that the chemical sensitization was performed almost in the same manner as Em-F.

The characteristic values of silver halide emulsions Em-A to Em-M are shown together in Table 8.

TABLE B

| Name of Emulsion | Equivalent-Circle Diameter (μm) Coefficient of Variation (%) | Thickness (μm) Coefficient of Variation (%) | Aspect Ratio Coefficient of Variation (%) | Tabularity | Distance between Twin Faces (μm) Coefficient of Variation (%) | Percentage of Tabular Grains Occupying in Entire Projected Area (%) | Ratio of (100) Face to Side Face | I Content (mol %) Coefficient of Variation (%) | Cl Content (mol %) | Surface I Content (mol %) |
|---|---|---|---|---|---|---|---|---|---|---|
| Em-A | 1.98<br>23 | 0.198<br>28 | 10<br>35 | 51 | 0.014<br>32 | 92 | 23 | 15<br>17 | 0 | 4.3 |
| Em-B | 1.30<br>25 | 0.108<br>27 | 12<br>38 | 111 | 0.013<br>30 | 93 | 22 | 11<br>16 | 0 | 3.6 |
| Em-C | 1.00<br>27 | 0.083<br>26 | 12<br>37 | 145 | 0.012<br>30 | 93 | 18 | 4<br>8 | 1 | 1.8 |
| Em-D | 0.75<br>31 | 0.075<br>18 | 10<br>29 | 133 | 0.010<br>27 | 91 | 33 | 4<br>8 | 2 | 1.9 |
| Em-E | 2.02<br>31 | 0.101<br>19 | 20<br>42 | 198 | 0.013<br>33 | 99 | 20 | 7<br>7 | 0 | 2.4 |
| Em-F | 0.54<br>26 | 0.077<br>18 | 20<br>33 | 260 | 0.013<br>26 | 99 | 23 | 7<br>7 | 0 | 2.5 |
| Em-G | 1.08<br>18 | 0.072<br>15 | 15<br>19 | 208 | 0.008<br>22 | 97 | 23 | 6<br>5 | 0 | 2.0 |
| Em-H | 0.44<br>16 | 0.22<br>13 | 2<br>9 | 9 | 0.013<br>18 | 90 | 38 | 3<br>6 | 2 | 1 |
| Em-I | 0.33<br>17 | 0.165<br>13 | 2<br>12 | 12 | 0.013<br>18 | 88 | 42 | 3<br>6 | 2 | 1 |
| Em-J | 0.83<br>18 | 0.122<br>20 | 15<br>22 | 123 | 0.012<br>19 | 98 | 23 | 5<br>6 | 1 | 1.8 |
| Em-K | 1.09<br>16 | 0.156<br>18 | 7<br>19 | 45 | 0.013<br>16 | 99 | 22 | 3<br>7 | 0 | 2.7 |
| Em-L | 0.84<br>17 | 0.120<br>18 | 7<br>19 | 58 | 0.013<br>16 | 99 | 25 | 3<br>7 | 0 | 2.7 |
| Em-M | 1.83<br>18 | 0.122<br>20 | 15<br>22 | 123 | 0.012<br>19 | 98 | 23 | 5<br>6 | 1 | 1.8 |

1) Support

The support used in this Example was prepared by the following method.

100 Mass parts of polyethylene-2,6-naphthalate polymer and 2 mass parts of Tinuvin P.326 (produced by Geigy) as an ultraviolet absorbent were dried, melted at 300° C., extruded from a T-die, stretched longitudinally to 3.3 times at 140° C., then stretched transversely to 3.3 times at 130° C., and heat fixed at 250° C. for 6 seconds to obtain a PEN (polyethylene naphthalate) film having a thickness of 90 μm. To this PEN film, a blue dye, a magenta dye and a yellow dye (I-1, I-4, 1-6, I-24, I-26, I-27 and II-5 described in *JIII Journal of Technical Disclosure*, No. 94-6023) were added each in an appropriate amount. Furthermore, the film was wound around a stainless steel-made core having a diameter of 20 cm and imparted with heat history of 110° C. for 48 hours to obtain a support difficult of having curling habit.

2) Coating of Undercoat Layer

Both surfaces of the support obtained above were subjected to corona discharge treatment, UV discharge treatment and glow discharge treatment. Then, an undercoat solution comprising 0.1 g/m² of gelatin, 0.01 g/m² of sodium α-sulfodi-2-ethylhexylsuccinate, 0.04 g/m² of salicylic acid, 0.2 g/m² of p-chlorophenol, 0.012 g/m² of $(CH_2=CHSO_2CH_2CH_2NHCO)_2CH_2$ and 0.02 g/m² of a polyamide-epichlorohydrin polycondensate was coated (10 ml/m², using a bar coater) on each surface to provide an undercoat layer in the side of high temperature at the stretching. The drying was performed at 115° C. for 6 minutes (rollers and conveyance device in the drying zone all were heated at 115° C.)

3) Coating of Back Layer

On one surface of the undercoated support, an antistatic layer, a magnetic recording layer and a slipping layer each having the following composition were provided as the back layer.

3-1) Coating of Antistatic Layer

The antistatic layer was provided by coating 0.2 g/m² of a fine particle powder dispersion of tin oxide-antimony oxide composite having an average particle size of 0.005 μm (secondary aggregate particle size: about 0.08 μm) and a resistivity of 5 Ω·cm together with 0.05 g/m² of gelatin, 0.02 g/m² of $(CH_2=CHSO_2CH_2CH_2NHCO)_2CH_2$, 0.005 g/m² of poly(polymerization degree: 10)oxyethylene-p-nonylphenol and resorcin.

3-2) Coating of Magnetic Recording Layer

Using a bar coater, 0.06 g/m² of cobalt-γ-iron oxide (specific surface area: 43 m²/g, longer axis: 0.14 μm, single axis: 0.03 μm, saturation magnetization: 89 emu/g, $Fe^{2+}/Fe^{3+}=6/94$, the surface was treated with aluminum oxide and silicon oxide to 2 mass % based on iron oxide) subjected to a covering treatment with 3-poly(polymerization degree: 15)oxyethylene-propyloxytrimethoxysilane (15 mass %) was coated together with 1.2 g/m² of diacetyl cellulose (iron oxide was dispersed by an open kneader and a sand mill), 0.3 g/m² of $C_2H_5C(CH_2OCONH-C_6H_3(CH_3)NCO)_3$ as a hardening agent and acetone, methyl ethyl ketone and cyclohexanone as solvents to obtain a magnetic recording layer having a layer thickness of 1.2 μm. Silica particle (0.3 μm) as a matting agent and aluminum oxide (0.15 μm) as an abrasive subjected to a covering treatment with 3-poly (polymerization degree: 15)oxyethylene-propyloxytrimethoxysilane (15 mass %) were added each to 10 mg/m². The drying was performed at 115° C. for 6 minutes (rollers and conveyance device in the drying zone all were heated at 115° C.). The increase in the color density of the magnetic recording layer $D^B$ by X-light (blue filter) was about 0.1, the saturation magnetization moment of the magnetic recording layer was 4.2 emu/g, the coercive force was $7.3 \times 10^4$ A/m and the angular ratio was 65%.

3-3) Preparation of Slipping Layer

Diacetyl cellulose (25 mg/m$^2$) and a mixture of $C_6H_{13}CH(OH)C_{10}H_{20}COOC_{40}H_{81}$ (Compound a, 6 mg/m$^2$)/$C_{50}H_{101}O(CH_2CH_2O)_{16}H$ (Compound b, 9 mg/m$^2$) were coated. This mixture was prepared by melting the compounds in xylene/propylene monomethyl ether (1/1) at 105° C. and pouring and dispersing the melt in propylene monomethyl ether (10-fold amount) at normal temperature. The resulting mixture was formed into a dispersion (average particle size: 0.01 μm) in acetone and then added. Silica particle (0.3 μm) as a matting agent and alumina oxide (0.15 μm) covered with 3-poly(polymerization degree: 15)oxyethylenepropyloxytrimethoxysilane (15 mass %) as an abrasive were added each to 15 mg/m$^2$. The drying was performed at 115° C. for 6 minutes (rollers and the conveyance device in the drying zone all were heated at 115° C.). The slipping layer had excellent capabilities such that the coefficient of dynamic friction was 0.06 (stainless steel ball: 5 mmφ; load: 100 g; speed: 6 cm/min), the coefficient of static friction was 0.07 (by clip method) and the coefficient of dynamic friction between the emulsion surface and the slipping layer, which will be described later, was 0.12.

4) Coating of Light-sensitive Layer

Layers each having the following composition were coated one on another in the side opposite the back layer provided above to prepare a color negative light-sensitive material Sample 901.

(Composition of Light-sensitive Layer)

The main materials used in each layer are classified as follows.

ExC: cyan coupler
ExM: magenta coupler
ExY: yellow coupler
UV: ultraviolet absorbent
HBS: high-boiling point organic solvent
H: gelatin hardening agent (Specific Compounds are Noted by the Numeral Affixed to the Symbol and Chemical Formulae are Shown Later.)

Numerals corresponding to respective components each shows a coated amount expressed by the unit of g/m$^2$. In the case of silver halide, the coated amount is shown in terms of silver.

| First Layer: (First Antihalation Layer) | |
|---|---|
| Black Colloidal Silver | as silver 0.155 |
| Surface fogged AgBrI (2) of 0.07 μm | as silver 0.01 |
| Gelatin | 0.87 |
| ExC-1 | 0.002 |
| ExC-3 | 0.002 |
| Cpd-2 | 0.001 |
| HBS-1 | 0.004 |
| HBS-2 | 0.002 |
| Second Layer: (Second Antihalation Layer) | |
| Black Colloidal Silver | as silver 0.066 |
| Gelatin | 0.407 |
| ExM-1 | 0.050 |
| ExF-1 | 2.0 × 10$^{-3}$ |
| HBS-1 | 0.074 |
| Solid Disperse Dye ExF-2 | 0.015 |
| Solid Disperse Dye ExF-3 | 0.020 |
| Third Layer: (Interlayer) | |
| AgBrI (2) of 0.07 μm | as silver 0.020 |
| ExC-2 | 0.022 |
| Polyethyl acrylate latex | 0.085 |
| Gelatin | 0.294 |
| Fourth Layer: (Low-speed Red-Sensitive Emulsion Layer) | |
| Em-K | as silver 0.323 |
| ExC-1 | 0.109 |
| ExC-3 | 0.044 |
| ExC-4 | 0.072 |
| ExC-5 | 0.011 |
| ExC-6 | 0.003 |
| Cpd-2 | 0.025 |
| Cpd-4 | 0.025 |
| HBS-1 | 0.17 |
| Gelatin | 0.80 |
| Fifth Layer: (Medium-speed Red-Sensitive Emulsion Layer) | |
| Em-L | as silver 0.21 |
| Em-J | as silver 0.62 |
| ExC-1 | 0.14 |
| ExC-2 | 0.026 |
| ExC-3 | 0.020 |
| ExC-4 | 0.12 |
| ExC-5 | 0.016 |
| ExC-6 | 0.007 |
| Cpd-2 | 0.036 |
| Cpd-4 | 0.028 |
| HBS-1 | 0.16 |
| Gelatin | 1.18 |
| Sixth Layer: (High-speed Red-Sensitive Emulsion Layer) | |
| Emulsion V-a of Example V | as silver 1.47 |
| ExC-1 | 0.18 |
| ExC-3 | 0.07 |
| ExC-6 | 0.029 |
| ExC-7 | 0.010 |
| ExY-5 | 0.008 |
| Cpd-2 | 0.046 |
| Cpd-4 | 0.077 |
| HBS-1 | 0.25 |
| HBS-2 | 0.12 |
| Gelatin | 2.12 |
| Seventh Layer: (Interlayer) | |
| Cpd-1 | 0.089 |
| Solid Disperse Dye ExF-4 | 0.030 |
| HBS-1 | 0.050 |
| Polyethyl acrylate latex | 0.83 |
| Gelatin | 0.84 |
| Eighth Layer: (Layer for Imparting Interimage Effect to Red-Sensitive Layer) | |
| Em-E | as silver 0.560 |
| Cpd-4 | 0.030 |
| ExM-2 | 0.096 |
| ExM-3 | 0.028 |
| ExY-1 | 0.031 |
| ExG-1 | 0.006 |
| HBS-1 | 0.085 |
| HBS-3 | 0.003 |
| Gelatin | 0.58 |
| Ninth Layer: (Low-speed Green-Sensitive Emulsion Layer) | |
| Em-G | as silver 0.39 |
| Em-H | as silver 0.28 |
| Em-I | as silver 0.35 |
| ExM-2 | 0.36 |
| ExM-3 | 0.045 |
| ExG-1 | 0.005 |
| HBS-1 | 0.28 |
| HBS-3 | 0.01 |
| HBS-4 | 0.27 |
| Gelatin | 1.39 |

Tenth Layer: (Medium-speed Green-Sensitive Emulsion Layer)

| | |
|---|---|
| Em-F | as silver 0.20 |
| Em-G | as silver 0.25 |
| ExC-6 | 0.009 |
| ExM-2 | 0.031 |
| ExM-3 | 0.029 |
| ExY-1 | 0.006 |
| ExM-4 | 0.028 |
| ExG-1 | 0.005 |
| HBS-1 | 0.064 |
| HBS-3 | $2.1 \times 10^{-3}$ |
| Gelatin | 0.44 |

Eleventh Layer: (High-speed Green-Sensitive Emulsion Layer)

| | |
|---|---|
| Em-M | as silver 0.99 |
| ExC-6 | 0.004 |
| ExM-1 | 0.016 |
| ExM-3 | 0.036 |
| ExM-4 | 0.020 |
| ExM-5 | 0.004 |
| ExY-5 | 0.003 |
| ExM-2 | 0.013 |
| ExG-1 | 0.005 |
| Cpd-4 | 0.007 |
| HBS-1 | 0.18 |
| Polyethyl acrylate latex | 0.099 |
| Gelatin | 1.11 |

Twelfth Layer: (Yellow Filter Layer)

| | |
|---|---|
| Yellow Colloidal Silver | as silver 0.047 |
| Cpd-1 | 0.16 |
| Oil-Soluble Dye ExF-5 | 0.010 |
| Solid Disperse Dye ExF-6 | 0.010 |
| HBS-1 | 0.082 |
| Gelatin | 1.057 |

Thirteenth Layer: (Low-speed Blue-Sensitive Emulsion Layer)

| | |
|---|---|
| Em-B | as silver 0.18 |
| Em-C | as silver 0.20 |
| Em-D | as silver 0.07 |
| ExC-1 | 0.041 |
| ExC-8 | 0.012 |
| ExY-1 | 0.035 |
| ExY-2 | 0.71 |
| ExY-3 | 0.10 |
| ExY-4 | 0.005 |
| Cpd-2 | 0.10 |
| Cpd-3 | $4.0 \times 10^{-3}$ |
| HBS-1 | 0.24 |
| Gelatin | 1.41 |

Fourteenth Layer: (High-speed Blue-Sensitive Emulsion Layer)

| | |
|---|---|
| Em-A | as silver 0.75 |
| ExC-1 | 0.013 |
| ExY-2 | 0.31 |
| ExY-3 | 0.05 |
| ExY-6 | 0.062 |
| Cpd-2 | 0.075 |
| Cpd-3 | $1.0 \times 10^{-3}$ |
| HBS-1 | 0.10 |
| Gelatin | 0.91 |

Fifteenth Layer: (First Protective Layer)

| | |
|---|---|
| AgBrI (2) of 0.07 µm | as silver 0.30 |
| UV-1 | 0.21 |
| UV-2 | 0.13 |
| UV-3 | 0.20 |
| UV-4 | 0.025 |
| F-18 | 0.009 |
| F-19 | 0.005 |
| F-20 | 0.005 |
| HBS-1 | 0.12 |
| HBS-4 | $5.0 \times 10^{-2}$ |
| Gelatin | 2.3 |

Sixteenth Layer: (Second Protective Layer)

| | |
|---|---|
| H-1 | 0.40 |
| B-1 (Diameter: 1.7 µm) | $5.0 \times 10^{-2}$ |
| B-2 (Diameter: 1.7 µm) | 0.15 |
| B-3 | 0.05 |
| S-1 | 0.20 |
| Gelatin | 0.75 |

Furthermore, in order to improve storability, processability, pressure resistance, antifungal and microbicidal property, antistatic property and coatability, W-1 to W-5, B-4 to B-6, F-1 to F-18, iron salt, lead salt, gold salt, platinum salt, palladium salt, iridium salt, ruthenium salt and rhodium salt were appropriately added to each layer. Also, in the preparation of Sample VI-901, calcium in the form of an aqueous calcium nitrate solution was added in an amount of $8.5 \times 10^{-3}$ g to the coating solution for the eighth layer and in an amount of $7.9 \times 10^{-3}$ g to the coating solution for the eleventh layer, per mol of silver halide.

Samples VI-902 to VI-903 were prepared by changing Emulsion V-a prepared in Example V for the six layer to Emulsions V-b and V-c, respectively.

Preparation of Dispersion of Organic Solid Disperse Dye:

ExF-3 was dispersed by the following method. That is, 21.7 mL of water, 3 mL of a 5% aqueous solution of sodium p-octylphenoxyethoxyethanesulfonate and 0.5 g of a 5% aqueous solution of p-octylphenoxypolyoxyethylene ether (polymerization degree: 10) were charged into a 700-mL pot mill and thereto 5.0 g of Dye ExF-3 and 500 ml of zirconium oxide beads (diameter: 1 mm) were added. The contents were dispersed for 2 hours using a BO-Type vibration ball mill manufactured by Chuo Koki K. K. After the dispersion, the contents were taken out and added to 8 g of an aqueous 12.5% gelatin solution and thereafter, beads were removed by filtration to obtain a gelatin dispersion of the dye. The thus-obtained fine dye particles had an average particle diameter of 0.24 µm.

The solid dispersion of ExF-4 was obtained in the same manner. The fine dye particles obtained had an average particle diameter of 0.45 µm. ExF-2 was dispersed by the microprecipitation dispersing method described in Example 1 of EP-A-549489. The average particle diameter was 0.06 µm.

The solid dispersion of ExF-6 was dispersed by the following method.

To 2,800 g of a wet cake of ExF-6 containing 18% or water, 4,000 g of water and 376 g of a 3% solution of W-2 were added and stirred to obtain a slurry of ExF-6 having a concentration of 32%. Then, 1,700 mL of zirconia beads having an average particle size of 0.5 mm were filled in Ultraviscomill (UVM-2) manufactured by Imex and the slurry was passed therethrough and pulverized at a peripheral speed of about 10 m/sec and a discharge amount of 0.5 L/min for 8 hours. The average particle size was 0.52 µm.

The compounds used for forming each layer are shown below.

ExC-1
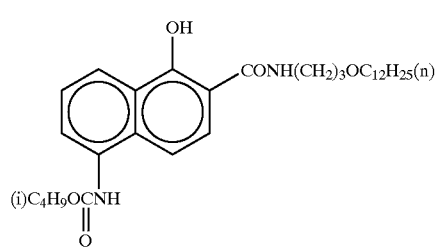
ExC-2
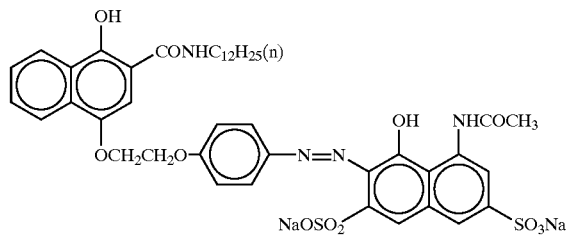
ExC-3
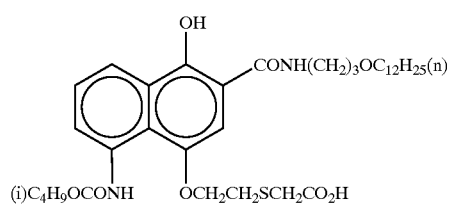
ExC-4
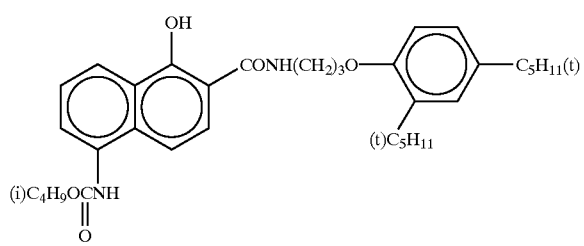
ExC-5
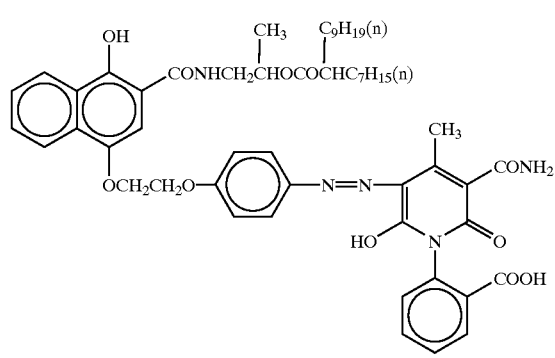
ExC-6
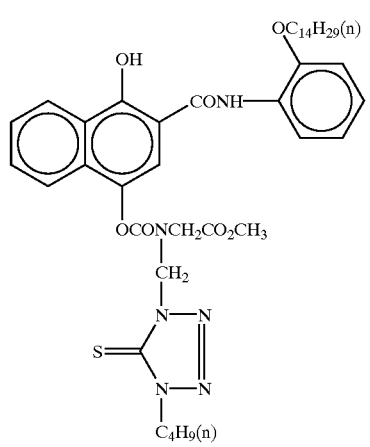
ExC-7
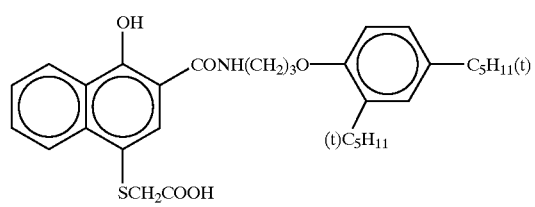
ExC-8
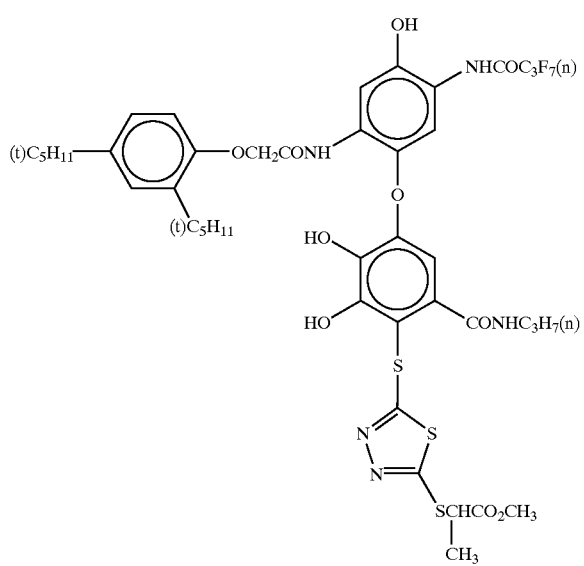

ExM-1
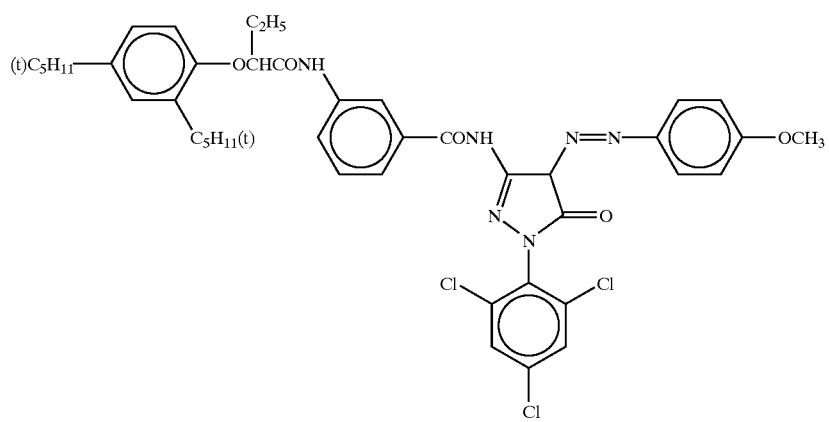
ExM-2
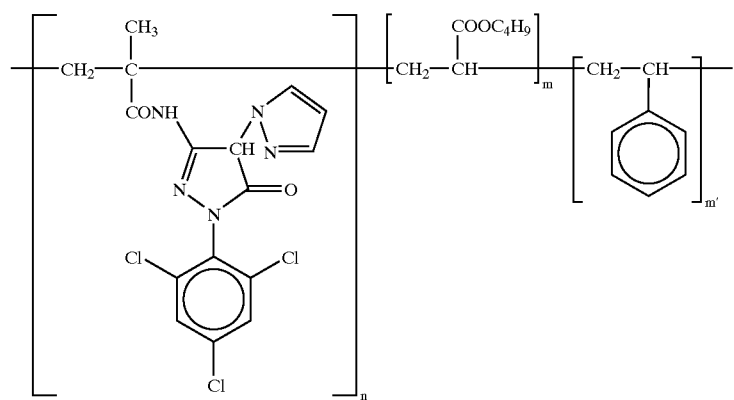
n = 50
m = 25
m' = 25
mol. wt. about 20,000
ExM-3
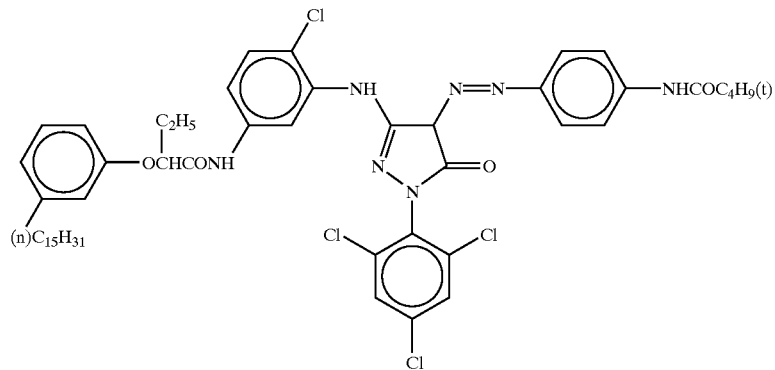
ExM-4
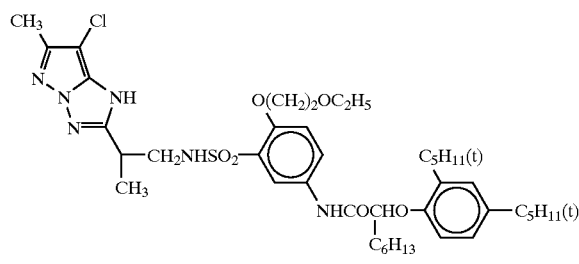
ExM-5
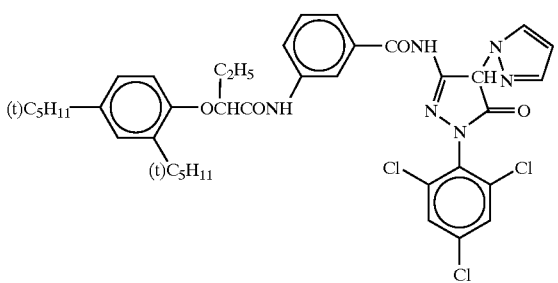

-continued
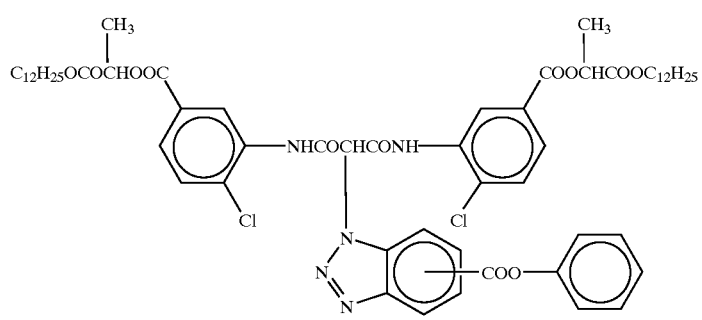
ExY-1
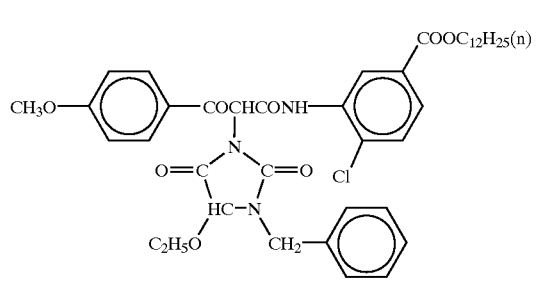
ExY-2
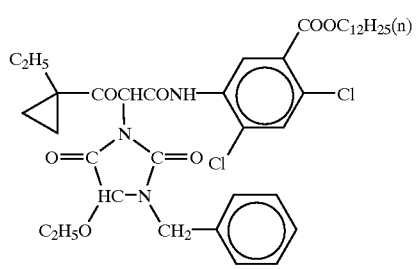
ExY-3
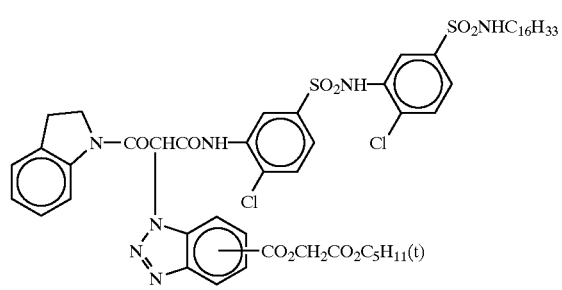
ExY-4
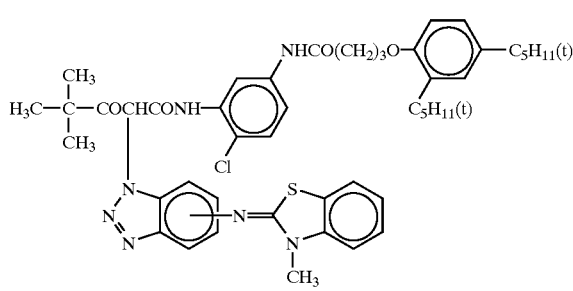
ExY-5
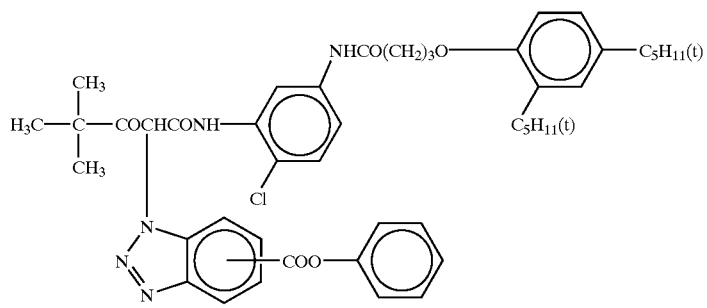
ExY-6
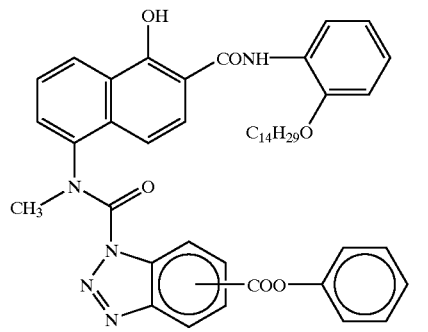
ExG-1
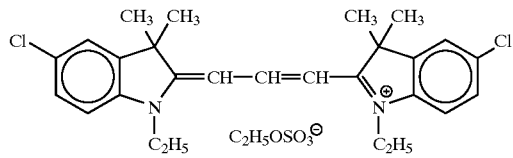
ExF-1

-continued
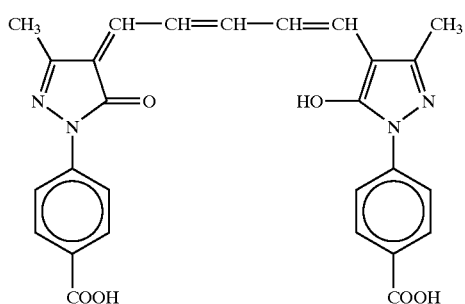
ExF-2
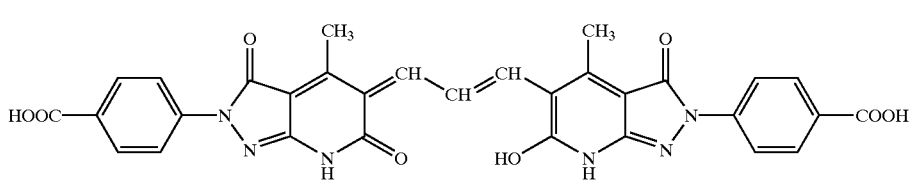
ExF-3
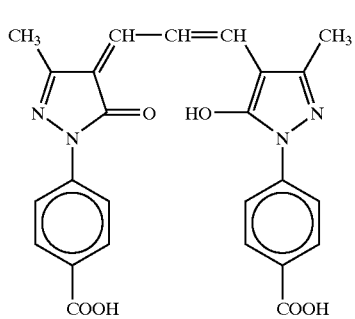
ExF-4
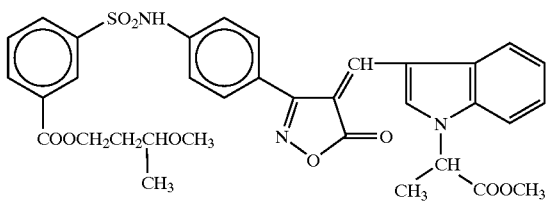
ExF-5
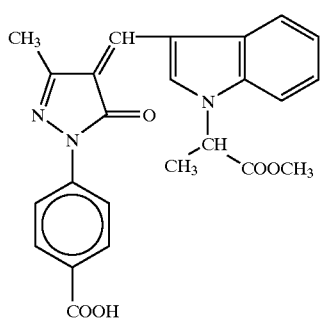
ExF-6
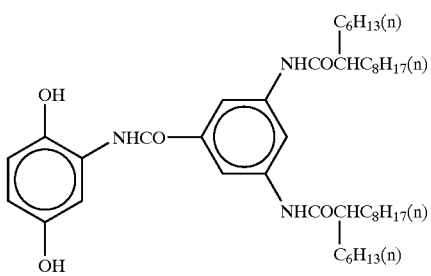
Cpd-1
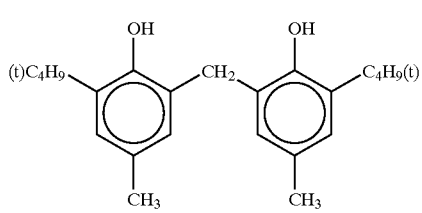
Cpd-2
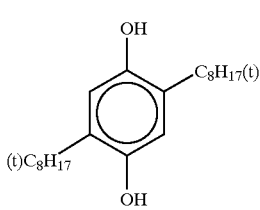
Cpd-3
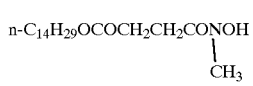
Cpd-4
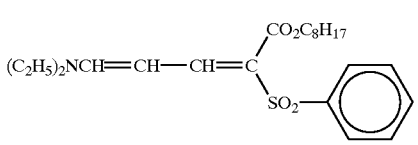
UV-1

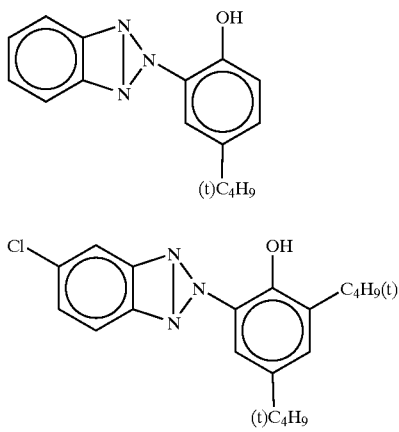

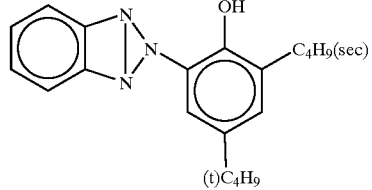

Di-n-Butyl phthalate

UV-4 Tricresyl phosphate

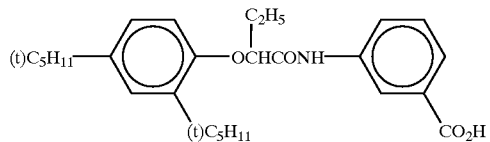

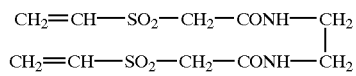

Tri(2-ethylhexyl) phosphate

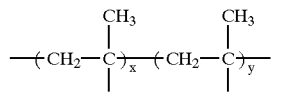

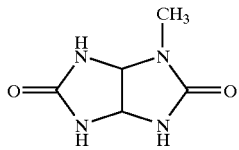

S-1

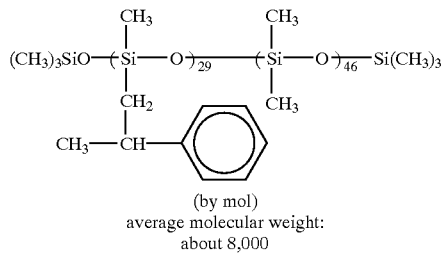

x/y = 10/90 (by mass)
average molecular weight:
about 35,000

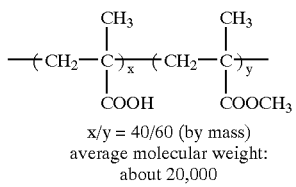

x/y = 40/60 (by mass)
average molecular weight:
about 20,000

B-2

$(CH_3)_3SiO-(Si(CH_3)-O)_{29}-(Si(CH_3)(CH_2CH(CH_3)C_6H_5)-O)_{46}-Si(CH_3)_3$ (by mol)
average molecular weight:
about 8,000

B-4

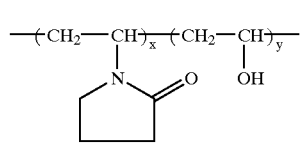

x/y = 70/30 (by mass)
average molecular weight:
about 17,000

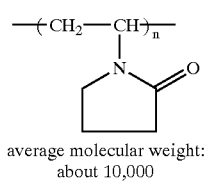

average molecular weight:
about 750,000

B-6

$C_8F_{17}SO_2NHCH_2CH_2CH_2OCH_2CH_2\overset{\oplus}{N}(CH_3)_3$

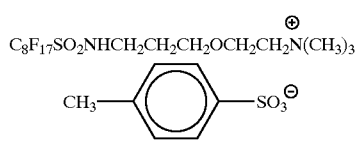

average molecular weight:
about 10,000

-continued

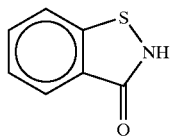
F-15

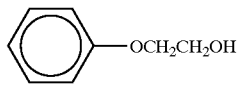
F-16

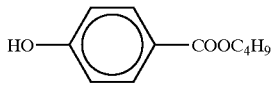

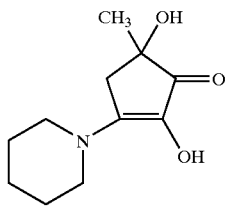
F-19

F-17

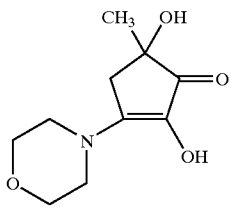
F-18

F-20

Each sample was exposed for 1/100 second through Gelatin Filter SC-39 (a long wavelength light transmitting filter with a cut-off wavelength of 390 nm) produced by Fuji Photo Film Co., Ltd. and a continuous wedge. The development was performed as follows using an automatic developing machine FP-360B manufactured by Fuji Photo Film Co., Ltd. which was modified not to flow the overflow solution of the bleaching bath to the post bath but to discharge all to the waste solution tank. In this FP-360B, an evaporation correcting means described in *JIII Journal of Technical Disclosure*, No. 94-4992 was mounted.

The processing steps and the composition of each processing solution are shown below.

| Step | (Processing Step) Processing Time | Processing Temperature (° C.) | Replenishing Amount* (mL) | Tank Volume (L) |
|---|---|---|---|---|
| Color development | 3 min 5 sec | 37.8 | 20 | 11.5 |
| Bleaching | 50 sec | 38.0 | 5 | 5 |
| Fixing (1) | 50 sec | 38.0 | — | 5 |
| Fixing (2) | 50 sec | 38.0 | 8 | 5 |
| Water washing | 30 sec | 38.0 | 17 | 3 |
| Stabilization (1) | 20 sec | 38.0 | — | 3 |
| Stabilization (2) | 20 sec | 38.0 | 15 | 3 |
| Drying | 1 min 30 sec | 60.0 | | |

*Replenishing amount was per 1.1 m of 35 mm-width light-sensitive material (corresponding to 1 roll of 24 Ex.).

The stabilizing solution and the fixing solution each was in a countercurrent system of from (2) to (1) and the overflow solution of washing water was all introduced into the fixing bath (2). The amount of developer carried over into the bleaching step, the amount of bleaching solution carried over into the fixing step and the amount of fixing solution carried over into the water washing step were 2.5 mL, 2.0 mL and 2.0 mL, respectively, per 1.1 m of 35 mm-width light-sensitive material. The cross-over time was 6 seconds in each interval and this time is included in the processing time of the previous step.

The open area of the above-described processing machine was 100 cm² for the color developer, 120 cm² for the bleaching solution and about 100 cm² for other processing solutions.

The composition of each processing solution is shown below.

| | Tank Solution (g) | Replenisher (g) |
|---|---|---|
| (Color Developer) | | |
| Diethylenetriaminepentaacetic acid | 3.0 | 3.0 |
| Disodium catechol-3,5-disulfonate | 0.3 | 0.3 |
| Sodium sulfite | 3.9 | 5.3 |
| Potassium carbonate | 39.0 | 39.0 |
| Disodium N,N-bis(2-sulfonato-ethyl) hydroxylamine | 1.5 | 2.0 |
| Potassium bromide | 1.3 | 0.3 |
| Potassium iodide | 1.3 mg | — |
| 4-Hydroxy-6-methyl-1,3,3a,7-tetrazaindene | 0.05 | — |
| Hydroxylamine sulfate | 2.4 | 3.3 |
| 2-Methyl-4-[N-ethyl-N-β-hydroxy-ethylamino]aniline sulfate | 4.5 | 6.5 |
| Water to make | 1.0 L | 1.0 L |
| pH (adjusted by potassium hydroxide and sulfuric acid) | 10.05 | 10.18 |
| (Bleaching Solution) | | |
| Ammonium 1,3-diaminopropane-tetraacetato ferrate monohydrate | 113 | 170 |
| Ammonium bromide | 70 | 105 |
| Ammonium nitrate | 14 | 21 |
| Succinic acid | 34 | 51 |
| Maleic acid | 28 | 42 |
| Water to make | 1.0 L | 1.0 L |
| pH [adjusted by aqueous ammonia] | 4.6 | 4.0 |

(Fixing Solution (1): Tank Solution)

A 5:95 (by volume) mixed solution of the bleaching tank solution above and the fixing tank solution shown below (pH: 6.8).

(Fixing Solution (2))

|  | Tank Solution (g) | Replenisher (g) |
| --- | --- | --- |
| Aqueous ammonium thiosulfate solution (750 g/L) | 240 ml | 720 ml |
| Imidazole | 7 | 21 |
| Ammonium methanethiosulfonate | 5 | 15 |
| Ammonium methanesulfinate | 10 | 30 |
| Ethylenediaminetetraacetic acid | 13 | 39 |
| Water to make | 1.0 L | 1.0 L |
| pH [adjusted by aqueous ammonia and acetic acid] | 7.4 | 7.45 |

(Washing Water)

Tap water was passed through a mixed bed column filled with an H-type strongly acidic cation exchange resin (Amberlite IR-120B, produced by Rhom and Haas) and an OH-type strongly basic anion exchange resin (Amberlite IR-400, produced by the same company) to reduce the calcium and magnesium ion concentrations each to 3 mg/L or less and then thereto 20 mg/L of sodium isocyanurate dichloride and 150 mg/L of sodium sulfate were added. The resulting solution had a pH of 6.5 to 7.5.

(Stabilizing Solution)
Tank solution and replenisher were common.

|  | (unit: g) |
| --- | --- |
| Sodium p-toluenesulfinate | 0.03 |
| Polyoxyethylene-p-monononylphenyl ether (average polymerization degree: 10) | 0.2 |
| Sodium 1,2-benzoisothiazolin-3-one | 0.10 |
| Disodium ethylenediaminetetra-acetate | 0.05 |
| 1,2,4-Triazole | 1.3 |
| 1,4-Bis(1,2,4-triazol-1-yl-methyl)piperazine | 0.75 |
| Water to make | 1.0 L |
| pH | 8.5 |

The results are shown in Table 9.

TABLE 9

| Sample No. | Name of Emulsion of Sixth Layer | Fog | Sensitivity | |
| --- | --- | --- | --- | --- |
| VI-901 | V-a | 0.18 | 114 | Comparison |
| VI-902 | V-b | 0.18 | 130 | Invention |
| VI-903 | V-c | 0.18 | 100 | Comparison |

Sensitivity is shown relatively to Sample VI-903 of which sensitivity is taken as 100.

As apparently seen from Table 9, a silver halide emulsion having high-sensitivity with the fog on the equal level can be prepared by using an emulsion produced according to the production process of the present invention.

Example VII

The production process of emulsion of the present invention is described in detail below.
(Preparation of Emulsion VII-a)

1,100 mL of an aqueous solution containing 0.32 g of KBr and 1.38 g of oxidation-treated low molecular weight gelatin having an average molecular weight of 20,000 was stirred while keeping at 5° C. Thereto, 200 ml of an aqueous $AgNO_3$ (1.0 g) solution and 200 ml of an aqueous solution containing KBr (0.7 g) and oxidation-treated low molecular weight gelatin (3.3 g) having an average molecular weight of 20,000 were added over 15 seconds. After adding 120 ml of an aqueous solution containing 2.6 g of KBr, the temperature was elevated to 75° C. and then, 200 ml of an aqueous solution containing 12 g of sodium catechol disulfonate was added. At this time, the liquid volume was 1,950 ml. Subsequently, as the first growth, 1,000 ml of an aqueous $AgNO_3$ (231.4 g) solution and an aqueous KBr solution having an equimolar concentration were added by a double jet method while acceleration the flow rate. At this time, the liquid volume was 3,980 ml. During the addition, the silver potential was kept at −20 mV to the saturated calomel electrode. In the course of addition, 10 ml of an aqueous solution containing potassium hexachloroiridate (0.2 mg) was added. At the completion of addition of $AgNO_3$, 10 ml of an aqueous solution containing sodium benzenethiosulfonate (2 mg) was added.

Thereafter, as the outermost layer growth, 100 ml of an aqueous $AgNO_3$ solution (34.1 g) and 100 ml of an aqueous KBr solution containing KI were added. The concentration of KI was adjusted to give a silver iodide content of 12 mol %. At this time, the silver potential was kept at 30 mV to the saturated calomel electrode.

Thereafter, 100 ml of an aqueous solution containing 14 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. At this time, the liquid volume was 4,290 ml. After lowering the temperature to 40° C., 9.7 ml of phenoxyethanol was added and further, 20 ml of an aqueous KI (0.27 g) solution was added. Thereto, Sensitizing Dyes IV, V and VI were added at a molar ratio of 69:30:1 to a proportion of 70% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 15 ml of an aqueous solution containing potassium hexacyano-ruthenate (II) (3.2 mg), 100 ml of an aqueous $AgNO_3$ (12.66 g) solution and 100 ml of an aqueous solution containing KBr (4.66 g), KI (0.88 g) and NaCl (3.83 g) were added by a double jet method over 2 minutes.

Thereafter, 15 ml of Epitaxial Part Shape Stabilizer I (80 mg) was added. At this time, the liquid volume was 4,650 ml. Subsequently, normal water washing was performed.

Here, the temperature was kept at 35° C. After adding 77 g of the above-described gelatin, the pH at 40° C. was adjusted to 6.5 and the silver potential was adjusted to 80 mV to the saturated calomel electrode using an aqueous NaCl solution. After adding Epitaxial Part Shape Stabilizer/Storability Improver II (6 mg), the temperature was elevated to 68° C. and then, chemical sensitization was optimally performed by adding $0.7 \times 10^{-4}$ mol of potassium thiocyanate, $1.4 \times 10^{-6}$ mol of chloroauric acid, $0.5 \times 10^{-5}$ mol of sodium thiosulfate and $1.2 \times 10^{-6}$ mol of N,N-dimethylselenourea per mol of silver halide. Antifoggant I ($8.3 \times 10^{-4}$ mol) was added and the chemical sensitization was completed.

Emulsion VII-a obtained was tabular grains such that the average equivalent-circle diameter was 1.78 $\mu$m, the coefficient of variation in the equivalent-circle diameter was 27%, the average thickness was 0.143 $\mu$m and the average aspect ratio was 12.4. In this emulsion, 90% or more of the entire projected area was occupied by hexagonal tabular grains where the ratio of the length of a side having a maximum length to the length of a side having a minimum length was 1.5 or less and an epitaxial junction was present at all of six apex parts. The emulsion was observed by a transmission electron microscope at a low temperature, as a result, 90% or more of the entire projected area was occupied by grains having no dislocation line in the main plane part except for the epitaxial part and having network dislocation lines in the epitaxial part. In this grain, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

(Preparation of Emulsion VII-b)

Emulsion VII-b was prepared almost in the same manner as Emulsion VII-a except that the first growth was changed as follows. The chemical sensitization and the like were appropriately optimized according to the surface area of emulsion grain. As the first growth, silver halide fine grains prepared by adding 1,000 ml of an aqueous AgNO$_3$ (231.4 g) solution kept at 25° C. and 1,000 ml of an aqueous solution containing KBr (162.0 g) and 78 g of oxidation-treated gelatin having a molecular weight of 10,000 and kept at 25° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at –20 mV to the calomel electrode by separately adding a KBr solution. At this time, the liquid volume was nearly 3,980 ml. In the fine grains added, the number average equivalent-circle diameter was 0.015 $\mu$m and the coefficient of variation in the equivalent-circle diameter was 36%.

(Preparation of Emulsion VII-c)

Emulsion VII-c was prepared almost in the same manner as Emulsion VII-a except that the first growth was changed as follows. The chemical sensitization and the like were appropriately optimized according to the surface area of emulsion grain. As the first growth, silver halide fine grains prepared by adding 1,000 ml of an aqueous AgNO$_3$ (231.4 g) solution kept at 10° C. and 1,000 ml of an aqueous solution containing KBr (162.0 g) and 108 g of oxidation-treated gelatin having a molecular weight of 15,000 and kept at 15° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at –20 mV to the calomel electrode by separately adding a KBr solution. At this time, the liquid volume was nearly 3,980 ml. In the fine grains added, the number average equivalent-circle diameter was 0.014 $\mu$m and the coefficient of variation in the equivalent-circle diameter was 32%.

(Preparation of Emulsion VII-d)

Emulsion VII-d was prepared almost in the same manner as Emulsion VII-a except that the first growth was changed as follows. The chemical sensitization and the like were appropriately optimized according to the surface area of emulsion grain. As the first growth, silver halide fine grains prepared by adding 1,000 ml of an aqueous AgNO$_3$ (231.4 g) solution kept at 10° C. and 1,000 ml of an aqueous solution containing KBr (153.9 g) and 108 g of oxidation-treated gelatin having a molecular weight of 15,000 and kept at 15° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at –20 mV to the calomel electrode by separately adding a KBr solution. At this time, the liquid volume was nearly 3,980 ml. In the fine grains added, the number average equivalent-circle diameter was 0.014 $\mu$m and the coefficient of variation in the equivalent-circle diameter was 28%.

(Preparation of Emulsion VII-e)

Emulsion VII-e was prepared almost in the same manner as Emulsion VII-a except that the first growth was changed as follows. The chemical sensitization and the like were appropriately optimized according to the surface area of emulsion grain. As the first growth, silver halide fine grains prepared by adding 2,500 ml of an aqueous AgNO$_3$ (231.4 g) solution kept at 15° C. and 2,500 ml of an aqueous solution containing KBr (153.9 g) and 108 g of oxidation-treated gelatin having a molecular weight of 15,000 and kept at 20° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at –20 mV to the calomel electrode by separately adding a KBr solution. Together with this first growth, ultrafiltration was performed. The ultrafiltration module used for the ultrafiltration apparatus was flat membrane Centramate Nova Series (fractional molecular weight: 30,000) produced by Pall. The reflux flow rate was 1 liter/min, the permeation flow rate was from 24 to 57 ml/min, the supply pressure was 0.09 MPa, the reflux pressure was 0.05 MPa and the permeation pressure was 0 MPa. After the first growth, the liquid volume was nearly 3,980 ml. In the fine grains added, the number average equivalent-circle diameter was 0.014 $\mu$m and the coefficient of variation in the equivalent-circle diameter was 23%.

(Preparation of Emulsion VII-f)

Emulsion VII-f was prepared almost in the same manner as Emulsion VII-a except that the first growth was changed as follows. The chemical sensitization and the like were appropriately optimized according to the surface area of emulsion grain. As the first growth, silver halide fine grains prepared by adding 3,000 ml of an aqueous AgNO$_3$ (231.4 g) solution kept at 15° C. and 3,000 ml of an aqueous solution containing KBr (149.0 g), KI (6.8 g) and 207 g of oxidation-treated gelatin having a molecular weight of 15,000 and kept at 20° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at −20 mV to the calomel electrode by separately adding a KBr solution. Together with this first growth, ultrafiltration was performed. The ultrafiltration module used for the ultrafiltration apparatus was flat membrane Centramate Nova Series (fractional molecular weight: 30,000) produced by Pall. The reflux flow rate was 1 liter/min, the permeation flow rate was from 24 to 57 ml/min, the supply pressure was 0.09 MPa, the reflux pressure was 0.05 MPa and the permeation pressure was 0 MPa. After the first growth, the liquid volume was nearly 3,980 ml. In the fine grains added, the number average equivalent-circle diameter was 0.014 μm and the coefficient of variation in the equivalent-circle diameter was 19%.

(Preparation of Emulsion VII-g)

Emulsion VII-g was prepared almost in the same manner as Emulsion VII-a except that the first growth was changed as follows. The chemical sensitization and the like were appropriately optimized according to the surface area of emulsion grain. As the first growth, silver halide fine grains prepared by adding 4,000 ml of an aqueous $AgNO_3$ (231.4 g) solution kept at 30° C. and 4,000 ml of an aqueous solution containing KBr (149.0 g), KI (6.8 g) and 323 g of oxidation-treated gelatin having a molecular weight of 15,000 and kept at 30° C. to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at −20 mV to the calomel electrode by separately adding a KBr solution. Together with this first growth, ultrafiltration was performed. The ultrafiltration module used for the ultrafiltration apparatus was hollow yarn membrane SLP-1053 (fractional molecular weight: 10,000) produced by Asahi Chemical Industry Co., Ltd. At this time, the reflux flow rate was from 3 to 12 liter/min and the permeation flow rate was 38 ml/min. After the first growth, the liquid volume was nearly 3,980 ml. In the fine grains added, the number average equivalent-circle diameter was 0.016 μm and the coefficient of variation in the equivalent-circle diameter was 9%.

The characteristic values of Emulsions VII-a to VII-g are shown in Table 10. As apparently seen from the results in Table 10, a monodisperse tabular grain emulsion more reduced in the thickness can be obtained by the production process of the present invention.

In each of Emulsions VII-b to VII-g, 90% or more of the entire projected area was occupied by hexagonal tabular grains where the ratio of the length of a side having a maximum length to the length of a side having a minimum length was 1.5 or less and an epitaxial junction was present at all of six apex parts. The emulsions were observed by a transmission electron microscope at a low temperature, as a result, 90% or more of the entire projected area was occupied by grains having no dislocation line in the main plane part except for the epitaxial part and having network dislocation lines in the epitaxial part. Emulsions VII-b to VII-g all were a grain where the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

On a cellulose triacetate film support having provided thereon a subbing layer, chemically sensitized emulsions prepared above each was coated under the coating conditions shown in Table 2 and a protective layer was provided, thereby obtaining Samples VII-801 to VII-807.

Each sample was left standing under the conditions of 40° C. and a relative humidity of 70% for 14 hours, then exposed for 1/100 second through Gelatin Filter SC-50 produced by Fuji Photo Film Co., Ltd. and a continuous wedge and processed in the same manner as above.

The processed samples were measured on the density by a green filter. Also, samples stored for 14 days under the condition of 50° C. and a relative humidity of 60% before the exposure were measured in the same manner and evaluated on the storability.

The sensitivity value at a density of fog+0.2 and the fog value obtained are shown in Table 11.

TABLE 11

| Sample No. | Emulsion | | Fog | Sensitivity |
|---|---|---|---|---|
| VII-801 | VII-a | Comparison | 0.28 | 100 |
| VII-802 | VII-b | Comparison | 0.23 | 122 |
| VII-803 | VII-c | Comparison | 0.23 | 129 |
| VII-804 | VII-d | Invention | 0.19 | 164 |
| VII-805 | VII-e | Invention | 0.14 | 212 |
| VII-806 | VII-f | Invention | 0.13 | 221 |
| VII-807 | VII-g | Invention | 0.10 | 253 |

As apparent from the results in Table 11, the silver halide emulsions produced by the production process of the present invention have low fog and high-sensitivity.

TABLE 10

| | | Fine Grain Added | | Tabular Grain | | | |
|---|---|---|---|---|---|---|---|
| Sample No. | Emulsion | Number Average Size (μm) | Coefficient of Variation (%) | Average Equivalent-Circle Diameter (μm) | Coefficient of Variation in Equivalent-Circle Diameter (%) | Average Thickness (μm) | Coefficient of Variation in Thickness (%) |
| VII-801 | VII-a | — | — | 1.78 | 27 | 0.143 | 38 |
| VII-802 | VII-b | 0.015 | 36 | 2.53 | 27 | 0.071 | 31 |
| VII-803 | VII-c | 0.014 | 32 | 2.73 | 26 | 0.061 | 31 |
| VII-804 | VII-d | 0.014 | 28 | 2.77 | 23 | 0.059 | 26 |
| VII-805 | VII-e | 0.014 | 23 | 3.28 | 20 | 0.042 | 21 |
| VII-806 | VII-f | 0.014 | 19 | 3.41 | 20 | 0.039 | 20 |
| VII-807 | VII-g | 0.016 | 9 | 3.71 | 18 | 0.033 | 18 |

Example VIII

This Examples is performed to verify the effect of the emulsion produced by the production process of the present invention in a multilayer color photographic light-sensitive material.

Samples VIII-901 to VIII-907 were prepared in the same manner as in Example VI except that Emulsion V-a of the sixth layer was changed to Em-J, and Em-K of the fourth layer was changed to Emulsions VIII-a to VIII-g, respectively.

These samples were subjected to a hardening treatment under the conditions of 40° C. and a relative humidity of 70% for 14 hours and then, exposed and processed in the same manner as in Example VI.

The results are shown in Table 12.

TABLE 12

| Sample No. | Emulsion | | Fog | Sensitivity at Density of Fog+2.0 |
|---|---|---|---|---|
| VIII-901 | VIII-a | Comparison | 0.23 | 100 |
| VIII-902 | VIII-b | Comparison | 0.21 | 118 |
| VIII-903 | VIII-c | Comparison | 0.21 | 118 |
| VIII-904 | VIII-d | Invention | 0.19 | 142 |
| VIII-905 | VIII-e | Invention | 0.17 | 164 |
| VIII-906 | VIII-f | Invention | 0.17 | 181 |
| VIII-907 | VIII-g | Invention | 0.16 | 196 |

As apparent from Table 12, a light-sensitive material having low fog and high sensitivity can be obtained by using the emulsion produced according to the production process of the present invention.

Example IX

The production process of emulsion of the present invention is described in detail below.
(Preparation of Emulsion IX-a)

1,691 mL of an aqueous solution containing 0.128 g of KBr and 2.38 g of oxidation-treated low molecular weight gelatin having an average molecular weight of 20,000 was stirred while keeping at 5C. Thereto, 47.4 mL of an aqueous $AgNO_3$ (0.178 g) solution and 75.3 mL of an aqueous solution containing KBr (0.414 g) and oxidation-treated low molecular weight gelatin (0.068 g) having an average molecular weight of 20,000 were added over 52 seconds. The temperature was elevated to 75° C. and then, 18 mL of an aqueous solution containing 1.83 g of KBr was added. Thereto, 130 mL of an aqueous solution containing 16 g of succinated gelatin having an average molecular weight of 100,000 was added and then, 200 mL of an aqueous solution containing 12 g of sodium catechol disulfonate was added. At this time, the liquid volume was 1,930 mL. Subsequently, as the first growth, silver halide fine grains prepared by adding 854 mL of an aqueous $AgNO_3$ (24.2 g) solution and an aqueous KBr solution having an equimolar concentration (containing 3 mol % of KI and 15.1 g of oxidation-treated low molecular gelatin having an average molecular weight of 20,000) to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.015 μm and the coefficient of variation in the equivalent-circle diameter was 29%. Together with this first growth, ultrafiltration was performed. The ultrafiltration module used for the ultrafiltration apparatus was flat membrane Centramate Nova Series (fractional molecular weight: 30,000) produced by Pall. The reflux flow rate was 1 L/min, the supply pressure was 0.09 MPa, the reflux pressure was 0.05 MPa and the permeation pressure was 0 MPa. At this time, the liquid volume was 1,845 mL. In the course of growth, 10 mL of an aqueous solution containing potassium hexachloroiridate (0.2 mg) was added. At the completion of addition of $AgNO_3$, 10 mL of an aqueous solution containing sodium benzenethiosulfonate (2 mg) was added. Thereafter, as the second growth, silver halide fine grains were prepared by adding 816 mL of an aqueous $AgNO_3$ solution (98.0 g) and an aqueous KBr solution having an equimolar concentration (containing 3 mol % of KI and 61.3 g of oxidation-treated low molecular weight gelatin having an average molecular weight of 20,000) to a mixing vessel same as in the first growth and added to a reactor. The silver potential was kept at 0 mV to the saturated calomel electrode by separately adding a KBr solution. In the fine grains added, the number average equivalent-circle diameter was 0.017 μm and the coefficient of variation in the equivalent-circle diameter was 36%. Together with this second growth, ultrafiltration was performed. The conditions were the same as in the first growth. At this time, the liquid volume was 2,750 mL. Furthermore, as the third growth, the additions and ultrafiltration were performed under thoroughly the same conditions as in the second growth. At this time, the liquid amount was 3,500 mL. Thereafter, 100 mL of an aqueous solution containing 14 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. At this time, the liquid volume was 3,695 mL. After lowering the temperature to 40° C., 7.76 mL of phenoxyethanol was added and further, 20 mL of an aqueous KI (0.21 g) solution was added. Thereto, Sensitizing Dyes IV, V and VI were added at a molar ratio of 69:30:1 to a proportion of 70% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 15 mL of an aqueous solution containing potassium hexacyanoruthenate (II)(2.6 mg), 100 mL of an aqueous $AgNO_3$ (10.1 g) solution and 100 mL of an aqueous solution containing KBr (3.7 g), KI (0.7 g) and NaCl (3.06 g) were added by a double jet method over 2 minutes. Thereafter, 12 ml of Epitaxial Part Shape Stabilizer I (80 mg) was added. At this time, the liquid volume was 4,180 mL. Subsequently, normal water washing was performed. Here, the temperature was kept at 35° C. After adding 77 g of the above-described gelatin, the pH at 40° C. was adjusted to 6.5 and the silver potential was adjusted to 80 mV to the saturated calomel electrode using an aqueous NaCl solution. After adding Epitaxial Part Shape Stabilizer/Storability Improver II (6 mg), the temperature was elevated to 68° C. and then, chemical sensitization was optimally performed by adding $0.7 \times 10^{-4}$ mol of potassium thiocyanate, $1.4×10^{-6}$ mol of chloroauric acid, $0.5×10^{-5}$ mol of sodium thiosulfate and $1.2×10^{-6}$ mol of N,N-dimethylselenourea per mol of silver halide. Antifoggant I ($8.3×10^{-4}$ mol) was added and the chemical sensitization was completed.

Emulsion IX-a obtained was tabular grains such that the coefficient of variation in the equivalent-circle diameter of all grains was 29%, the average equivalent-circle diameter was 5.6 μm and the average thickness was 0.048 μm. In this emulsion, 80% or more of the entire projected area was occupied by tabular grains having an equivalent-circle diameter of 5.0 μm or more and an average thickness of 0.055 μm or less. Also, 90% or more of the entire projected area was occupied by hexagonal tabular grains where the ratio of the length of a side having a maximum length to the length of a side having a minimum length was 1.5 or less and an epitaxial junction was present at all of six apex parts. The emulsion was observed by a transmission electron microscope at a low temperature, as a result, 90% or more of the entire projected area was occupied by grains having no dislocation line in the main plane part except for the epitaxial part and having network dislocation lines in the epitaxial part. In this grain, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

(Preparation of Emulsion IX-b)

1,192 mL of an aqueous solution containing 0.9 g of KBr and 4.2 g of oxidation-treated low molecular weight gelatin having an average molecular weight of 20,000 was stirred while keeping at 35° C. Thereto, 33.4 mL of an aqueous $AgNO_3$ (1.0 g) solution and 53.1 mL of an aqueous solution containing KBr (0.9 g) and oxidation-treated low molecular weight gelatin (0.37 g) having an average molecular weight of 20,000 were added over 52 seconds. The temperature was elevated to 75° C. and then, 18 mL of an aqueous solution containing 1.83 g of KBr was added. Thereto, 130 mL of an aqueous solution containing 16 g of succinated gelatin having an average molecular weight of 100,000 was added and then, 200 mL of an aqueous solution containing 12 g of sodium catechol disulfonate was added. At this time, the liquid volume was 1,628 mL. Subsequently, as the first growth, silver halide fine grains prepared by adding 854 mL of an aqueous $AgNO_3$ (136.0 g) solution and an aqueous KBr solution having an equimolar concentration (containing 3 mol % of KI and 85 g of oxidation-treated low molecular gelatin having an average molecular weight of 20,000) to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.015 μm and the coefficient of variation in the equivalent-circle diameter was 29%. At this time, the liquid volume was 3,394 mL. In the course of growth, 10 mL of an aqueous solution containing potassium hexachloroiridate (0.2 mg) was added. At the completion of addition of $AgNO_3$, 10 mL of an aqueous solution containing sodium benzenethiosulfonate (2 mg) was added. Thereafter, the solution was bailed out to a volume of 608 mL. Then, as the second growth, silver halide fine grains were prepared by adding 816 mL of an aqueous $AgNO_3$ solution (98.0 g) and an aqueous KBr solution having an equimolar concentration (containing 3 mol % of KI) to a mixing vessel same as in the first growth and added to a reactor. The silver potential was kept at 0 mV to the saturated calomel electrode by separately adding a KBr solution. In the fine grains added, the number average equivalent-circle diameter was 0.017 μm and the coefficient of variation in the equivalent-circle diameter was 36%. At this time, the liquid volume was 2,299 mL. Furthermore, as the third growth, silver halide fine grains were prepared by adding an aqueous $AgNO_3$ solution (98.0 g) and an aqueous KBr solution having an equimolar concentration (containing 3 mol % of KI and 61.3 g of oxidation-treated low molecular weight gelatin having an average molecular weight of 20,000) to a mixing vessel same as in the first growth and added to a reactor. The silver potential was kept at 0 mV to the saturated calomel electrode by separately adding a KBr solution. In the fine grains added, the number average equivalent-circle diameter was 0.018 μm and the coefficient of variation in the equivalent-circle diameter was 39%. At this time, the liquid volume was 3,500 mL and the same amount of $AgNO_3$ was contained in the same amount of solution as in Emulsion IX-a. The subsequent steps were performed in the same manner as in the preparation of Emulsion IX-a. The thus-prepared Emulsion IX-b was tabular grains such that the coefficient of variation in the equivalent-circle diameter of all grains was 26%, the average equivalent-circle diameter was 3.8 μm and the average thickness was 0.095 μm. In this emulsion, 45% of the entire projected area was occupied by tabular grains having an equivalent-circle diameter of 4.0 μm or more and an average thickness of 0.10 μm or less.

The characteristic values of Emulsions IX-a and IX-b are shown in Table 13. As apparently seen from the results in Table 13, a large size tabular grain can be more reduced in the thickness by the production process of the present invention.

TABLE 13

| Name of Emulsion | Presence or Absence of Ultrafiltration | Percentage of Grains Having Equivalent-Circle Diameter of 4 μm or more and Thickness of 0.1 μm or less in Entire Projected Area (%) | Coefficient of Variation in Equivalent-Circle Diameter of All Grains (%) | |
|---|---|---|---|---|
| A | done | 80% or more | 29% | Invention |
| B | none | 45% | 26% | Comparison |

On a cellulose triacetate film support having provided thereon a subbing layer, chemically sensitized emulsions prepared above each was coated under the coating conditions shown in Table 2 and a protective layer was provided, thereby obtaining Samples IX-801 and IX-802.

Each sample exposed for 1/100 second through Gelatin Filter SC-50 produced by Fuji Photo Film Co., Ltd. and a continuous wedge and processed in the same manner as in Example II.

The processed samples were measured on the density by a green filter. The sensitivity value at a density of fog+0.2 and the fog value obtained are shown in Table 14.

TABLE 14

| Sample No. | Emulsion | Fog | Sensitivity | |
|---|---|---|---|---|
| IX-801 | IX-a | 0 | 148 | Invention |
| IX-802 | IX-b | 0 | 100 | Comparison |

Fog shows the increment from Sample IX-802 of which fog is taken as 0.

Sensitivity is shown relatively to Sample IX-802 of which sensitivity is taken as 100.

As apparent from the results in Table 14, a silver halide emulsion having high sensitivity can be obtained by the production process of the present invention.

Example X

This Examples is performed to verify the effect of the emulsion produced by the production process of the present invention in a multilayer color photographic light-sensitive material.

Samples X-901 and X-902 were prepared in the same manner as in Example VI except that Emulsion V-a of the sixth layer was changed to Emulsions IX-a and IX-b, respectively.

These samples were exposed and processed in the same manner as in Example VI.

The results are shown in Table 15.

TABLE 15

| Sample No. | Emulsion of Sixth Layer | Fog | Sensitivity | |
|---|---|---|---|---|
| X-901 | IX-a | 0 | 130 | Invention |
| X-902 | IX-b | 0 | 100 | Comparison |

Fog shows the increment from Sample X-902 of which fog is taken as 0.

Sensitivity is shown relatively to Sample X-902 of which sensitivity is taken as 100.

As apparent from Table 15, a light-sensitive material having high sensitivity can be obtained by using the emulsion produced according to the production process of the present invention.

Example XI

The silver halide photographic emulsion of the present invention is described in detail below.
(Preparation of Emulsion XI-a)

1,100 mL of an aqueous solution containing 0.32 g of KBr and 1.38 g of oxidation-treated low molecular weight gelatin having an average molecular weight of 20,000 was stirred while keeping at 5° C. Thereto, 200 ml of an aqueous $AgNO_3$ (1.0 g) solution and 200 ml of an aqueous solution containing KBr (0.7 g) and oxidation-treated low molecular weight gelatin (3.3 g) having an average molecular weight of 20,000 were added over 15 seconds. After adding 120 ml of an aqueous solution containing 2.6 g of KBr, the temperature was elevated to 75° C. and then, 130 ml of an aqueous solution containing 18 g of succinated gelatin having an average molecular weight of 100,000 was added. Thereafter, 200 ml of an aqueous solution containing 12 g of sodium catechol disulfonate was added. At this time, the liquid volume was 1,950 ml. Subsequently, as the first growth, 1,000 ml of an aqueous $AgNO_3$ (231.4 g) solution and an aqueous KBr solution having an equimolar concentration were added by a double jet method while acceleration the flow rate. At this time, the liquid volume was 3,980 ml. During the addition, the silver potential was kept at −20 mV to the saturated calomel electrode. In the course of addition, 10 ml of an aqueous solution containing potassium hexachloroiridate (0.2 mg) was added. At the completion of addition of $AgNO_3$, 10 ml of an aqueous solution containing sodium benzenethio-sulfonate (2 mg) was added.

Thereafter, as the outermost layer growth, 100 ml of an aqueous $AgNO_3$ solution (34.1 g) and 100 ml of an aqueous KBr solution containing KI were added. The concentration of KI was adjusted to give a silver iodide content of 12 mol %. At this time, the silver potential was kept at 30 mV to the saturated calomel electrode. Subsequently, 100 ml of an aqueous solution containing 14 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. At this time, the liquid volume was 4,290 ml. After lowering the temperature to 40° C., 9.7 ml of phenoxyethanol was added and further, 20 ml of an aqueous KI (0.27 g) solution was added. Thereto, Sensitizing Dye VII was added to a proportion of 20% of the saturated coverage and then, Sensitizing Dyes VIII, IX and X were added at a molar ratio of 45:40:15 to a proportion of 60% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 15 ml of an aqueous solution containing potassium hexacyanoruthenate (II) (3.2 mg), 100 ml of an aqueous $AgNO_3$ (12.66 g) solution and 100 ml of an aqueous solution containing KBr (4.66 g), KI (0.88 g) and NaCl (3.83 g) were added by a double jet method over 2 minutes. Thereafter, 15 ml of Epitaxial Part Shape Stabilizer I (180 mg) was added. At this time, the liquid volume was 4,650 ml. Subsequently, water washing was performed by a normal coagulation precipitation method. Here, the temperature was kept at 35° C. After adding 77 g of the above-described gelatin, the pH at 40° C. was adjusted to 6.5 and the silver potential was adjusted to 80 mV to the saturated calomel electrode using an aqueous NaCl solution.

Emulsion XI-a obtained was tabular grains such that the average equivalent-circle diameter was 1.78 μm, the coefficient of variation in the equivalent-circle diameter was 27%, the average thickness was 0.143 μm and the average aspect ratio was 12.4. In this emulsion, 90% or more of the entire projected area was occupied by hexagonal tabular grains where the ratio of the length of a side having a maximum length to the length of a side having a minimum length was 1.5 or less and an epitaxial junction was present at all of six apex parts. The emulsion was observed by a transmission electron microscope at a low temperature, as a result, 90% or more of the entire projected area was occupied by grains having no dislocation line in the main plane part except for the epitaxial part and having network dislocation lines in the epitaxial part. In this grain, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

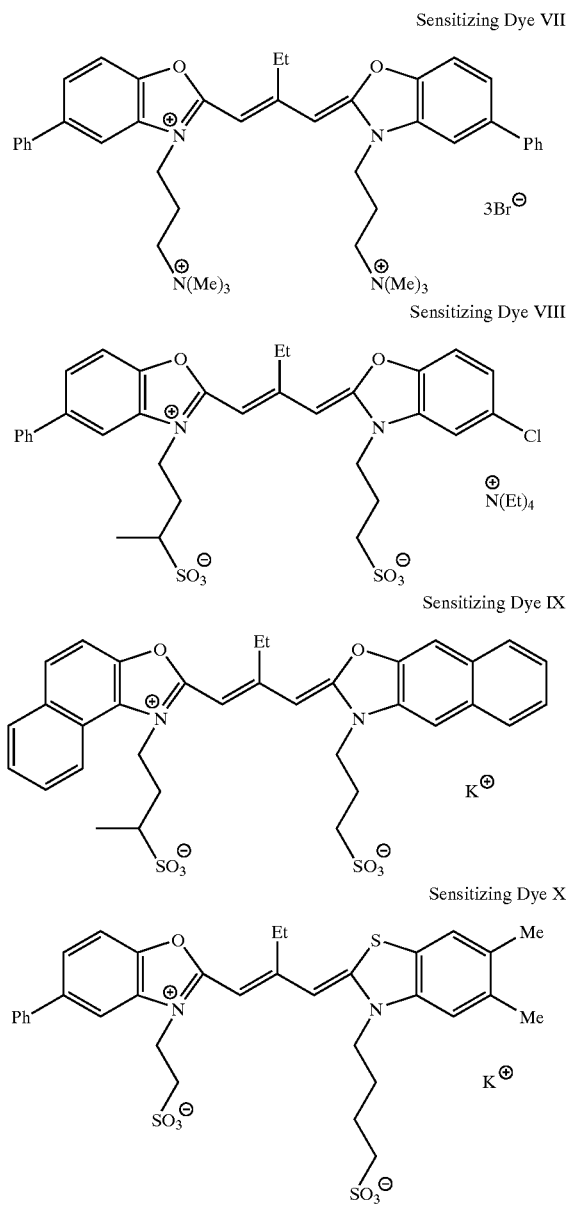

Sensitizing Dye VII

Sensitizing Dye VIII

Sensitizing Dye IX

Sensitizing Dye X (Preparation of Emulsion XI-b)

Emulsion XI-b was prepared by making the following change in the preparation of Emulsion XI-a. Ultra-filtration was performed at 40° C. in place of the water washing by a normal coagulation precipitation method and thereafter, the gelatin concentration, the pH and the silver potential were adjusted in the same manner as in the preparation of Emulsion XI-a.

The ultrafiltration module used for the ultra-filtration apparatus was hollow yarn membrane SLP-1053 (fractional molecular weight: 10,000) produced by Asahi Chemical Industry Co., Ltd. At this time, the reflux flow rate was from 3 to 12 liter/min and the permeation flow rate was 27 ml/min.

The characteristic values of Emulsion XI-b were the same as those of Emulsion XI-a.

(Preparation of Emulsion XI-a-1)

After adding Epitaxial Part Shape Stabilizer/Storability Improver II (6 mg) to Emulsion XI-a at 40° C., the temperature was elevated to 50° C. and then, chemical sensitization was optimally performed by adding $0.7 \times 10^{-4}$ mol of potassium thiocyanate, $2.8 \times 10^{-6}$ mol of chloroauric acid, $0.9 \times 10^{-5}$ mol of sodium thiosulfate and $2.16 \times 10^{-6}$ mol of N,N-dimethylselenourea per mol of silver halide. After 75 minutes from the addition of sodium thiosulfate, Antifoggant I ($8.3 \times 10^{-4}$ mol) was added and the chemical sensitization was completed by lowering the temperature to 40° C.

(Preparation of Emulsion XI-a-2)

After adding Epitaxial Part Shape Stabilizer/Storability Improver II (6 mg) to Emulsion XI-a at 40° C., the temperature was elevated to 58° C. and then, chemical sensitization was optimally performed by adding $0.7 \times 10^{-4}$ mol of potassium thiocyanate, $1.8 \times 10^{-6}$ mol of chloroauric acid, $0.65 \times 10^{-5}$ mol of sodium thiosulfate and $1.56 \times 10^{-6}$ mol of N,N-dimethylselenourea per mol of silver halide. After 75 minutes from the addition of sodium thiosulfate, Antifoggant I ($8.3 \times 10^{-4}$ mol) was added and the chemical sensitization was completed by lowering the temperature to 40° C.

(Preparation of Emulsion XI-a-3)

After adding Epitaxial Part Shape Stabilizer/Storability Improver II (6 mg) to Emulsion XI-a at 40° C., the temperature was elevated to 68° C. and then, chemical sensitization was optimally performed by adding $0.7 \times 10^{-4}$ mol of potassium thiocyanate, $1.4 \times 10^{-6}$ mol of chloroauric acid, $0.5 \times 10^{-5}$ mol of sodium thiosulfate and $1.2 \times 10^{-6}$ mol of N,N-dimethylselenourea per mol of silver halide. After 25 minutes from the addition of sodium thiosulfate, Antifoggant I ($8.3 \times 10^{-4}$ mol) was added and the chemical sensitization was completed by lowering the temperature to 40° C.

(Preparation of Emulsion XI-a-4)

After adding Epitaxial Part Shape Stabilizer/Storability Improver II (6 mg) to Emulsion XI-a at 40° C., the temperature was elevated to 72° C. and then, chemical sensitization was optimally performed by adding $0.7 \times 10^{-4}$ mol of potassium thiocyanate, $1.0 \times 10^{-6}$ mol of chloroauric acid, $0.4 \times 10^{-5}$ mol of sodium thiosulfate and $1.0 \times 10^{-6}$ mol of N,N-dimethylselenourea per mol of silver halide. After 10 minutes from the addition of sodium thiosulfate, Antifoggant I ($8.3 \times 10^{-4}$ mol) was added and the chemical sensitization was completed by lowering the temperature to 40° C.

(Preparation of Emulsion XI-a-5)

After the preparation of Emulsion XI-a-1, Sensitizing Dye VII was added at 40° C. to a proportion of 35% of the saturated coverage and then Sensitizing Dye VIII was added to a proportion of 45% of the saturated coverage. The light absorption intensity of this Emulsion was 135 and this reveals that multilayer adsorption of sensitizing dyes was achieved.

(Preparation of Emulsion XI-a-6)

After the preparation of Emulsion XI-a-2, Sensitizing Dye VII was added at 40° C. to a proportion of 35% of the saturated coverage and then Sensitizing Dye VIII was added to a proportion of 45% of the saturated coverage. The light absorption intensity of this Emulsion was 135 and this reveals that multilayer adsorption of sensitizing dyes was achieved.

(Preparation of Emulsion XI-a-7)

After the preparation of Emulsion XI-a-3, Sensitizing Dye VII was added at 40° C. to a proportion of 35% of the saturated coverage and then Sensitizing Dye VIII was added to a proportion of 45% of the saturated coverage. The light absorption intensity of this Emulsion was 135 and this reveals that multilayer adsorption of sensitizing dyes was achieved.

(Preparation of Emulsion XI-a-8)

After the preparation of Emulsion XI-a-4, Sensitizing Dye VII was added at 40° C. to a proportion of 35% of the saturated coverage and then Sensitizing Dye VIII was added to a proportion of 45% of the saturated coverage. The light absorption intensity of this Emulsion was 135 and this reveals that multilayer adsorption of sensitizing dyes was achieved.

(Preparation of Emulsion XI-b-1)

Emulsion XI-b-1 was prepared by changing Emulsion XI-a to XI-b in the preparation of Emulsion XI-a-5.

The light absorption intensity of this Emulsion was 155 and this reveals that multilayer adsorption of sensitizing dyes was achieved.

(Preparation of Emulsion XI-b-2)

Emulsion XI-b-2 was prepared by changing Emulsion XI-a to XI-b in the preparation of Emulsion XI-a-6.

The light absorption intensity of this Emulsion was 155 and this reveals that multilayer adsorption of sensitizing dyes was achieved.

(Preparation of Emulsion XI-b-3)

Emulsion XI-b-3 was prepared by changing Emulsion XI-a to XI-b in the preparation of Emulsion XI-a-7.

The light absorption intensity of this Emulsion was 155 and this reveals that multilayer adsorption of sensitizing dyes was achieved.

(Preparation of Emulsion XI-b-4)

Emulsion XI-b-4 was prepared by changing Emulsion XI-a to XI-b in the preparation of Emulsion XI-a-8.

The light absorption intensity of this Emulsion was 155 and this reveals that multilayer adsorption of sensitizing dyes was achieved.

On a cellulose triacetate film support having provided thereon a subbing layer, chemically sensitized emulsions prepared above each was coated under the coating conditions shown in Table 2 and a protective layer was provided, thereby obtaining Samples XI-501 to XI-512.

Each sample was left standing under the conditions of 40° C. and a relative humidity of 70% for 14 hours, then exposed for 1/100 second through Gelatin Filter SC-50 produced by Fuji Photo Film Co., Ltd. and a continuous wedge and processed in the same manner as in Example II.

The processed samples were measured on the density by a green filter.

The sensitivity value at a density of fog+0.2 and the fog value obtained are shown in Table 16.

TABLE 16

| Sample No. | | Emulsion | Multi-layer Adsorption | Ultra-filtration | Sensitivity Value | Fog Value | γ |
|---|---|---|---|---|---|---|---|
| XI-501 | a-1 | (Comparison) | X | X | 100 | 0.13 | 100 |
| XI-502 | a-2 | (Comparison) | X | X | 113 | 0.13 | 108 |
| XI-503 | a-3 | (Comparison) | X | X | 132 | 0.10 | 121 |
| XI-504 | a-4 | (Comparison) | X | X | 141 | 0.09 | 136 |
| XI-505 | a-5 | (Comparison) | ○ | X | 106 | 0.10 | 53 |
| XI-506 | a-6 | (Comparison) | ○ | X | 128 | 0.10 | 98 |

TABLE 16-continued

| Sample No. | | Emulsion | Multi-layer Adsorption | Ultra-filtration | Sensitivity Value | Fog Value | γ |
|---|---|---|---|---|---|---|---|
| XI-507 | a-7 | (Comparison) | ○ | X | 163 | 0.09 | 118 |
| XI-508 | a-8 | (Comparison) | ○ | X | 171 | 0.08 | 136 |
| XI-509 | b-1 | (Comparison) | ○ | ○ | 111 | 0.10 | 46 |
| XI-510 | b-2 | (Invention) | ○ | ○ | 142 | 0.10 | 92 |
| XI-511 | b-3 | (Invention) | ○ | ○ | 186 | 0.09 | 118 |
| XI-512 | b-4 | (Invention) | ○ | ○ | 192 | 0.08 | 136 |

As apparent from the results in Table 16, the emulsions of the present invention have low fog, high sensitivity, high γ value and high contrast.

On comparison among Samples XI-501 to XI-504, among Samples XI-505 to XI-508 and among Samples XI-509 to XI-512, it is seen that as the chemical sensitization temperature is higher according to the present invention, the fog is lower and the sensitivity and γ values are higher.

On comparison of Samples XI-501 to XI-504 with Samples XI-505 to XI-508, it is seen that in conventional chemical sensitization, the multilayer adsorption of sensitizing dyes incurs extreme reduction of the γ value, whereas according to the present invention, high sensitivity and high γ value are maintained.

On comparison of Samples XI-505 to XI-508 with Samples XI-509 to XI-512, it is seen that the above-described effect is more outstanding in the emulsion subjected to ultrafiltration.

Example XII

The effect of chemical sensitization at a high temperature on the emulsion having an epitaxial protrusion of the present invention is described in greater detail below.

(Preparation of Emulsion XII-c)

1,100 mL of an aqueous solution containing 0.87 g of KBr and 0.95 g of oxidation-treated low molecular weight gelatin having an average molecular weight of 20,000 was stirred while keeping at 35° C. Thereto, an aqueous $AgNO_3$ (3.0 g) solution and an aqueous solution containing KBr (2.1 g) and oxidation-treated low molecular weight gelatin (28 g) having an average molecular weight of 20,000 were added over 55 seconds. After adding an aqueous solution containing 2.6 g of KBr, the temperature was elevated to 52° C. During this elevation of temperature, ultra-filtration was performed and thereby, the solution was concentrated to reduce the volume to a half. The ultrafiltration module used for the ultrafiltration apparatus was hollow yarn membrane SLP-1053 (fractional molecular weight: 10,000) produced by Asahi Chemical Industry Co., Ltd. At this time, the reflux flow rate was from 3 to 12 liter/min and the permeation flow rate was 56 ml/min.

An aqueous solution containing 28 g of oxidation-treated gelatin having an average molecular weight of 100,000 was added and then, an aqueous solution containing 71 g of sodium catechol disulfonate was added. Thereafter, as the first growth, an aqueous $AgNO_3$ (231.4 g) solution and an aqueous KBr solution were added by a double jet method while acceleration the flow rate. At this time, the silver potential was kept at −20 mV to the saturated calomel electrode. In the course of addition, an aqueous solution containing potassium hexachloroiridate (0.1 mg) was added. At the completion of addition of $AgNO_3$, an aqueous solution containing sodium benzenethiosulfonate (2 mg) was added. Thereafter, as the outermost layer growth, an aqueous AgNO$_3$ solution (34.1 g) and an aqueous KBr solution containing KI were added over 14 minutes. The concentration of KI was adjusted to give a silver iodide content of 12 mol %. At this time, the silver potential was kept at 30 mV to the saturated calomel electrode.

After lowering the temperature to 40° C., 9.7 ml of phenoxyethanol was added and further, an aqueous KI (0.47 g) solution was added. Thereto, Sensitizing Dye VII was added to a proportion of 20% of the saturated coverage and then, Sensitizing Dyes VIII, IX and X were added at a molar ratio of 45:40:15 to a proportion of 60% of the saturated coverage. After adding an aqueous solution containing potassium hexacyanoruthenate(II)(12.6 mg), AgI ultrafine grains prepared immediately before the addition were added in an amount of 0.21 g in terms of KI and then, an aqueous AgNO$_3$ (12.66 g) solution and an aqueous solution containing KBr (5.29 g) and NaCl (3.83 g) were added by a double jet method over 2 minutes and 12 seconds. Thereafter, Epitaxial Part Shape Stabilizer I (240 mg) was added and then, water washing by ultrafiltration was performed at 40° C.

The ultrafiltration module used for the ultra-filtration apparatus was hollow yarn membrane SLP-1053 (fractional molecular weight: 10,000) produced by Asahi Chemical Industry Co., Ltd. At this time, the reflux flow rate was from 3 to 12 liter/min and the permeation flow rate was 18 ml/min. During the ultrafiltration, the temperature was kept at 40° C. After adding 31 g of gelatin, the pH at 40° C. was adjusted to 5.8 and the silver potential was adjusted to 75 mV to the saturated calomel electrode using an aqueous NaCl solution.

(Preparation of Emulsion XII-c-1)

After adding Epitaxial Part Shape Stabilizer/Storability Improver II (6 mg), the temperature was elevated to 50° C. and then, chemical sensitization was optimally performed by adding $1.1 \times 10^{-4}$ mol of potassium thiocyanate, $7.15 \times 10^{-6}$ mol of chloroauric acid, $2.47 \times 10^{-5}$ mol of sodium thiosulfate and $6.11 \times 10^{-6}$ mol of N,N-dimethylselenourea per mol of silver halide. After 55 minutes from the addition of sodium thiosulfate, Antifoggant I ($6.1 \times 10^{-4}$ mol) was added and the chemical sensitization was completed by lowering the temperature to 40° C. Thereafter, Sensitizing Dye VII was added to a proportion of 40% of the saturated coverage and Sensitizing Dye VIII was added to a proportion of 60% of the saturated coverage. The light absorption intensity was 165 and this reveals that multilayer adsorption of sensitization dyes was achieved.

The emulsion obtained was tabular grains such that the average equivalent-circle diameter was 0.75 µ, the coefficient of variation in the equivalent-circle diameter was 28%, the average thickness was 0.075 µm and the average aspect ratio was 10.0. In this emulsion, 90% or more of the entire projected area was occupied by grains having an epitaxial protrusion at least at one apex part.

As seen from FIG. 2, the epitaxial part adheres not only in the main plane direction of the tabular grain but also by protruding toward the direction parallel to the main plane.

(Preparation of Emulsion XII-c-2)

After adding Epitaxial Part Shape Stabilizer/Storability Improver II (6 mg), the temperature was elevated to 72° C. and then, chemical sensitization was optimally performed by adding $1 \times 10^{-4}$ mol of potassium thiocyanate, $4.02 \times 10^{-6}$ mol of chloroauric acid, $1.24 \times 10^{-5}$ mol of sodium thiosulfate and $3.05 \times 10^{-6}$ mol of N,N-dimethylselenourea per mol of silver halide. After 12 minutes from the addition of sodium thiosulfate, Antifoggant I ($6.1 \times 10^{-4}$ mol) was added and the chemical sensitization was completed by lowering the temperature to 40° C. Thereafter, Sensitizing Dye VII was added to a proportion of 40% of the saturated coverage and Sensitizing Dye VIII was added to a proportion of 60% of the saturated coverage. The light absorption intensity was 165 and this reveals that multilayer adsorption of sensitization dyes was achieved.

The emulsion obtained was tabular grains such that the average equivalent-circle diameter was 0.75 µm, the coefficient of variation in the equivalent-circle diameter was 28%, the average thickness was 0.075 µm and the average aspect ratio was 10.0. In this emulsion, 80% or more of the entire projected area was occupied by grains having an epitaxial protrusion at least at one apex part. As seen from FIG. 3, the epitaxial part mainly adheres in the main plane direction of the tabular grain and on little occasion, adheres by protruding toward the direction parallel to the main plane.

Emulsions XII-c-1 and XII-c-2 each was coated in the same manner as in Example XI to prepare Samples XII-601 and XII-602. These samples were exposed, processed and evaluated on the photographic properties in the same manner as in Example XI. At this time, the progress of development was simultaneously evaluated by changing the color development time. The results are shown in Table 17.

TABLE 17

| | | Color Development Tim | | | | | |
| | | 1 minute and 15 second | | | 2 minutes and 45 second | | |
| Sample No. | Emulsion | Sensitivity Value | Fog Value | γ | Sensitivity Value | Fog Value | γ |
| XII-601 | XII-c-1 (Comparison) | 100 | 0.07 | 100 | 142 | 0.16 | 146 |
| XII-602 | XII-c-2 (Invention) | 198 | 0.07 | 138 | 210 | 0.16 | 153 |

As apparent from Table 17, the emulsion of the present invention has high sensitivity, high γ value and high contrast. From the comparison of color development time, it is seen that the emulsion of the present invention exhibits high sensitivity and high γ value even when the development time is short. That is, the emulsion of the present invention can be very rapidly developed.

Example XIII (Preparation of Emulsion XIII-a)

845 mL of an aqueous solution containing 0.064 g of potassium bromide and 1.19 g of oxidation-treated low molecular weight gelatin having an average molecular weight of 20,000 was stirred while keeping at 5° C. Thereto, 28.7 mL of an aqueous silver nitrate (0.36 g) solution and 37.7 mL of an aqueous solution containing potassium bromide (0.83 g) and oxidation-treated low molecular weight gelatin (0.136 g) having an average molecular weight of 20,000 were added over 52 seconds to perform the nucleation of silver halide grains. Here, the silver concentration before starting the ripening step was 0.025 mass %. The temperature was elevated to 75° C. and then, 9 mL of an aqueous solution containing 0.92 g of potassium bromide was added. Thereto, 65 mL of an aqueous solution containing 8 g of succinated gelatin having an average molecular weight of 100,000 was added and then, 100 mL of an aqueous solution containing 6 g of sodium catechol disulfonate was added. Subsequently, as the first growth, silver halide fine grains prepared by adding 427 mL of an aqueous silver nitrate (12.1 g) solution and an aqueous potassium bromide solution having an equimolar concentration (containing 3 mol % of iodide and 15.1 g of oxidation-treated low molecular gelatin having an average molecular weight of 20,000) to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at 0 mV to the saturated calomel electrode by separately adding an aqueous potassium bromide solution. In the fine grains added, the number average equivalent-circle diameter was 0.015 $\mu$m and the coefficient of variation in the equivalent-circle diameter was 28%. In the course of growth, 5 mL of an aqueous solution containing potassium hexachloroiridate (0.1 mg) was added. Thereafter, as the second growth, silver halide fine grains were prepared by adding 408 mL of an aqueous silver nitrate (49.0 g) solution and an aqueous potassium bromide solution having an equimolar concentration (containing 3 mol % of iodide and 30.7 g of oxidation-treated low molecular weight gelatin having an average molecular weight of 20,000) to a mixing vessel same as in the first growth and added to a reactor. The silver potential was kept at 0 mV to the saturated calomel electrode by separately adding a potassium bromide solution. In the fine grains added, the number average equivalent-circle diameter was 0.017 $\mu$m and the coefficient of variation in the equivalent-circle diameter was 36%. Furthermore, as the third growth, the additions were performed under thoroughly the same conditions as in the second growth. Thereafter, 50 mL of an aqueous solution containing 7 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. After lowering the temperature to 40° C., 3.88 mL of phenoxyethanol was added and further, 10 mL of an aqueous potassium iodide (0.11 g) solution was added. Thereto, Sensitizing Dyes IV, V and VI were added at a molar ratio of 69:30:1 to a proportion of 70% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 7.5 mL of an aqueous solution containing potassium hexacyanoruthenate (II) (1.3 mg), 50 mL of an aqueous silver nitrate (0.35 g) solution and 50 mL of an aqueous solution containing potassium bromide (1.9 g), potassium iodide (0.35 g) and sodium chloride (1.53 g) were added by a double jet method over 2 minutes.

Thereafter, 6 ml of Epitaxial Part Shape Stabilizer I (40 mg) was added. Subsequently, normal water washing was performed. Here, the temperature was kept at 35° C. After adding 37.5 g of the above-described gelatin, the pH at 40° C. was adjusted to 6.5 and the silver potential was adjusted to 80 mV to the saturated calomel electrode using an aqueous sodium chloride solution. After adding Epitaxial Part Shape Stabilizer/Storability Improver II (3 mg), the temperature was elevated to 68° C. and then, chemical sensitization was optimally performed by adding 0.7×10$^{-4}$ mol of potassium thiocyanate, 1.4 ×10$^{-6}$ mol of chloroauric acid, 0.5×10$^{-5}$ mol of sodium thiosulfate and 1.2×10$^{-6}$ mol of N,N'-dimethylselenourea per mol of silver halide. Antifoggant I (8.3×10$^{-4}$ mol) was added and the chemical sensitization was completed.

(Preparation of Emulsion XIII-b)

1,691 mL of an aqueous solution containing 0.128 g of potassium bromide and 2.38 g of oxidation-treated low molecular weight gelatin having an average molecular weight of 20,000 was stirred while keeping at 5° C. Thereto, 47.4 mL of an aqueous silver nitrate (0.71 g) solution and 75.3 mL of an aqueous solution containing potassium bromide (1.66 g) and oxidation-treated low molecular weight gelatin (0.272 g) having an average molecular weight of 20,000 were added over 52 seconds to perform the nucleation of silver halide grains. Here, the silver concentration before staring the ripening step was 0.025 mass %. The temperature was elevated to 75° C. and then, 18 mL of an aqueous solution containing 1.83 g of potassium bromide was added. Thereto, 130 mL of an aqueous solution containing 16 g of succinated gelatin having an average molecular weight of 100,000 was added and then, 200 mL of an aqueous solution containing 12 g of sodium catechol disulfonate was added. During this elevation of temperature, ultrafiltration was performed. The ultrafiltration module used for the ultrafiltration apparatus was hollow yarn membrane SLP-1053 (fractional molecular weight: 10,000) produced by Asahi Chemical Industry Co., Ltd. At this time, the reflux flow rate was 5 liter/min, the supply pressure was 0.03 MPa, the reflux pressure was 0.01 MPa, the permeation pressure was 0 MPa and the permeation flow rate was from 40 to 60 ml/min. Subsequently, as the first growth, silver halide fine grains prepared by adding 854 mL of an aqueous silver nitrate (24.2 g) solution and an aqueous potassium bromide solution having an equimolar concentration (containing 3 mol % of iodide and 15.1 g of oxidation-treated low molecular gelatin having an average molecular weight of 20,000) to a mixing vessel shown in FIG. 2 where stirring blades having no rotary shaft protruding through the wall of a closed stirring tank and connected with magnetic coupling were rotated in the converse direction, were continuously added to a reactor. The silver potential was kept at 0 mV to the saturated calomel electrode by separately adding a KBr solution. In the fine grains added, the number average equivalent-circle diameter was 0.015 $\mu$m and the coefficient of variation in the equivalent-circle diameter was 28%. Together with the first growth, ultrafiltration was performed under the same conditions as above. In the course of growth, 10 mL of an aqueous solution containing potassium hexachloroiridate (0.2 mg) was added. At the completion of addition of the aqueous silver nitrate solution, 10 mL of an aqueous solution containing sodium benzenethiosulfonate (2 mg) was added. Thereafter, as the second growth, silver halide fine grains were prepared by adding 816 mL of an aqueous silver nitrate (98.0 g) solution and an aqueous potassium bromide solution having an equimolar concentration (containing 3 mol % of iodide and 61.3 g of oxidation-treated low molecular weight gelatin having an average molecular weight of 20,000) to a mixing vessel same as in the first growth and added to a reactor. The silver potential was kept at 0 mV to the saturated calomel electrode by separately adding a KBr solution. In the fine grains added, the number average equivalent-circle diameter was 0.017 $\mu$m and the coefficient of variation in the equivalent-circle diameter was 36%. Together with this second growth, ultrafiltration was performed. The ultrafiltration conditions were the same as in the first growth. Furthermore, as the third growth, the additions were performed thoroughly under the same conditions as in the second growth and together with the growth, ultrafiltration was performed under the same conditions as above. At this time, the liquid volume was 3,500 mL. Thereafter, 100 mL of an aqueous solution containing 14 g of gelatin was added. This gelatin was obtained by crosslinking an alkali-treated ossein first extraction gelatin (in the molecular weight distribution measured by PAGI method, the high molecular weight component was 2.5% and the low molecular weight component was 60.0%) starting from cow bone. In the molecular weight distribution measured by the PAGI method, the high molecular weight component was 12.4% and the low molecular weight component was 48.3%. After lowering the temperature to 40° C., 7.76 ml of phenoxyethanol was added and further, 20 ml of an aqueous potassium iodide (0.21 g) solution was added. Thereto, Sensitizing Dyes IV, V and VI were added at a molar ratio of 69:30:1 to a proportion of 70% of the saturated coverage. Here, the sensitizing dyes were used as a solid fine dispersion prepared by the method described in JP-A-11-52507. More specifically, 0.8 mass parts of sodium nitrate and 3.2 mass parts of sodium sulfate were dissolved in 43 mass parts of ion exchanged water and 13 mass parts of the sensitizing dye was added and dispersed at 60° C. for 20 minutes using a dissolver blade at 2,000 rpm, thereby obtaining a solid dispersion of sensitizing dye. After adding 15 mL of an aqueous solution containing potassium hexacyanoruthenate (II)(2.6 mg), 100 mL of an aqueous silver nitrate (10.1 g) solution and 100 mL of an aqueous solution containing potassium bromide (3.7 g), potassium iodide (0.7 g) and sodium chloride (3.06 g) were added by a double jet method over 2 minutes.

Thereafter, 12 mL of Epitaxial Part Shape Stabilizer I (80 mg) was added. At this time, the liquid volume was 4,180 mL. Then, normal water washing was performed. At this time, the temperature was kept at 35° C. After adding 77 g of the above-described gelatin, the pH at 40° C. was adjusted to 6.5 and the silver potential was adjusted to 80 mV to the saturated calomel electrode using an aqueous sodium chloride solution. After adding Epitaxial Part Shape Stabilizer/Storability Improver II (6 mg), the temperature was elevated to 68° C. and then, chemical sensitization was optimally performed by adding $0.7 \times 10^{-4}$ mol of potassium thiocyanate, $1.4 \times 10^{-6}$ mol of chloroauric acid, $0.5 \times 10^{-5}$ mol of sodium thiosulfate and $1.2 \times 10^{-6}$ mol of N,N'-dimethylselenourea per mol of silver halide. Antifoggant I ($8.3 \times 10^{-4}$ mol) was added and the chemical sensitization was completed.

(Preparation of Emulsion XIII-c)

Emulsion XIII-c was prepared in the same manner as Emulsion XIII-a except that in the nucleation of Emulsion XIII-a, the amounts of silver nitrate, potassium bromide and oxidation-treated low molecular weight gelatin were changed to 0.178 g, 0.414 g and 0.032 g, respectively. At this time, the silver concentration before starting the ripening step was 0.012 mass %.

(Preparation of Emulsion XIII-d)

Emulsion XIII-d was prepared in the same manner as Emulsion XIII-b except that in the nucleation of Emulsion XIII-b, the amounts of silver nitrate, potassium bromide and oxidation-treated low molecular weight gelatin were changed to 0.356 g, 0.828 g and 0.136 g, respectively. At this time, the silver concentration before starting the ripening step was 0.012 mass %.

(Preparation of Emulsion XIII-e)

Emulsion XIII-e was prepared in the same manner as Emulsion XIII-a except that in the nucleation of Emulsion XIII-a, the amounts of silver nitrate, potassium bromide and oxidation-treated low molecular weight gelatin were changed to 0.089 g, 0.207 g and 0.016 g, respectively. At this time, the silver concentration before starting the ripening step was 0.0062 mass %.

(Preparation of Emulsion XIII-f)

Emulsion XIII-f was prepared in the same manner as Emulsion XIII-b except that in the nucleation of Emulsion XIII-b, the amounts of silver nitrate, potassium bromide and oxidation-treated low molecular weight gelatin were changed to 0.178 g, 0.414 g and 0.068 g, respectively. At this time, the silver concentration before starting the ripening step was 0.0062 mass %.

(Preparation of Emulsion XIII-g)

Emulsion XIII-g was prepared in the same manner as Emulsion XIII-a except that in the nucleation of Emulsion XIII-a, the amounts of silver nitrate, potassium bromide and oxidation-treated low molecular weight gelatin were changed to 0.044 g, 0.104 g and 0.017 g, respectively. At this time, the silver concentration before starting the ripening step was 0.0012 mass %.

(Preparation of Emulsion XIII-h)

Emulsion XIII-h was prepared in the same manner as Emulsion XIII-b except that in the nucleation of Emulsion XIII-b, the amounts of silver nitrate, potassium bromide and oxidation-treated low molecular weight gelatin were changed to 0.089 g, 0.207 g and 0.016 g, respectively. At this time, the silver concentration before starting the ripening step was 0.0012 mass %.

Data regarding the grain size of Emulsions XIII-a to XIII-h are shown in Table 18. In the table, the non-parallel twin ratio is a ratio of non-parallel twin grains to the number of all silver halide grains and a value expressed by a percentage.

TABLE 18

| Emulsion | Silver Concentration Before Starting Ripening Step (mass %) | Average Equivalent-Circle Diameter ($\mu$m) | Coefficient of Variation in Equivalent-Circle Diameter (%) | Average Thickness ($\mu$m) | Coefficient of Variation in Thickness (%) | Non-Parallel Twin Ratio (%) | |
|---|---|---|---|---|---|---|---|
| XIII-a | 0.025 | 5.3 | 32 | 0.093 | 29 | 25 | Comparison |
| XIII-b | 0.025 | 5.4 | 31 | 0.082 | 26 | 23 | " |
| XIII-c | 0.012 | 5.5 | 28 | 0.048 | 22 | 19 | Invention |
| XIII-d | 0.012 | 5.4 | 28 | 0.048 | 21 | 18 | " |
| XIII-e | 0.0062 | 5.8 | 29 | 0.048 | 23 | 18 | " |
| XIII-f | 0.0062 | 5.7 | 29 | 0.047 | 21 | 19 | " |

TABLE 18-continued

| Emulsion | Silver Concentration Before Starting Ripening Step (mass %) | Average Equivalent-Circle Diameter (μm) | Coefficient of Variation in Equivalent-Circle Diameter (%) | Average Thickness (μm) | Coefficient of Variation in Thickness (%) | Non-Parallel Twin Ratio (%) | |
|---|---|---|---|---|---|---|---|
| XIII-g | 0.0012 | 6.4 | 38 | 0.088 | 29 | 24 | Comparison |
| XIII-h | 0.0012 | 6.7 | 36 | 0.078 | 28 | 23 | " |

As apparent from the results in Table 18, when the silver concentration before starting the ripening step is within the range of the present invention, a tabular grain emulsion having a small grain thickness, being monodisperse and reduced in non-parallel twin grains can be prepared.

In Emulsions XIII-a to XIII-h, 90% or more of the entire projected area was occupied by hexagonal tabular grains where the ratio of the length of a side having a maximum length to the length of a side having a minimum length was 1.5 or less and an epitaxial junction was present at all of six apex parts. The emulsions were observed by a transmission electron microscope at a low temperature, as a result, 90% or more of the entire projected area was occupied by grains having no dislocation line in the main plane part except for the epitaxial part and having network dislocation lines in the epitaxial part. In this grain, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

On a cellulose triacetate film support having provided thereon a subbing layer, chemically sensitized emulsions prepared above each was coated under the coating conditions shown in Table 2 and a protective layer was provided, thereby obtaining Samples XIII-801 and XIII-808.

These samples each was left standing under the conditions of 40° C. and a relative humidity of 70% for 14 hours, then exposed for 1/100 second through Gelatin Filter SC-50 produced by Fuji Photo Film Co., Ltd. and a continuous wedge and processed in the same manner as in Example II.

The processed samples were measured on the density by a green filter. Also, samples stored under the conditions of 50° C. and a relative humidity of 60% for 14 days before the exposure were measured in the same manner and evaluated on the storability.

The sensitivity value at a density of fog+0.2 and the fog value obtained are shown in Table 19.

TABLE 19

| Sample No. | Emulsion | Fog | Sensitivity | |
|---|---|---|---|---|
| XIII-801 | XIII-a | 0.28 | 100 | Comparison |
| XIII-802 | XIII-b | 0.27 | 105 | " |
| XIII-803 | XIII-c | 0.15 | 180 | Invention |
| XIII-804 | XIII-d | 0.14 | 193 | " |
| XIII-805 | XIII-e | 0.16 | 182 | " |
| XIII-806 | XIII-f | 0.14 | 190 | " |
| XIII-807 | XIII-g | 0.25 | 110 | Comparison |
| XIII-808 | XIII-h | 0.26 | 102 | " |

As apparent from the results in Table 19, the silver halide emulsion produced by the production process of the present invention has low fog and high sensitivity.

Example XIV

This Examples is performed to verify the effect of the emulsion produced by the production process of the present invention in a multilayer color photographic light-sensitive material.

Samples XIV-901 to XIV-908 were prepared in the same manner as in Example VI except that Emulsion V-a of the sixth layer was changed to Em-J and Emulsion Em-K of the fourth layer was changed to Emulsions VIII-a to VIII-h, respectively.

These samples were subjected to a hardening treatment under the conditions of 40° C. and a relative humidity of 70% for 14 hours, and then exposed and processed in the same manner as in Example VI.

The results are shown in Table 20.

TABLE 20

| Sample No. | Emulsion | Fog | Sensitivity |
|---|---|---|---|
| XIV-901 | XIV-a | 0.28 | 100 |
| XIV-902 | XIV-b | 0.27 | 105 |
| XIV-903 | XIV-c | 0.15 | 180 |
| XIV-904 | XIV-d | 0.14 | 193 |
| XIV-905 | XIV-e | 0.16 | 182 |
| XIV-906 | XIV-f | 0.14 | 190 |
| XIV-907 | XIV-g | 0.25 | 110 |
| XIV-908 | XIV-h | 0.26 | 102 |

As apparent from Table 15, a light-sensitive material having low fog and high sensitivity can be obtained by using the emulsion produced according to the process of the present invention.

Example XV (Preparation of Emulsion XV-a)

Emulsion XV-a was prepared in the same manner as Emulsion XIII-a of Example XIII except that the nucleation temperature was changed to 35° C. and the amounts of silver nitrate, potassium bromide and oxidation-treated low molecular weight gelatin at the nucleation were changed to 0.089 g, 0.207 g and 0.034 g, respectively.

(Preparation of Emulsion XV-b)

Emulsion XV-b was prepared in the same manner as Emulsion XIII-b of Example XIII except that the nucleation temperature was changed to 35° C. and the amounts of silver nitrate, potassium bromide and oxidation-treated low molecular weight gelatin at the nucleation were changed to 0.178 g, 0.414 g and 0.068 g, respectively.

(Preparation of Emulsions XV-c to XV-l)

Emulsions XV-c to XV-l were prepared in the same manner as Emulsions XV-a and XV-b by changing the nucleation temperature and the amount of silver nitrate, potassium bromide and oxidation-treated low molecular weight gelatin at the nucleation to give the conditions shown in Table 21 below.

The shapes of grains are shown together in Table 21.

TABLE 21

| Emulsion | Average Tabular Grain Thickness (μm) | Average Equivalent-Circle Diameter (μm) | Coefficient of Variation in Equivalent-Circle Diameter (%) | Nucleation Temperature (° C.) | Silver Concentration at Nucleation Step (mass %) | Ultrafiltration |
|---|---|---|---|---|---|---|
| XV-a | 0.057 | 4.9 | 36 | 35 | 0.0062 | none |
| XV-b | 0.055 | 4.9 | 34 | 35 | 0.0062 | done |
| XV-c | 0.115 | 4.4 | 35 | 35 | 0.062 | none |
| XV-d | 0.113 | 4.3 | 34 | 35 | 0.062 | done |
| XV-e | 0.050 | 5.5 | 33 | 10 | 0.0062 | none |
| XV-f | 0.049 | 5.6 | 32 | 10 | 0.0062 | done |
| XV-g | 0.109 | 4.8 | 34 | 10 | 0.062 | none |
| XV-h | 0.107 | 4.7 | 33 | 10 | 0.062 | done |
| XV-I | 0.048 | 5.8 | 29 | 5 | 0.0062 | none |
| XV-j | 0.047 | 5.7 | 29 | 5 | 0.0062 | done |
| XV-k | 0.094 | 5.2 | 32 | 5 | 0.062 | none |
| XV-l | 0.086 | 5.3 | 31 | 5 | 0.062 | done |

As apparent from the results in Table 21, when the nucleation temperature is lowered, the average tabular grain thickness decreases and at the same time, the coefficient of variation in the equivalent-circle diameter decreases. Furthermore, when the silver halide concentration in the nucleation and ripening steps, silver halide grains reduced not only in the average tabular grain thickness but also in the coefficient of variation in the equivalent-circle diameter are obtained.

In Emulsions XV-a to XV-l, 90% or more of the entire projected area was occupied by hexagonal tabular grains where the ratio of the length of a side having a maximum length to the length of a side having a minimum length was 1.5 or less and an epitaxial junction was present at all of six apex parts. The emulsions were observed by a transmission electron microscope at a low temperature, as a result, 90% or more of the entire projected area was occupied by grains having no dislocation line in the main plane part except for the epitaxial part and having network dislocation lines in the epitaxial part. In the grains, the outermost layer having a silver iodide content of 12% occupied 12% in terms of silver. The epitaxial part occupied 4.5% in terms of silver and had a composition of AgBr(52)Cl(40)I(8). Furthermore, 90% or more of the entire projected area was within 30% of the average silver chloride content and 30% of the average silver iodide content.

On a cellulose triacetate film support having provided thereon a subbing layer, these emulsions which were subjected to chemical sensitization in the same manner as in Example XIII each was coated and a protective layer was provided, thereby obtaining Samples XV-801 to XV-812 (see, Table 22 below).

Each processed sample was measured on the density by a green filter.

TABLE 22

| Sample No. | Emulsion | Fog | Sensitivity |
|---|---|---|---|
| XV-801 | XV-a | 0.23 | 100 |
| XV-802 | XV-b | 0.24 | 105 |
| XV-803 | XV-c | 0.25 | 84 |
| XV-804 | XV-d | 0.25 | 88 |
| XV-805 | XV-e | 0.24 | 115 |
| XV-806 | XV-f | 0.23 | 118 |
| XV-807 | XV-g | 0.23 | 94 |
| XV-808 | XV-h | 0.24 | 96 |
| XV-809 | XV-i | 0.18 | 132 |
| XV-810 | XV-j | 0.17 | 137 |

TABLE 22-continued

| Sample No. | Emulsion | Fog | Sensitivity |
|---|---|---|---|
| XV-811 | XV-k | 0.22 | 102 |
| XV-812 | XV-l | 0.22 | 105 |

The sensitivity is the sensitivity at a density of fog+0.2 and shown as a relative value to Sample XV-801 of which sensitivity is taken as 100.

As apparent from the results in Table 22, when the nucleation temperature is lowered, the sensitivity/fog ratio is improved. Furthermore, by reducing the silver halide concentration in the nucleation and ripening steps, higher effects are obtained.

Example XVI

This Examples is performed to verify the effect of the emulsion produced by the production process of the present invention in a multilayer color photographic light-sensitive material.

Samples XVI-901 to XVI-912 were prepared in the same manner as in Example VI except that Emulsion V-a prepared in Example V of the sixth layer was changed to Emulsion Em-J and Emulsion Em-K of the fourth layer was changed to Emulsions XV-a to XV-l, respectively.

TABLE 23

| Sample No. | Emulsion | Fog | Sensitivity |
|---|---|---|---|
| XV-901 | XV-a | 0.25 | 100 |
| XV-902 | XV-b | 0.24 | 103 |
| XV-903 | XV-c | 0.27 | 91 |
| XV-904 | XV-d | 0.26 | 92 |
| XV-905 | XV-e | 0.23 | 111 |
| XV-906 | XV-f | 0.25 | 108 |
| XV-907 | XV-g | 0.24 | 92 |
| XV-906 | XV-h | 0.25 | 94 |
| XV-909 | XV-i | 0.19 | 123 |
| XV-910 | XV-j | 0.18 | 125 |
| XV-911 | XV-k | 0.23 | 98 |
| XV-912 | XV-l | 0.24 | 100 |

As apparent from the results in Table 23, a light-sensitive material having low fog and high sensitivity can be obtained by using the silver halide emulsion produced according to the production process of the present invention.

While the invention has been described in detail and with reference to specific embodiments thereof, it will be apparent to one skilled in the art that various changes and modifications can be made therein without departing from the spirit and scope thereof.

What is claimed is:

1. A process for producing a photosensitive silver halide emulsion comprising silver halide grains and a dispersion medium, said process comprising steps of adding a water-soluble silver solution, an aqueous alkali halide solution and an aqueous solution of gelatin having a molecular weight of 5,000 to 30,000 or less to a mixing vessel different from a reactor for the production of emulsion to prepare silver halide fine grains, adding the silver halide fine grains to the reactor for the production of emulsion to grow silver halide grains, and ultrafiltering the silver halide grains during the addition of silver halide fine grains, wherein 50% or more of the entire projected area of said emulsion grains is occupied by silver halide tabular grains having an aspect ratio of 10 or more and a thickness of 0.15 $\mu$m or less.

2. The process for producing a silver halide emulsion as claimed in claim 1, wherein the silver halide grains present in the reactor for the production of emulsion are ultrafiltered under variable temperature conditions before the addition of said silver halide fine grains.

3. The process for producing a silver halide emulsion as claimed in claim 1, wherein the residence time of said water-soluble silver salt, aqueous alkali halide solution and aqueous gelatin solution in a mixing space of said mixing vessel is from 0.001 to 10 seconds.

4. The process for producing a silver halide emulsion as claimed in claim 1, wherein said mixing vessel comprises a stirring tank and at least two stirring blades in the stirring tank, an aqueous solution of water-soluble silver salt and an aqueous solution of water-soluble halide are supplied through supply ports provided in the stirring tank of the mixing vessel, the stirring state in mixing the aqueous solutions supplied is controlled by the stirring blades having no rotary shaft protruding through a wall of the stirring tank and disposed to space at the positions facing each other in the stirring tank, and the silver halide fine grains produced after the completion of stirring treatment are discharged from the discharge port provided in the stirring tank.

5. The process for producing a silver halide emulsion as claimed in claim 1, wherein the average equivalent-circle diameter of said silver halide fine grains is 40% or more of the number average thickness of said silver halide tabular grains under growing.

6. The process for producing a silver halide emulsion as claimed in claim 1, wherein the coefficient of variation in the equivalent-circle diameter of said silver halide fine grains is 30% or less.

7. The process for producing a silver halide emulsion as claimed in claim 1, wherein 50% or more of the entire projected area is occupied by grains having an equivalent-circle diameter of 3.0 $\mu$m or more.

8. The process for producing a silver halide emulsion as claimed in claim 1, wherein 70% or more of the entire projected area is occupied by hexagonal tabular grains having an epitaxial projection part at least at one apex.

9. The process for producing a silver halide emulsion as claimed in claim 1, wherein said emulsion is produced through nucleation, ripening and growth steps and the total silver concentration in the silver halide emulsion at the start of ripening step is from 0.0015 to 0.15 mass %.

10. The process for producing a silver halide emulsion as claimed in claim 1, wherein the reactor temperature in the nucleation step of adding an aqueous silver solution and an aqueous halide solution is 5° C. or less.

* * * * *